(12) United States Patent
Ichii et al.

(10) Patent No.: US 7,903,135 B2
(45) Date of Patent: Mar. 8, 2011

(54) OPTICAL SCANNING DEVICE AND IMAGE FORMING APPARATUS FOR OPTIMIZING ARRANGEMENT INTERVALS IN A MAIN-SCANNING DIRECTION AND A SUB-SCANNING DIRECTION

(75) Inventors: Daisuke Ichii, Kawasaki (JP); Yoshinori Hayashi, Kawasaki (JP); Seizo Suzuki, Funabashi (JP); Masaaki Ishida, Yokohama (JP); Makoto Hirakawa, Hiratsuka (JP)

(73) Assignee: Ricoh Company, Ltd., Tokyo (JP)

( * ) Notice: Subject to any disclaimer, the term of this patent is extended or adjusted under 35 U.S.C. 154(b) by 52 days.

(21) Appl. No.: 12/110,862

(22) Filed: Apr. 28, 2008

(65) Prior Publication Data

US 2008/0267663 A1    Oct. 30, 2008

(30) Foreign Application Priority Data

Apr. 26, 2007  (JP) ................................ 2007-116318
May 9, 2007   (JP) ................................ 2007-124141

(51) Int. Cl.
  *B41J 2/45* (2006.01)
(52) U.S. Cl. ...................................................... 347/238
(58) Field of Classification Search .................. 347/233, 347/238, 241, 115, 232
See application file for complete search history.

(56) References Cited

U.S. PATENT DOCUMENTS

| | | | | |
|---|---|---|---|---|
| 4,814,667 A | * | 3/1989 | Tanaka | 313/500 |
| 5,828,479 A | * | 10/1998 | Takano et al. | 359/201.1 |
| 6,037,962 A | * | 3/2000 | Hanson et al. | 347/233 |
| 6,101,018 A | * | 8/2000 | Naiki et al. | 359/204.1 |
| 6,450,664 B1 | * | 9/2002 | Kelly | 362/244 |
| 6,462,853 B2 | | 10/2002 | Hayashi | |
| 6,538,682 B2 | * | 3/2003 | Ohkubo | 347/241 |
| 6,788,444 B2 | | 9/2004 | Suzuki et al. | |
| 6,791,596 B2 | | 9/2004 | Nihei et al. | |
| 6,933,957 B2 | | 8/2005 | Omori et al. | |
| 7,045,773 B2 | | 5/2006 | Suzuki et al. | |
| 7,068,296 B2 | | 6/2006 | Hayashi et al. | |
| 7,106,483 B2 | | 9/2006 | Hayashi et al. | |
| 7,167,288 B2 | | 1/2007 | Miyatake et al. | |
| 7,218,432 B2 | * | 5/2007 | Ichii et al. | 359/204.4 |

(Continued)

FOREIGN PATENT DOCUMENTS

JP    2001-272615    10/2001

(Continued)

OTHER PUBLICATIONS

U.S. Appl. No. 11/710,907, filed Feb. 27, 2007, Amada, et al.

*Primary Examiner* — Hai C Pham
(74) *Attorney, Agent, or Firm* — Oblon, Spivak, McClelland, Maier & Neustadt, L.L.P.

(57) ABSTRACT

An optical scanning device which scans a scanned surface by a plurality of light beams in a main-scanning direction includes a light source having a plurality of light-emitting portions which emit the light beams, the light-emitting portions being two-dimensionally arranged in a plane parallel to the main-scanning direction and a sub-scanning direction orthogonal to the main-scanning direction via arrangement intervals in the main-scanning direction and the sub-scanning direction, a deflector which scans the light beams in the main-scanning direction; and a scanning optical system which images the scanned light beams onto the scanned surface.

18 Claims, 28 Drawing Sheets

U.S. PATENT DOCUMENTS

| | | |
|---|---|---|
| 7,253,937 B2 | 8/2007 | Ueda et al. |
| 7,256,815 B2 | 8/2007 | Suzuki et al. |
| 7,271,823 B2 | 9/2007 | Izumi et al. |
| 7,271,824 B2 | 9/2007 | Omori et al. |
| 7,277,212 B2 | 10/2007 | Miyatake et al. |
| 7,336,406 B2 * | 2/2008 | Kato .......................... 359/204.1 |
| 7,368,706 B2 * | 5/2008 | Suzuki .......................... 250/235 |
| 2005/0179971 A1 | 8/2005 | Amada et al. |
| 2005/0243163 A1 | 11/2005 | Ozasa et al. |
| 2006/0077500 A1 | 4/2006 | Hayashi et al. |
| 2006/0232659 A1 | 10/2006 | Hayashi et al. |
| 2006/0245009 A1 | 11/2006 | Akiyama et al. |
| 2006/0284968 A1 | 12/2006 | Hayashi et al. |
| 2006/0285186 A1 | 12/2006 | Ishida et al. |
| 2007/0030538 A1 | 2/2007 | Hirakawa et al. |
| 2007/0030548 A1 | 2/2007 | Nihei et al. |
| 2007/0058255 A1 | 3/2007 | Imai et al. |
| 2007/0091163 A1 | 4/2007 | Omori et al. |
| 2007/0132828 A1 | 6/2007 | Ishida et al. |
| 2007/0211324 A1 | 9/2007 | Sakai et al. |
| 2007/0211325 A1 | 9/2007 | Ichii |
| 2007/0215800 A1 | 9/2007 | Miyatake et al. |
| 2007/0253047 A1 | 11/2007 | Ichii et al. |
| 2007/0253048 A1 | 11/2007 | Sakai et al. |
| 2007/0297036 A1 | 12/2007 | Nakamura et al. |
| 2008/0019255 A1 | 1/2008 | Imai et al. |
| 2008/0024849 A1 | 1/2008 | Hayashi et al. |
| 2008/0025759 A1 | 1/2008 | Ichii et al. |
| 2008/0055672 A1 | 3/2008 | Watanabe et al. |
| 2008/0055690 A1 | 3/2008 | Nakamura et al. |
| 2008/0055692 A1 | 3/2008 | Saisho et al. |
| 2008/0068689 A1 | 3/2008 | Saisho et al. |
| 2008/0068690 A1 | 3/2008 | Ichii |
| 2008/0068693 A1 | 3/2008 | Hayashi et al. |
| 2008/0088893 A1 | 4/2008 | Ishida et al. |

FOREIGN PATENT DOCUMENTS

| | | |
|---|---|---|
| JP | 2004-287292 | 10/2004 |
| JP | 2005-250319 | 9/2005 |
| JP | 2006-215270 | 8/2006 |
| JP | 2008-52247 | 3/2008 |

* cited by examiner

SCANNING POSITION VARIATION IN HIGH TEMPERATURE (μm)

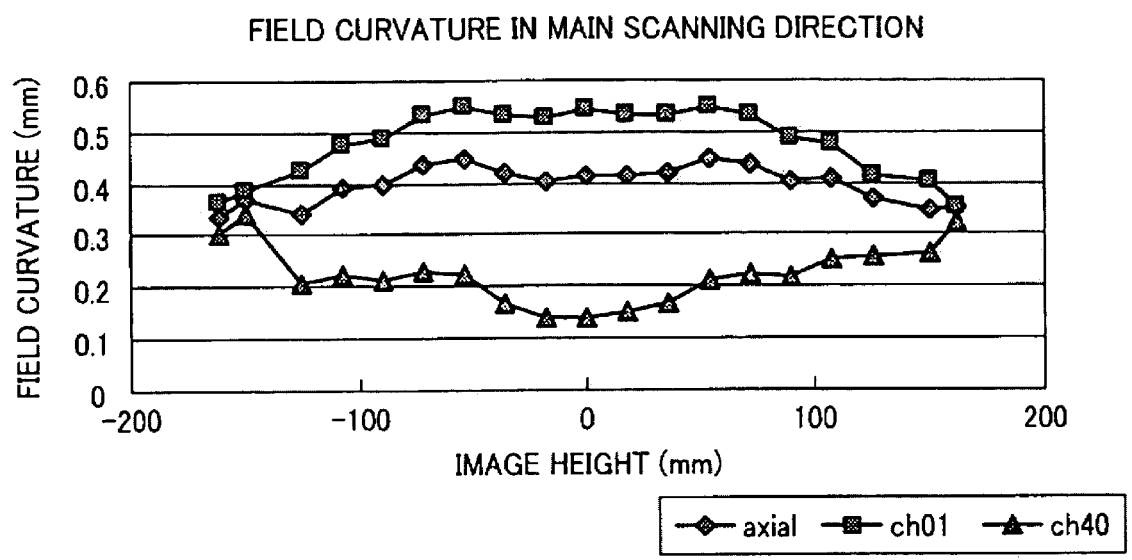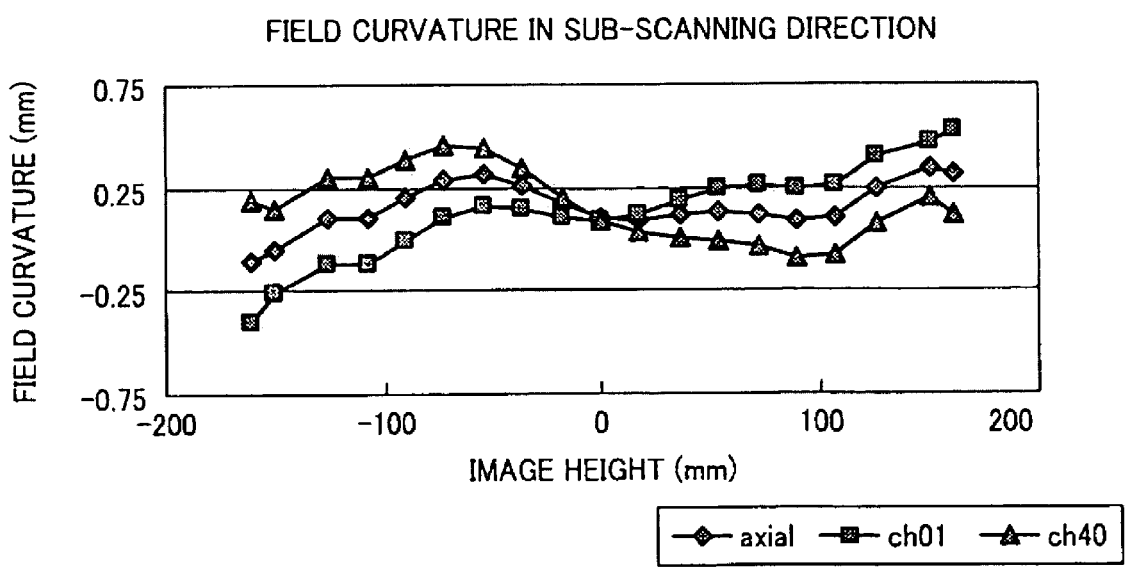

OPTICAL SCANNING DEVICE AND IMAGE FORMING APPARATUS FOR OPTIMIZING ARRANGEMENT INTERVALS IN A MAIN-SCANNING DIRECTION AND A SUB-SCANNING DIRECTION

PRIORITY CLAIM

The present application is based on and claims priorities from Japanese Patent Application No. 2007-116318, filed on Apr. 26, 2007, and No. 2007-124141, filed on May 9, 2007, the disclosures of which are hereby incorporated by reference in their entirety.

BACKGROUND OF THE INVENTION

1. Field of the Invention

The present invention relates to an optical scanning device using a plurality of light beams, and an image forming apparatus having the optical scanning device.

2. Description of the Related Art

Conventionally, as an image forming apparatus which forms an image by means of the Carlson process, there is known, for example, an image forming apparatus which forms an electrostatic latent image on a surface of a photoconductive drum by scanning the surface of a rotating photoconductive drum with optical beams, visualizes the electrostatic latent image as a toner image using toners, and forms an image by fixing the toner image onto a recording medium such as paper. Recently, this kind of image forming apparatus is often used for simplified printing as an on-demand printing system. There are the further increased demands for high density images and a high speed of image output.

As a method of increasing the speed of the image output, a method of increasing a printing speed by increasing the rotation speed of a polygon mirror, for example, which deflects a light beam, and the rotation speed of the photoconductive drum is generally considered. However, if the rotation speed of the polygon mirror is increased, the noise and vibration from a driving system are increased and the power consumption is also increased, causing a decrease in the durability of the apparatus. Moreover, since the increase in the image output speed has a trade-off relationship relative to the increase in the image density, if the rotation speed of the polygon mirror is increased, the image quality is deteriorated along with the increase in the rotation speed.

Consequently, as a method for simultaneously achieving the high density of an image and the high speed of image output, there is proposed an image forming apparatus which changes a light source into multibeams, and scans the photoconductive drum by a plurality of light beams at one time, as disclosed in JP2005-250319A and JP2004-287292A. In such an image forming apparatus, the light beams from a surface-emitting laser having a plurality of light-emitting parts are together deflected by the polygon mirror, so as to simultaneously scan the surface of the photoconductive drum by a plurality of light beams.

For example, in the surface-emitting laser which is represented by VCSEL (vertical cavity surface emitting laser), and used in this apparatus, the light-emitting diodes are easily two-dimensionally arranged in one element, so the number of light beams used in the single scanning can be easily increased, compared with the end-face-emitting laser. However, it is difficult for this type of the surface-emitting laser to increase the output, and if the arrangement interval between the light-emitting parts is too short, the operating life of the element is significantly deteriorated by the heat interference between the light-emitting parts.

The invention disclosed in JP2001-272615A, for example, is proposed relative to the above problems. In this invention, each of the intervals of the light-emitting parts adjacently formed in the light source is equalized, so as to decrease the influence of the crosstalk by the heat from the light-emitting parts, and to maximize the arrangement density of the light-emitting parts. However, in this invention, the arrangement of the light-emitting parts is complex, and can not be easily achieved. The invention does not disclose a technique which reduces variations of the intervals of the scanning lines.

In addition, the invention disclosed in JP2005-250319A is an invention which combines a light source in which light-emitting parts are two-dimensionally arranged and a scanning optical system which scans the light beams emitted from the light source. However, this invention does not substantially disclose the arrangement of the light-emitting parts or a technique when conducting optical scanning by means of a light source having several tens of light-emitting parts.

SUMMARY OF THE INVENTION

It is, therefore, an object of the present invention to provide an optical scanning device which can increase an operating life of a light source having two-dimensionally arranged light-emitting portions, and can also reduce the deterioration in the optical characteristics by the heat from the light source.

Another object of the present invention is to provide an image forming apparatus which can reduce the running costs and can form a high quality image.

An optical scanning device according to one embodiment of the present invention is an optical scanning device which scans a scanned surface by a plurality of light beams in a main-scanning direction. The optical scanning device includes a light source having a plurality of light-emitting portions which emit the light beams, the light-emitting portions being two-dimensionally arranged in a plane parallel to the main-scanning direction and a sub-scanning direction orthogonal to the main-scanning direction via arrangement intervals in the main-scanning direction and the sub-scanning direction, a deflector which scans the light beams in the main-scanning direction, and a scanning optical system which images the scanned light beams onto the scanned surface.

Preferably, the arrangement intervals in the sub-scanning direction are an integral multiplication of a size of one light-emitting portion in the sub-scanning direction.

Preferably, scanning lines formed on the scanned surface with one scanning are formed via intervals according to the arrangement intervals, and scanning lines adjacent to the scanning lines in the sub-scanning direction are formed by multiple scanning.

Preferably, the arrangement intervals in the main-scanning direction and the arrangement intervals in the sub-scanning direction are both unequal.

Preferably, the arrangement interval of a central portion of the light source in the main-scanning direction is larger than the arrangement interval of both end portions of the light source in the main-scanning direction, and the arrangement interval of the central portion of the light source in the sub-scanning direction is larger than the arrangement interval of both end portions of the light source in the sub-scanning direction.

Preferably, the arrangement intervals become smaller toward both end portions of the main-scanning direction from a central portion of the light source, and become smaller toward both end portions of the sub-scanning direction from the central portion.

Preferably, the arrangement intervals become smaller toward both end portions of the main-scanning direction from a central portion of the light source.

Preferably, the arrangement intervals become smaller toward both end portions of the sub-scanning direction from a central portion of the light source.

Preferably, the optical scanning device further includes plural pairs of light-emitting portions in which the arrangement interval in the main-scanning direction is the largest, wherein out of the plural pairs of light-emitting portions, at least the arrangement interval of the pair of light-emitting portions located in furthermost positions in the sub-scanning direction from a central portion of the light source is the smallest in the arrangement intervals of the plural pairs of light-emitting portions in the sub-scanning direction.

Preferably, the light-emitting portions located in both ends in the sub-scanning direction are arranged in positions nearest to a central portion of the light source in the main-scanning direction.

Preferably, the plurality of light-emitting-portions includes the light-emitting portions in which the positions in the main-scanning direction are the same.

Preferably, the arrangement intervals in the sub-scanning directions are unequal.

Preferably, the arrangement intervals of the light-emitting portions in the sub-scanning direction, which are adjacently arranged in a central portion of the sub-scanning direction, are larger than the arrangement intervals of the light source in the sub-scanning direction, which are adjacently arranged in other portions of the sub-scanning direction.

Preferably, the plurality of the light-emitting portions is arranged in different positions in the sub-scanning direction, and where the number of the light-emitting portions is k, the intervals of the sub-scanning direction of the scanning lines located in both ends of the sub-scanning direction, which are formed on the scanned surface with one scanning, are L1, and the intervals of the sub-scanning direction of the scanning lines adjacent in the sub-scanning direction, which are formed on the scanned face by multiple scanning, are L2, L1, k, and L2 satisfy L1>(k−1)×L2.

Preferably, L1, k, and L2 satisfy $2k \times L2 \leq L1 \leq 3k \times L2$.

Preferably, the optical scanning device further includes a light guide optical system having a first optical system which couples the light beams emitted from the light-emitting portions, a second optical system which concentrates the coupled light beams in the sub-scanning direction near a deflection face of the deflector, and the scanning optical system, wherein an absolute value of a lateral magnification of the main-scanning direction of the light guide optical system is larger than an absolute value of a lateral magnification of the sub-scanning direction.

Preferably, the second optical system includes an optical element which advances a pair of light beams emitted from the light-emitting portions located at furthermost positions in the sub-scanning direction to be parallel or to approach each other after passing through the second optical system.

Preferably, the optical scanning device further includes an intermediate member, which retains at least one end of the main-scanning direction of the optical system and is attached to an optical housing which retains the second optical system.

Preferably, the light beam has a beam diameter in the main-scanning direction larger than a beam diameter in the sub-scanning direction.

Moreover an image forming apparatus according to one embodiment of the present invention is an image forming apparatus which fixes a toner image formed according to an electrostatic latent image obtained from information regarding an image onto a recording medium. The image forming apparatus includes an optical scanning device according to one embodiment of the present invention, a photoconductive body having the scanned face on which the electrostatic latent image is formed by the optical scanning device, a development unit, which visualizes the electrostatic latent image formed on the scanned face of the photoconductor as the toner image, and a transfer unit which fixes the toner image visualized by the development unit onto the recording medium.

BRIEF DESCRIPTION OF THE DRAWINGS

The accompanying drawings are included to provide a further understanding of the invention, and are incorporated in and constitute a part of this specification. The drawings illustrate embodiments of the invention and, together with the specification, serve to explain the principle of the invention.

FIG. 8 is an explanatory view illustrating a scanning method of a writing area 201a.

FIG. 9 is another explanatory view illustrating the scanning method of the writing area 201a.

FIG. 20A is a view illustrating the field curvature in the main-scanning direction corresponding to ch01 (VCSEL 1), ch40 (VCSEL 40), and axial (corresponding to the light-emitting point in the position Y=0, Z=0).

FIG. 20B is a view illustrating the field curvature in the sub-scanning direction corresponding to ch01 (VCSEL 1), ch40 (VCSEL 40), and axial.

FIG. 21C is a graph illustrating scanning curves in a photoconductive drum.

FIG. 28 is a view describing a scanning method of a writing area 201a.

FIG. 29 is view describing another scanning method of the writing area 201a.

DETAILED DESCRIPTION OF THE PREFERRED EMBODIMENTS

Hereinafter, a first embodiment of the present invention will be described with reference to FIGS. 1-16.

Figure 1:
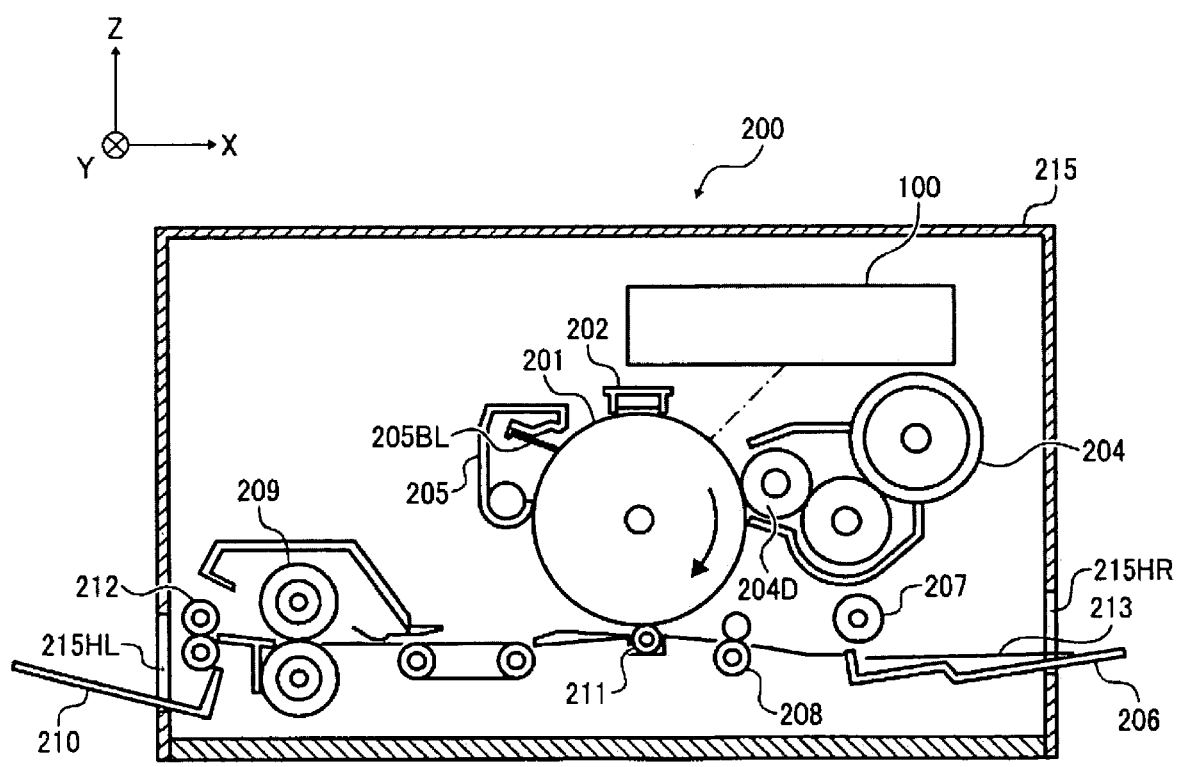
FIG. 1 is a view illustrating a schematic structure of a printer 200 according to a first embodiment of the present invention.

FIG. 1 illustrates a schematic structure of a printer 200 as an image forming apparatus according to the first embodiment of the present invention.

The printer 200 is a color printer which prints an image by transferring a toner image onto paper by means of the Carlson process. As illustrated in FIG. 1, this printer 200 includes an optical scanning device 100, a photoconductive drum 201, a charger 202, a toner cartridge 204, a cleaning case 205, a paper feeding tray 206, a paper feeding roller 207, a resist roller pair 208, a transfer charger 211, a fixing roller 209, a paper discharging roller 212, a paper discharging tray 210, and a housing 215 which contains these.

The approximate rectangular solid housing 215 includes openings 215HR, 215HL, each of which communicates with an internal space, on a side wall of +X side and a side wall of −X side, respectively.

The optical scanning device 100 is disposed in the upper part of the internal space of the housing 215, deflects a light beam modulated according to image information in a main-scanning direction (Y-axis direction in FIG. 1), and scans the surface of the photoconductive drum 201. In addition, the structure of the optical scanning device 100 will be described later.

The photoconductive drum 201 is a cylindrical member including on the surface thereof a photoconductive layer having a property which changes into a conductive property when an optical beam is irradiated. The photoconductive drum 201 is disposed below the optical scanning device 100 such that the longitudinal direction of the drum becomes the Y-axis direction, and rotates in the clockwise direction in FIG. 1 (arrow direction in FIG. 1) by a rotation mechanism (not shown). The photoconductive drum 201 is surrounded by the charger 202 disposed in the position of 12 o'clock (upper side of the drum), the toner cartridge 204 disposed in the position of about 2 o'clock, the transfer charger 211 disposed in the position of 6 o'clock, and the cleaning case 205 disposed in the position of about 10 o'clock in FIG. 1.

The charger 202 is disposed to have a predetermined clearance relative to the surface of the photoconductive drum 201, and charges the surface of the photoconductive drum 201 at a predetermined voltage.

The toner cartridge 204 includes a cartridge body into which black image component toners are filled, and a development roller charged by a voltage having a polarity opposite to the polarity of the photoconductive drum 201, for example. The toner cartridge 204 supplies the toners filled in the cartridge body to the surface of the photoconductive drum 201 via the development roller.

The cleaning case 205 includes a rectangular cleaning blade 205BL having the longitudinal direction as the Y-axis direction, and is disposed such that one end thereof has contact with the surface of the photoconductive drum 201. The toners absorbed onto the surface of the photoconductive drum 201 are separated by the cleaning blade 205BL along the rotation of the photoconductive drum 201, and collected inside the cleaning case 205.

The transfer charger 211 is disposed to have a predetermined clearance relative to the surface of the photoconductive drum 201, and is applied with a voltage having a polarity opposite to the polarity of the charger 202.

The paper feeding tray 206 is arranged such that its end portion on the +X side projects from the opening 215HR formed on the side wall of the housing on the +X side in FIG. 1, and can contain a plurality of paper sheets 213 to be supplied from an external side.

The paper feeding roller 207 draws the paper sheets 213 one by one from the paper feeding tray 206, and guides the drawn paper sheets 213 to the space formed by the photoconductive drum 201 and the transfer charger 211 via the resistor roller pair 208 having a pair of rotation rollers.

The fixing roller 209 includes a pair of rotation rollers, and heats and presses the paper sheets 213, and guides the paper sheets 213 to the paper discharging roller 212.

The paper discharging roller 212 includes a pair of rotation rollers, and sequentially stacks the paper sheets 213 fed by the fixing roller 209 onto the paper discharging tray 210 disposed such that its end portion on the −X side projects from the opening 215HL formed on the side wall of the housing 215 on the −X side in FIG. 1.

Figure 2A:
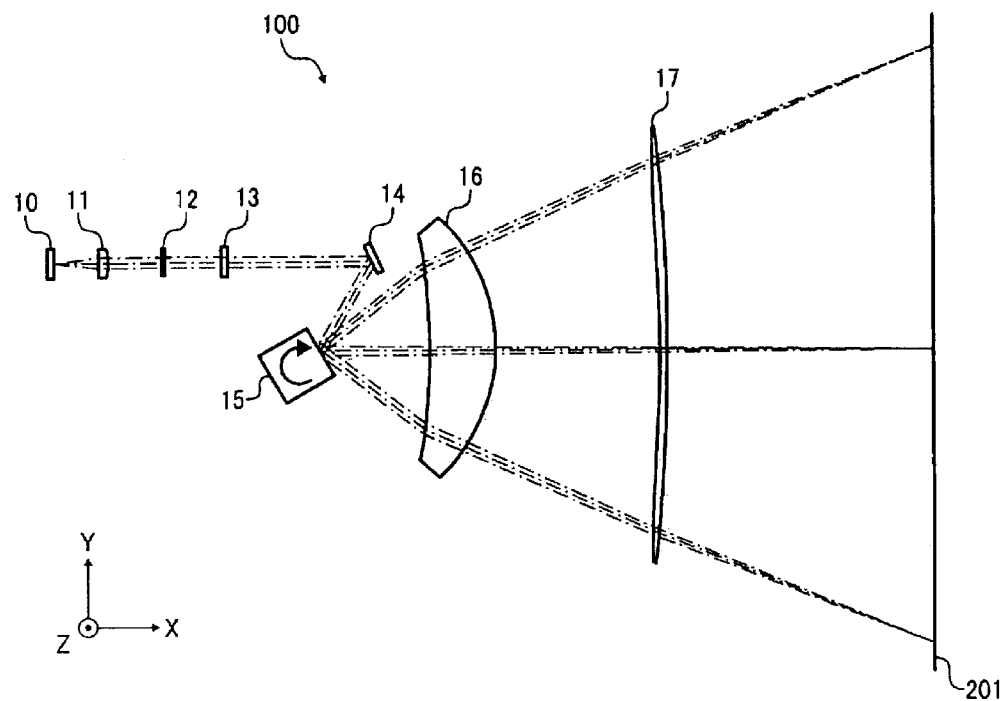
FIG. 2A is a plan view illustrating a schematic structure of an optical scanning device 100 for use in the printer 200 of the first embodiment of the present invention.
Figure 2B:
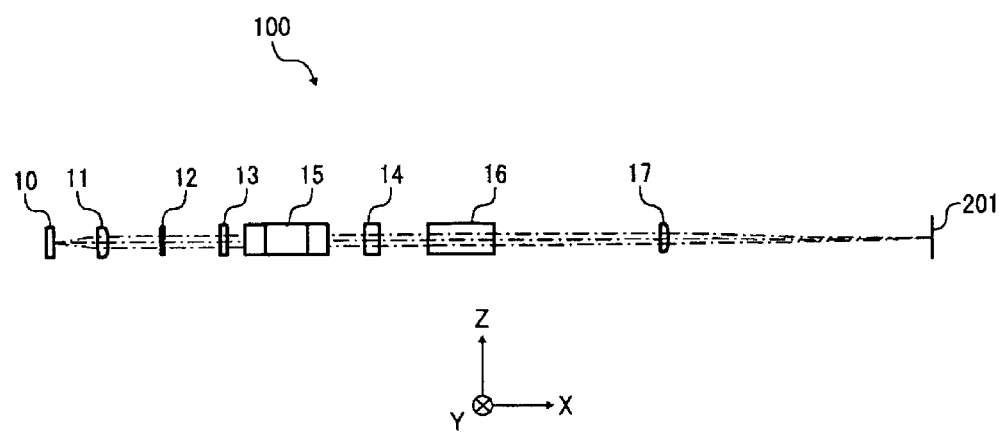
FIG. 2B is a side view illustrating a schematic structure of the optical scanning device 100 for use in the printer 200 according to the first embodiment of the present invention.

Next, the structure of the optical scanning device 100 will be described. FIGS. 2A, 2B illustrate the schematic structures of the optical scanning device 100. The optical scanning device 100 scans a writing area on the surface of the photoconductive drum 201 by means of a plurality of laser lights modulated according to image data, so as to sequentially form points corresponding to pixels on the writing area in the main-scanning direction (Y-axis direction in FIG. 2), so that a plurality of scanning lines is formed.

As illustrated in FIG. 2A, 2B, the optical scanning device 100 includes a light source 10, a coupling lens 11, an aperture member 12, a linear image forming lens 13, a reflection mirror 14, sequentially arranged on the +X side of the light source 10 in FIGS. 2A, 2B, a polygon mirror 15 arranged on the −Y side of the reflection mirror in FIGS. 2A, 2B, a first scanning lens 16, and a second scanning lens 17 sequentially arranged on the +X side of the polygon mirror in FIGS. 2A, 2B.

Figure 3:
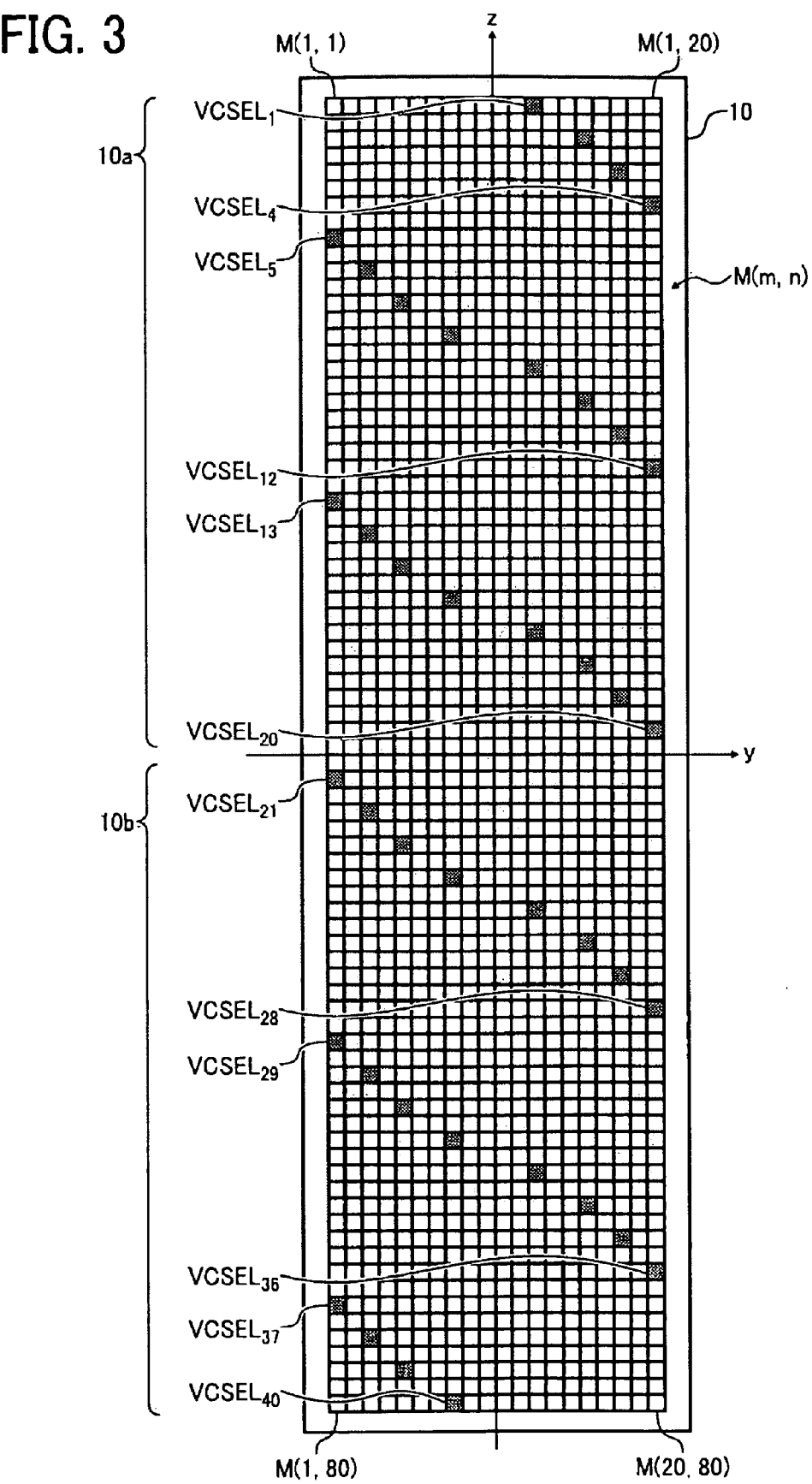
FIG. 3 is a view illustrating the arrangement of VCSELs in a light source 10 according to the first embodiment of the present invention.

FIG. 3 illustrates a plurality of VCSELs formed in the light source 10 together with the matrix M (m, n). This matrix M (m, n) is a matrix having 80 lines and 20 columns (m=1, 2, 3...80, n=1, 2, 3...20). One matrix corresponds to one point constituting a scanning line to be formed in the writing area of the photoconductive drum 201. The light source 10 includes a total of 40 two-dimensionally formed VCSELs having 4 VCSELs 1 to 4 disposed in the positions corresponding to the matrixes, M (1, 13), M (3, 16), M (5, 18), and M (7, 20), respectively, 8 VCSELs 5 to 12 disposed in the positions corresponding to the matrixes, M (9, 1), M (11, 3), M (13, 5), M (15, 8), M (17, 13), M (19, 16), M (21, 18), and M (23, 20), respectively, 8 VCSELs 13 to 20 disposed in the positions corresponding to the matrixes, M (25, 1), M (27, 3), M (29, 5), M (31, 8), M (33, 13), M (35, 16), M (37, 18), and M (39, 20), respectively, 8 VCSELs 21 to 28 disposed in the positions corresponding to the matrixes, M (42, 1), M (43, 3), M (46, 5), M (48, 8), M (50, 13), M (52, 16), M (54, 18), and M (56, 20), respectively, 8 VCSELs 29 to 36 disposed in the positions corresponding to the matrixes, M (58, 1), M (60, 3), M (62, 5), M (64, 8), M (66, 13), M (68, 16), M (70, 18), and M (72, 20), respectively, and 4 VCSELs 37 to 40 disposed in the positions corresponding to the matrixes, M (74, 1), M (76, 3), M (78, 5), and M (80, 8), respectively. Hereinafter, 20 VCSELs 1 to 20 are referred to as a first light-emitting group 10$a$ and 20 VCSELs 21 to 40 are referred to as a second light-emitting group 10$b$. In addition, for reasons of expediency, the y-z coordinate is defined, which uses as the origin the center of the plane onto which the VCSELs of the light source 10 are arranged.

The coupling lens 11 is has the focal length of 46.0 mm, and forms 40 light beams emitted from the light source 10 into substantially parallel light beams.

The aperture member includes a rectangular or ellipsoidal opening having 5.64 mm in the Y-axis direction (main-scanning direction) and 2.2 mm in the Z-axis direction (sub-scanning direction), and is disposed such that the center of the opening is located near the focal point of the coupling lens.

The linear image forming lens 13 is a cylindrical lens having the focal length of 104.7 mm, and concentrates the light beams which have passed through the aperture member 12 onto the deflection faces of the polygon mirror 15.

The polygon mirror 15 is a quadrangular prism member having a square top plane inscribed in a circle with a radius of 7 mm, and four side planes provided with deflection faces. This polygon mirror 15 rotates at a constant angular speed in the direction of the arrow illustrated in FIG. 2A by means of a rotation mechanism (not shown). By this rotation, the light beams entered into the polygon mirror 15 are scanned in the Y-axis direction.

The first and second scanning lenses 16, 17 are disposed such that the distances from the deflection faces of the polygon mirror 15 to the incidence planes are 46.3 mm and 149.5 mm, respectively, and are resin scanning lenses, for example, with the thicknesses of the centers (on-optical axis) of 13.5 mm and 3.5 mm, respectively. The optical surface shape of each of the scanning lenses is expressed by the functions shown by the following formulas 1, 2. Where, Y is the coordinate of the main-scanning direction with the origin at the optical axis position as the origin, Z is the coordinate of the sub-scanning direction with the origin at the optical axis position, Rm is the curvature radius of a lens, a 00, a 01, a 02, . . . are the aspheric coefficients of the shapes in the main-scanning direction, Rso is the curvature on the optical axis of the sub-scanning direction, and b 00, b 01, b 02, . . . are the aspheric coefficients of the shapes in the sub-scanning direction. In addition, the value of each of the coefficients is shown in the following Table 1.

TABLE 1

(FORMULA 1)
$$X(Y) = \frac{\frac{Y^2}{R_m}}{1 + \sqrt{1 - (1 + a_{00}) \cdot \left(\frac{Y}{R_m}\right)^2}} + a_{01} \cdot Y + a_{02} \cdot Y^2 + a_{03} \cdot Y^3 + a_{04} \cdot Y^4 + \ldots$$

(FORMULA 2)
$$Cs(Y) = \frac{1}{R_{S0}} + b_{01} \cdot Y + b_{02} \cdot Y^2 + b_{03} \cdot Y^3 + \ldots$$

| | FIRST SCANNING LENS | | SECOND SCANNING LENS | |
|---|---|---|---|---|
| | FIRST PLANE | SECOND PLANE | FIRST PLANE | SECOND PLANE |
| $R_m$ | −120 | 59.279 | −10000 | 540.625 |
| $R_{s0}$ | −500 | −600 | 521.92 | −40.751 |
| $a_{00}$ | 0 | 0 | 0 | 0 |
| $a_{04}$ | $8.88524 \times 10^{-7}$ | $9.22409 \times 10^{-7}$ | $3.28563 \times 10^{-7}$ | $1.27798 \times 10^{-7}$ |
| $a_{06}$ | $-2.62914 \times 10^{-10}$ | $6.77825 \times 10^{-11}$ | $-7.08542 \times 10^{-11}$ | $-4.62873 \times 10^{-11}$ |
| $a_{08}$ | $2.18464 \times 10^{-14}$ | $-4.11244 \times 10^{-14}$ | $6.26922 \times 10^{-15}$ | $4.04921 \times 10^{-15}$ |
| $a_{10}$ | $1.36766 \times 10^{-17}$ | $1.3728 \times 10^{-17}$ | $-2.73157 \times 10^{-19}$ | $-1.65975 \times 10^{-19}$ |
| $a_{12}$ | $-3.13542 \times 10^{-21}$ | $2.06956 \times 10^{-21}$ | $4.73881 \times 10^{-24}$ | $2.58548 \times 10^{-24}$ |
| $b_{01}$ | 0 | $-1.59477 \times 10^{-6}$ | $-7.57567 \times 10^{-7}$ | 0 |
| $b_{02}$ | 0 | $-4.33213 \times 10^{-6}$ | $-1.1328 \times 10^{-6}$ | $2.31146 \times 10^{-7}$ |
| $b_{03}$ | 0 | $4.98199 \times 10^{-9}$ | $2.60617 \times 10^{-10}$ | 0 |
| $b_{04}$ | 0 | $-2.85938 \times 10^{-9}$ | $7.89614 \times 10^{-11}$ | 0 |
| $b_{05}$ | 0 | $-2.67713 \times 10^{-12}$ | $-5.02709 \times 10^{-14}$ | 0 |
| $b_{06}$ | 0 | $2.87783 \times 10^{-13}$ | $1.40512 \times 10^{-14}$ | 0 |
| $b_{07}$ | 0 | $-1.91653 \times 10^{-15}$ | $4.55389 \times 10^{-18}$ | 0 |
| $b_{08}$ | 0 | $2.04238 \times 10^{-15}$ | $-2.01401 \times 10^{-18}$ | 0 |
| $b_{09}$ | 0 | $1.01413 \times 10^{-18}$ | $-1.54602 \times 10^{-22}$ | 0 |
| $b_{10}$ | 0 | $-6.7299 \times 10^{-19}$ | $7.48935 \times 10^{-23}$ | 0 |

Figure 4A:
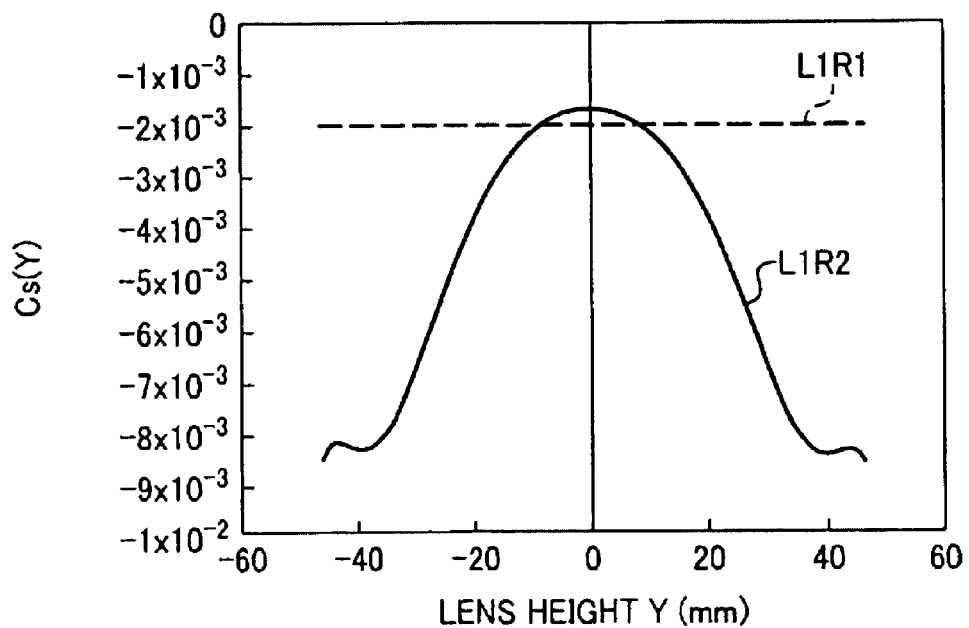
FIG. 4A is a view illustrating a relationship between functions Cs (Y) presenting an optical surface shape of a first scanning lens 16 of the optical scanning device 100 and lens heights in a sub-scanning direction.

FIG. 4A illustrates the relationship between the lens heights Y in the sub-scanning direction and the functions Cs (Y) presenting the optical surface shape of the first scanning lens 16 shown by the formula (2). In FIG. 4A, the curved line shown by the dotted line illustrates the optical surface shape of the incidence plane L1R1 and the curved line shown by the solid line illustrates the optical surface shape of the emission plane L1R2.

Figure 4B:
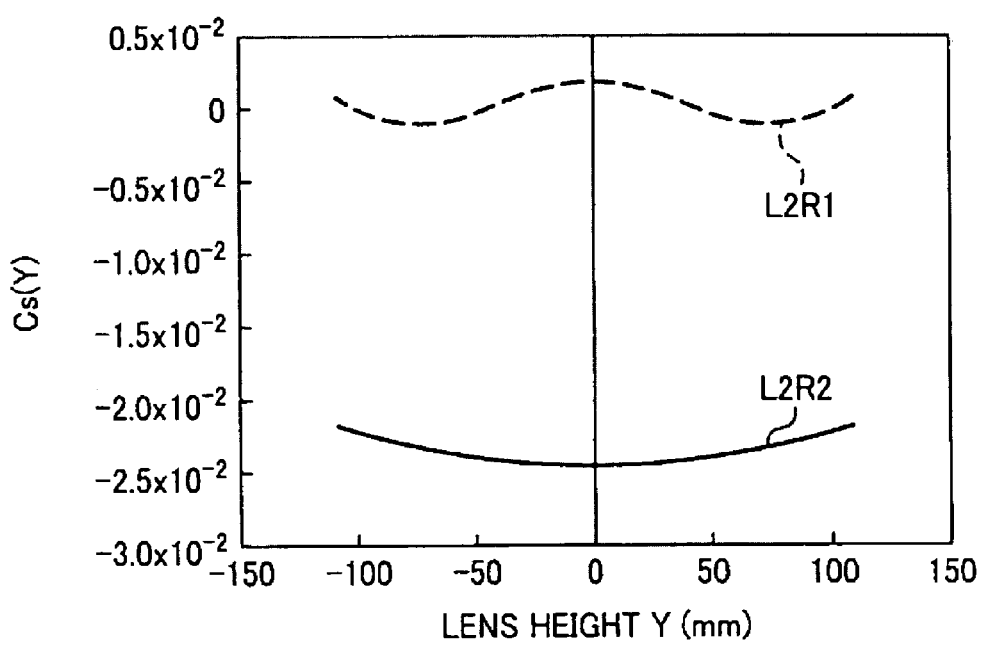
FIG. 4B is a view illustrating a relationship between functions Cs (Y) presenting an optical surface shape of a second scanning lens 17 of the optical scanning device 100 and lens heights in the sub-scanning direction.

FIG. 4B illustrates the relationship between the lens heights Y in the sub-scanning direction and the functions Cs (Y) presenting the optical surface shape of the second scanning lens 17 shown by the formula (2). In FIG. 4B, the curved line shown by the dotted line illustrates the optical surface shape of the incidence plane L2R1 and the curved line shown by the solid line illustrates the optical surface shape of the emission plane L2R2.

Figure 5A:
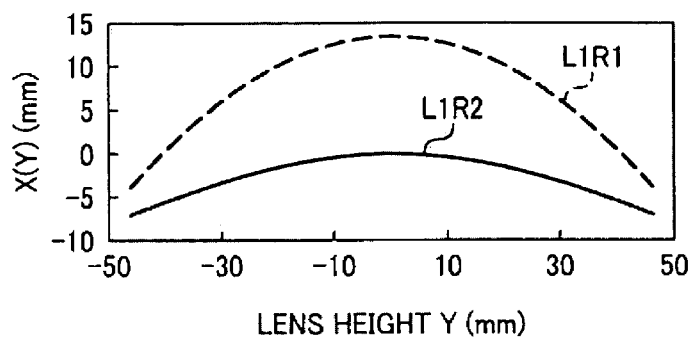
FIG. 5A is a view illustrating a sectional shape of the first scanning lens 16 of the optical scanning device 100 in a main-scanning direction.

FIG. 5A illustrates the sectional shape X (Y) in the main-scanning direction of the first scanning lens 16 shown by the formula 1. In FIG. 5A, the curved line shown by the dotted line illustrates the optical surface shape of the incidence plane L1R1 and the curved line shown by the solid line illustrates the optical surface shape of the emission plane L1R2.

Figure 5B:
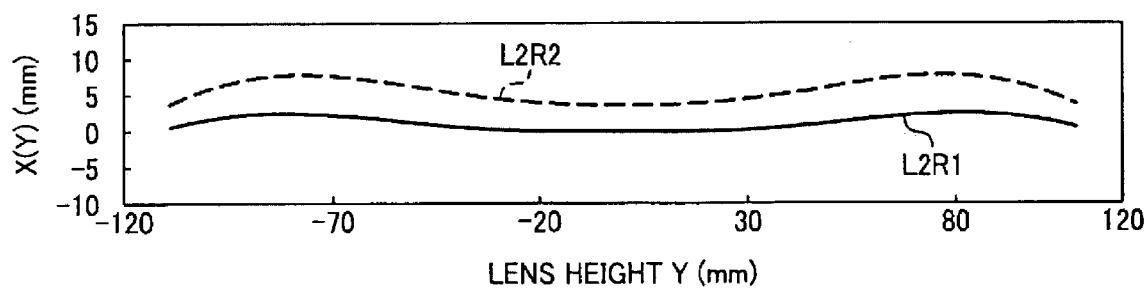
FIG. 5B is a view illustrating a sectional shape of a second scanning lens 17 of the optical scanning device 100 in the main-scanning direction.

FIG. 5B illustrates the sectional shape X (Y) in the main-scanning direction of the second scanning lens 17 shown by the formula 1. In FIG. 5B, the curved line shown by the dotted line illustrates the optical surface shape of the incidence plane L2R1 and the curved line shown by the solid line illustrates the optical surface shape of the emission plane L2R2.

In each of FIGS. 5A, 5B, the vertical axis shows the coordinates X in the optical axis direction, and the horizontal axis shows the lens heights Y. In addition, the optical axis indicates an axis passing through the central point in the sub-scanning direction where Y=0 in the formula 2, unless it is specifically defined.

The lateral magnification of the sub-scanning direction of the entire optical system included in the optical scanning device 100 is 2.2 times and the lateral magnification of the sub-scanning direction of the optical system arranged between the polygon mirror 15 and the surface to be scanned (scanned surface) is −0.97 times. In the optical scanning device 100, the diameter of the beam spot in the scanned surface is set to 52 μm in the main-scanning direction and 55 μm in the sub-scanning direction.

Figure 6A:
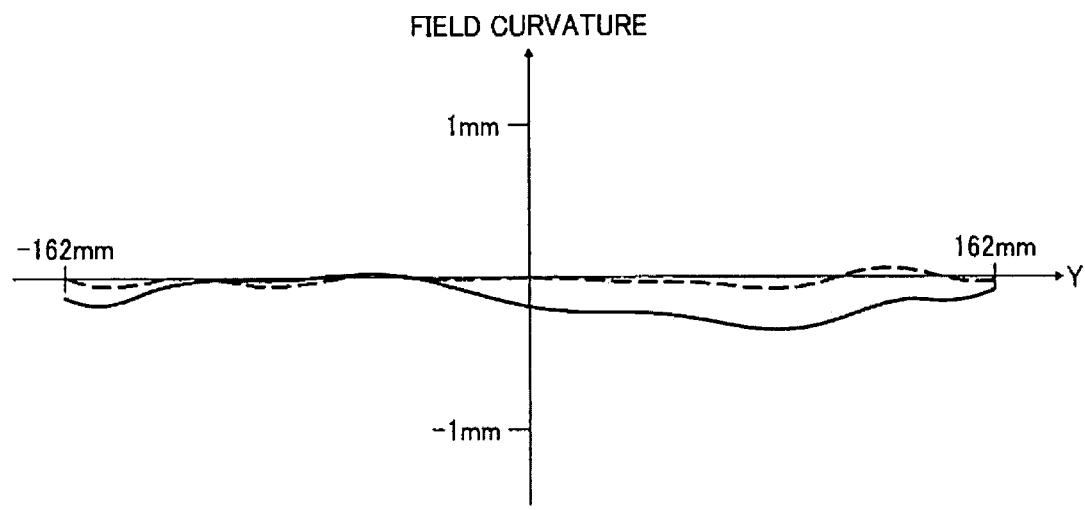
FIG. 6A is a view illustrating field curvature in the sub-scanning direction and field curvature in the main-scanning direction relative to image heights Y.
Figure 6B:
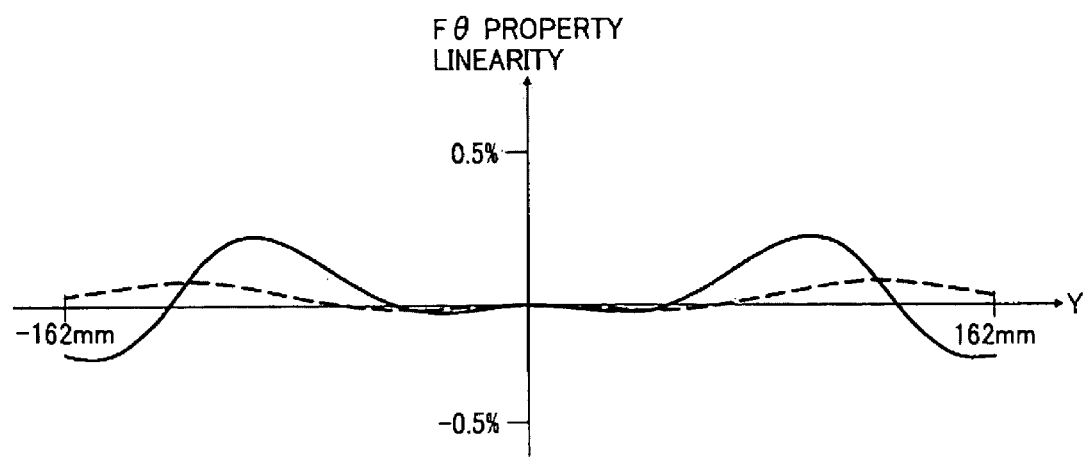
FIG. 6B is a view illustrating linearity and fθ properties of a light beam relative to image heights Y.

In FIG. 6A, the solid line illustrates the field curvature in the sub-scanning direction and the dotted line illustrates the field curvature in the main-scanning direction relative to the image heights Y when scanning the scanned surface by the optical scanning device 100. In FIG. 6B, the solid line illustrates the linearity and the dotted line illustrates fθ properties relative to the image heights Y. According to FIGS. 6A, 6B, the field curvature in the main and sub-scanning directions converges within ±1 mm, and also the linearity and the light beam fθ properties relative to the image heights Y converge within 0.5%, and the variations of the beam spot diameters of the light beams are significantly small although the thicknesses of the first and second scanning lenses are reduced as described above.

Figure 7:
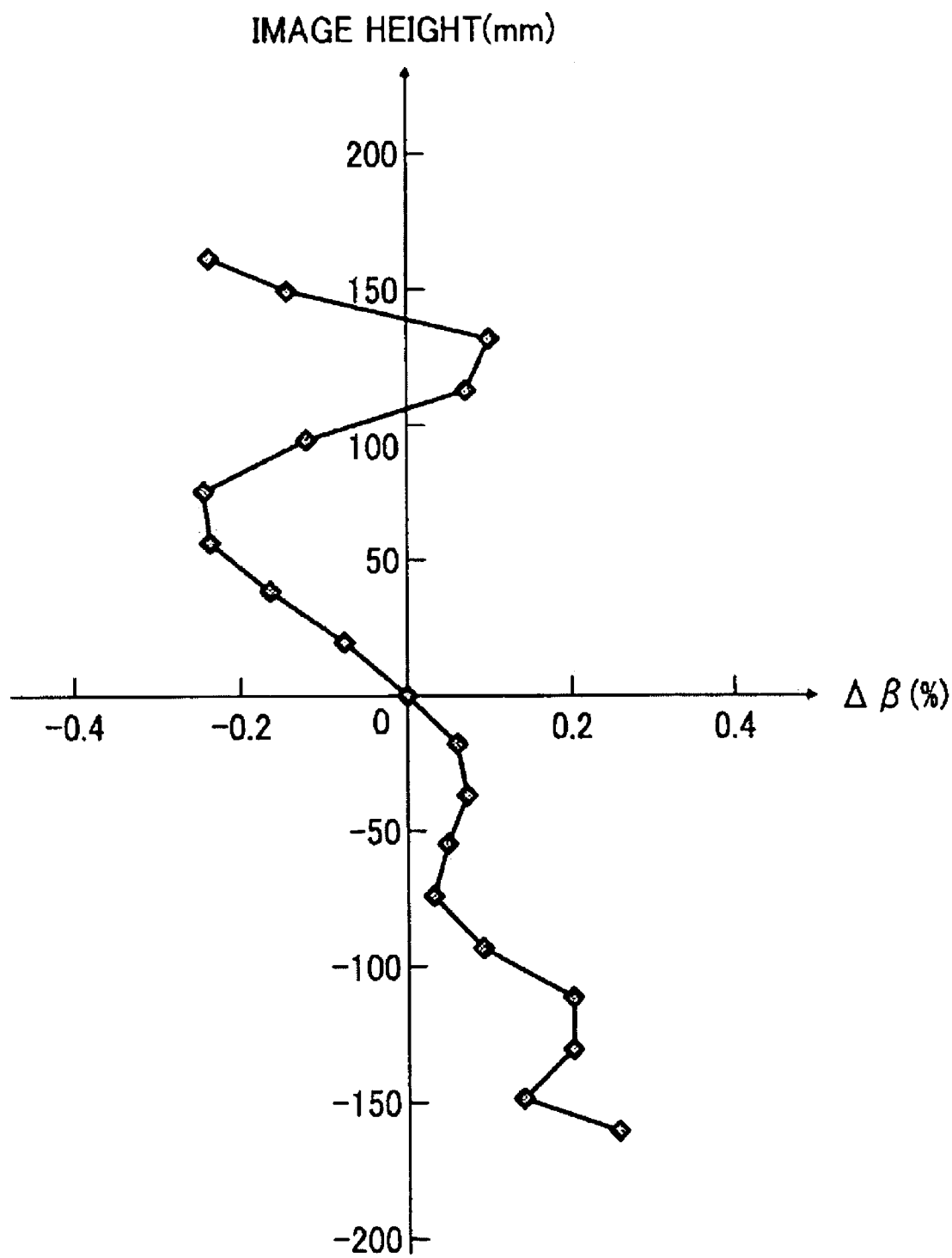
FIG. 7 is a view illustrating lateral magnification deviations Δβ in the sub-scanning direction.

FIG. 7 illustrates the lateral magnification deviations Δβ in the sub-scanning direction. According to FIG. 7, the lateral magnification deviations Δβ in the sub-scanning direction are curved within ±5%, which are approximately constant.

Next, the operation of the above-described printer 200 will be described. When the image information from an upper level device (not shown) is received, the optical scanning device 100 is driven by the modulation data according to the image information, and the 40 light beams are emitted from the light source 10. These light beams condense onto the deflection faces of the polygon mirror 15 by the linear image forming lens 13 via the coupling lens 11 and the aperture member 12. The light beams condensed onto the deflection faces of the polygon mirror 15 are scanned in the Y-axis direction by the polygon mirror 15. After the light beams enter into the first scanning lens 16 and the deflection speed is adjusted, the light beams condense onto the surface of the photoconductive drum 201 via the second scanning lens 17.

On the other hand, the surface of the photoconductive drum 201 is changed at a predetermined voltage by the charger 202, so that an electric charge is distributed at a constant charge density. If the surface of the photoconductive drum 201 is scanned by the light beams scanned by the polygon mirror 15, a plurality of scanning lines which is defined by the electric charge distribution is formed on the writing area of the surface of the photoconductive drum 201.

Figure 8:
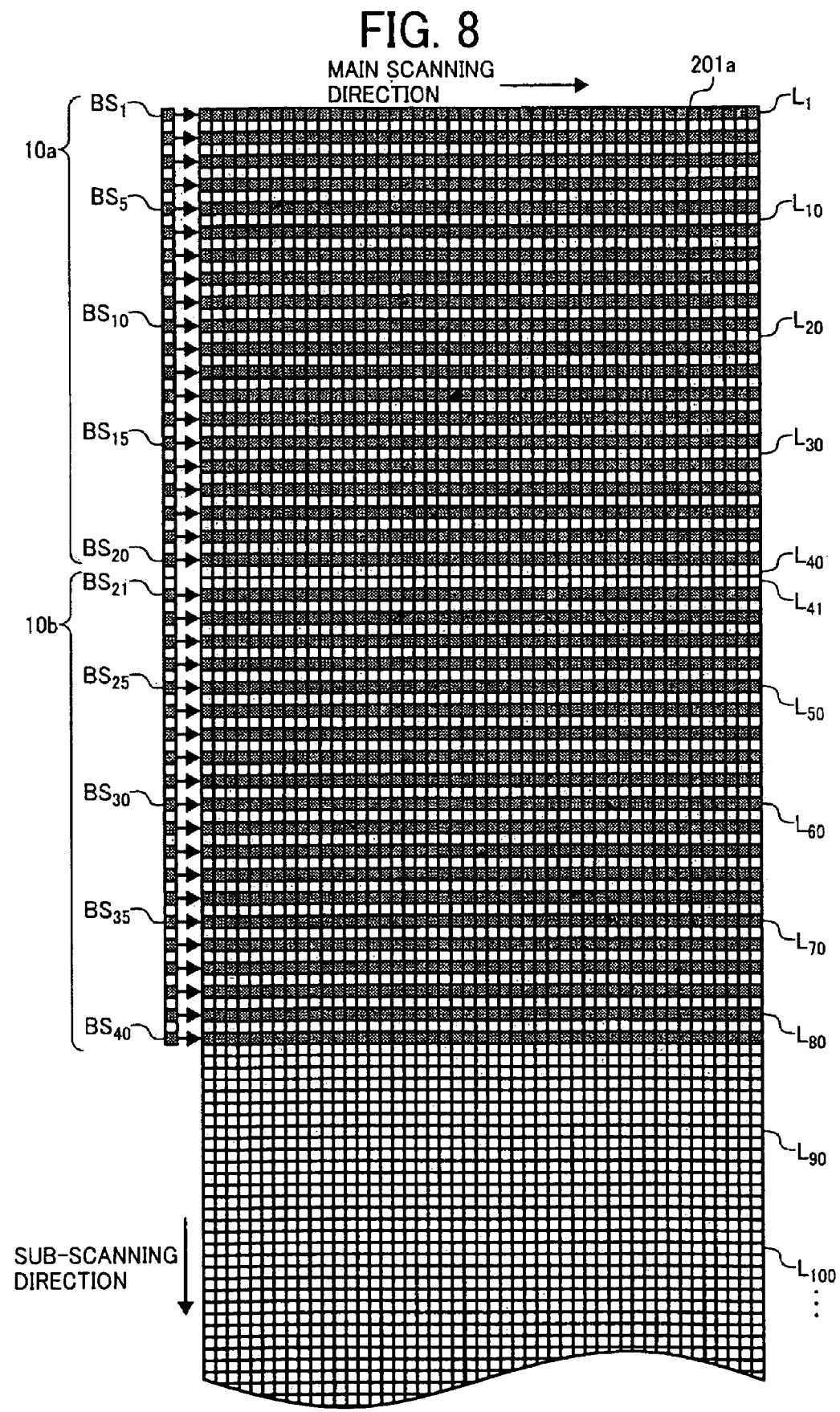

FIG. 8 schematically illustrates the writing area 201a formed on the photoconductive drum 201 and the 40 beam spots BSs 1 to 40 which move in the main-scanning direction on the writing area 201a with the first scanning. Each of the beam spots BSs 1 to 40 is formed by each of the light beams emitted from each of the VCSELs 1 to 40 formed on the light source 10. In addition, one grid illustrated in FIG. 8 shows an area corresponding to one pixel.

If the scanning lines formed on the writing area 201a are the scanning lines L1, L2, . . . Li, toward the sub-scanning direction, the odd-numbered scanning lines (L1, L3, . . . L39) out of the scanning lines from Ls 1 to 40 are formed on the writing area 201a as illustrated in FIG. 8 by the movement of the 20 beam spots BSs 1 to 20 formed by the light beams from the first light-emitting group 10a in the main-scanning direction with the first scanning. In addition, by the movement of the 20 beam spots BSs 21 to 40 formed by the light beams from the second light-emitting group 10b in the main-scanning direction, the even-numbered scanning lines (L42, L44, . . . L82) out of the scanning lines from Ls 41 to 82 are formed on the writing area 201a.

Figure 9:
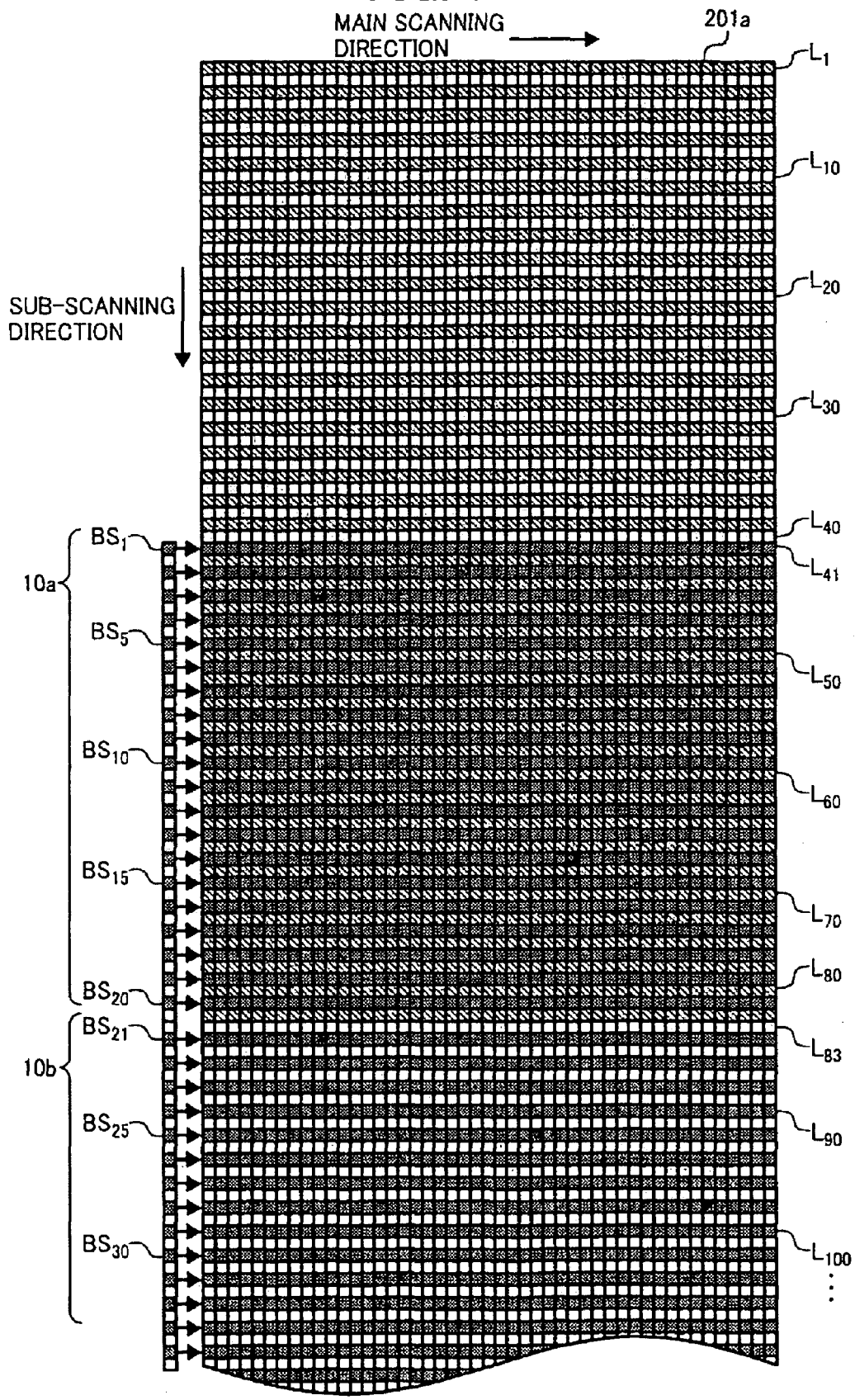

FIG. 9 schematically illustrates the writing area 201a formed on the photoconductive drum 201 and the 40 beam spots BS1-BS40 which move in the main-scanning direction on the writing area 201a with the second scanning. With this second scanning, by the movement of the 20 beam spots BSs 1 to 20 formed by the light beams from the first light-emitting group 10a in the main-scanning direction, the odd-numbered scanning lines (L41, L43, L81) out of the scanning lines from Ls 41 to 82 are formed on the writing area 201a, as illustrated in FIG. 9. In addition, by the movement of the 20 beam spots Bs 21 to 40 formed by the light beams from the second light-emitting group 10b in the main-scanning direction, the even-numbered scanning lines (L84, L86, L124) out of the scanning lines from Ls 83 to 124 are formed in the writing area 201a.

More particularly, referring to FIG. 9, if the scanning (t+first time scanning) by the light beams from the first light-emitting group 10a is conducted after the scanning (t-time scanning) by the light beams from the second light-emitting group 10b is conducted, the scanning lines Ls 41 to 82 are adjacently formed in the writing area 201a. After that, by repeating scanning more than once such as t+second time scanning and t+three time scanning, the scanning lines after the scanning line L83 are adjacently formed in the writing area 201a, so that an electrostatic latent image according to the image data is formed.

After the electrostatic latent image is formed on the surface of the photoconductive drum 201, the toners are supplied onto the surface of the photoconductive drum 201 by the development roller 204D of the toner cartridge 204. In this case, since the development roller 204D of the toner cartridge 204 is charged by a voltage having a polarity opposite to the polarity of the photoconductive drum 201, the toners adhered onto the development roller 204 are charged with the same polarity as the photoconductive drum 201. Therefore, the toners do not adhere onto the part of the surface of the photoconductive drum 201, which has the electric charge distribution, and the toners only adhere onto a part scanned by the light beams, so as to form a toner image in which the electrostatic latent image is visualized on the surface of the photoconductive drum 201. After this toner image is transferred onto the paper sheet 213 by the transfer charger 211, the toner image is fixed on the paper 213 by the fixing roller 209, and then the image is formed on the paper sheet 213. The paper sheet 213 in which the image is formed as described above is discharged by the paper discharging roller 212, and is sequentially stacked onto the paper discharging tray 210.

As described above, in the optical scanning device 100 according to the present embodiment, the 40 VCSELs formed in the light source 10 are arranged such that the arrangement intervals in the main-scanning direction are reduced as they approach the outside (+y side and −y side in FIG. 3) from the center portion (near intersection of y -axis with Z-axis). In addition, regarding the sub-scanning direction, the interval between VCSEL 20 and VCSEL 21 is larger than the interval between other adjacent VCSELs. By this uneven arrangement of the VCSELs, thermal interference relative to the VCSEL arranged in the central portion of the light source 10 from another VCSEL can be avoided, the operating life of the light source 10 can be improved, and also the fluctuation in the optical characteristics by uneven heat can be avoided.

It is desirable for the interval between VCSEL 1 and VCSEL 40 located in both ends of the sub-scanning direction, the interval between VCSEL 5 and VCSEL 4, the interval between VCSEL 13 and VCSEL 12, the interval between VCSEL 21 and VCSEL 20, the interval between VCSEL 29 and VCSEL 28, and the interval between VCSEL 37 and VCSEL 36 located in both ends of the main-scanning direction to be as small as possible, in order not to generate aberrations, and in order to downsize the optical element. For this reason, the arrangement intervals of the VCSELs are reduced in the peripheral portion of the light source 10, which has a high cooling effect of VCSELs, and thus, the light source 10 can be downsized.

In general, the variation in the interval of the scanning lines by the light beams from the two VCSELs arranged in the furthermost positions in the main-scanning direction increases by a manufacturing error of parts. In the optical scanning device 100 according to the present embodiment, out of the 5 pairs of VCSELs including the combination of VCSEL 4 and VCSEL 5, the combination of VCSEL 12 and VCSEL 13, the combination of VCSEL 20 and VCSEL 21, the combination of VCSEL 28 and VCSEL 29, and the combination of VCSEL 36 and VCSEL 37, which are adjacently arranged in the Z-axis direction (sub-scanning direction) and are arranged in the farthest positions in the Y-axis direction (main-scanning direction), the interval of the sub-scanning direction between VCSEL 4 and VCSEL 5 in the combination of VCSEL 4 and VCSEL 5 and the interval of the sub-scanning direction between VCSEL 36 and VCSEL 37 in the combination of VCSEL 36 and VCSEL 37, which are arranged in both ends of the main-scanning direction, are smaller than the interval of the sub-scanning direction between VCSEL 20 and VCSEL 21 in the combination of VCSEL 20 and VCSEL 21, which are arranged in the central portion of the sub-scanning direction. By arranging the VCSELs as described above, the variations between the scanning lines to be formed in the writing area 201a can be reduced.

Regarding the VCSELs located in both ends of the sub-scanning direction, the fluctuation in the scanning positions by temperature is the largest. Especially, when using the resin scanning lenses 16, 17 for reducing the costs, this problem becomes prominent. Consequently, in the optical scanning device 100 according to the present embodiment, by arranging a pair of VCSEL 1 and VCSEL 40 located in the furthermost positions in the sub-scanning direction in the positions nearest to the Z-axis which is the center in the main-scanning direction, the light beams from VCSEL 1 and VCSEL 40 pass through near the optical axis of each element of the optical system. Thereby, the influence of the manufacturing errors of the parts in both ends of the sub-scanning direction can be reduced, and the variations between the intervals of the scanning lines can be decreased.

In the optical scanning device 100 of the present embodiment, the scanning lines alternately formed by the light beams from the first light-emitting group 10a in the present scanning are adjacently formed relative to the scanning lines alternately formed by the optical beams from the second light-emitting group 10b in the previous scanning, in the scanning lines adjacently formed in the writing area 201a. In addition, the scanning lines alternately formed by the optical beams from the first light-emitting group 10a in the next scanning are adjacently formed relative to the scanning lines alternately formed by the optical beams from the second light-emitting group 10b in the present scanning. As described above, the arrangement intervals of the VCSELs in the sub-scanning direction, which are arranged in the light source 10, have allowance, and the arrangement intervals of the VCSELs in the sub-scanning direction are two times or more, compared with the case where the light source 10 is arranged corresponding to the adjacent scanning lines on the writing area 201a. For this reason, the thermal interference between the VCSELs can be reduced, and as a result, the thermal deterioration of the light source 10 can be controlled.

Figure 10A:
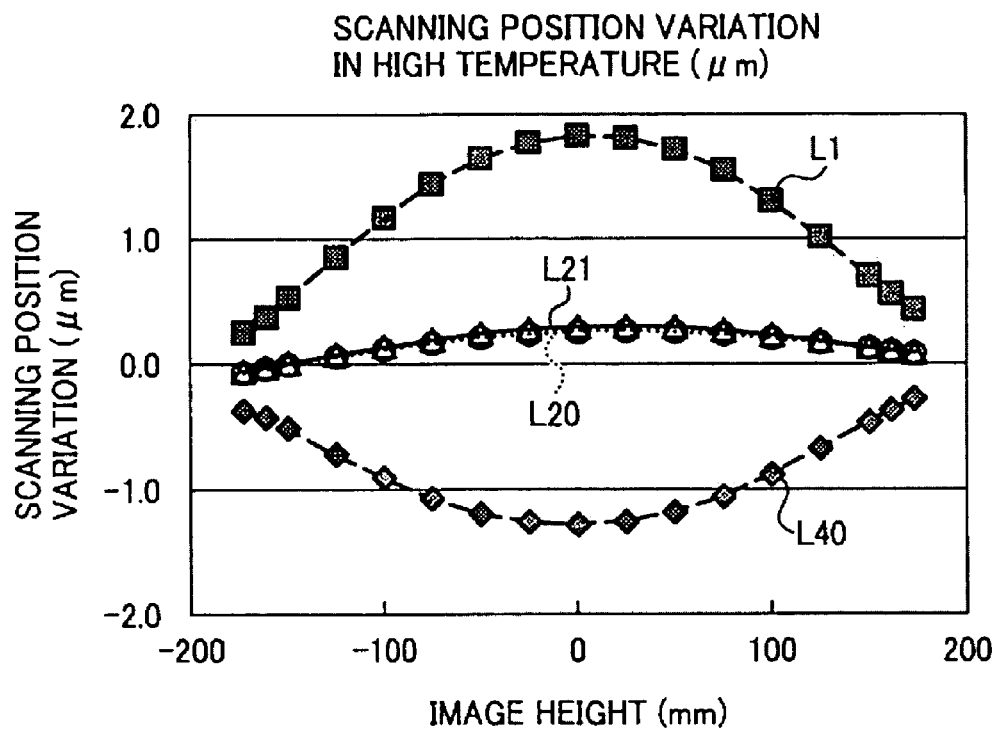
FIG. 10A is an explanatory view illustrating the variations of the scanning lines formed in the writing area.
Figure 10B:
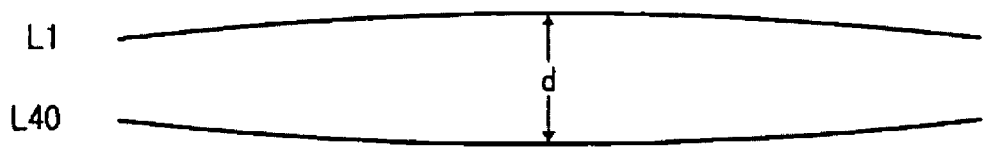
FIG. 10B is another explanatory view illustrating the variations of the scanning lines formed in the writing area.
Figure 10C:
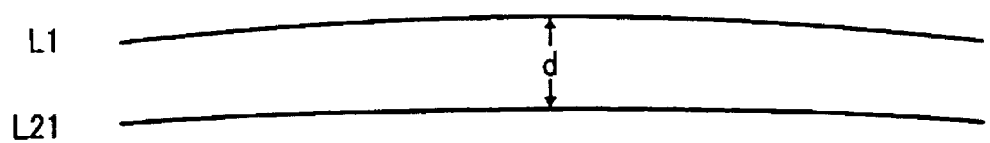
FIG. 10C is another explanatory view illustrating the variations of the scanning lines formed in the writing area.

For example, as illustrated in FIG. 10A, the scanning line L1 by the light beam from VCSEL 1 and the scanning line L40 by the light beam from VCSEL 40 significantly curve opposite to each other by the temperature fluctuation due to the property of the optical system. However, the scanning line L20 by the light beam from VCSEL 20 and the scanning line L21 by the light beam from VCSEL 21, which are disposed near the optical axis, have relatively small curvature degrees. Therefore, the scanning line L21 having a small curvature is disposed close to the scanning line L1 by the light beam from VCSEL 1 as illustrated in FIG. 10C, so as to avoid the adjacent arrangement of the scanning lines each having a large curvature as illustrated in FIG. 10B, for example, so that the variations in the intervals of the scanning lines to be formed on the scanned surface can be reduced.

The optical scanning device 100 according to the present invention includes a plurality of VCSELs (5 VCSELs, for example, VCSEL 5, VCSEL 13, VCSEL 21, VCSEL 29, and VCSEL 37) each having the same y-coordinate of the light source 10. Accordingly, the start timing and the end timing of the writing of a plurality of scanning lines can be shared, so the capacity of the memory which stores the timing information can be reduced, resulting in the decrease in the costs.

In the optical scanning device 100, it is preferable for the linear image forming lens 13 to be movably disposed in the direction parallel to the sub-scanning direction for adjusting the position, and to be fastened after the adjustment. The problem when writhing with a high density is to reduce the variations of the pitches of the light beams in the sub-scanning direction. The pitch of the light beams in the sub-scanning direction is generally several tens μm of order. When writing with the density of, for example, 600 dpi, which was conventionally often used, the light beam pitch was not a significant problem on the image. However, for example, when writing with the density of 1200 dpi, the interval between the scanning lines is about 21 μm, and the deterioration of the image quality is increased with the above-described order of the beam pitch of the light beam in the sub-scanning direction.

Figure 11A:
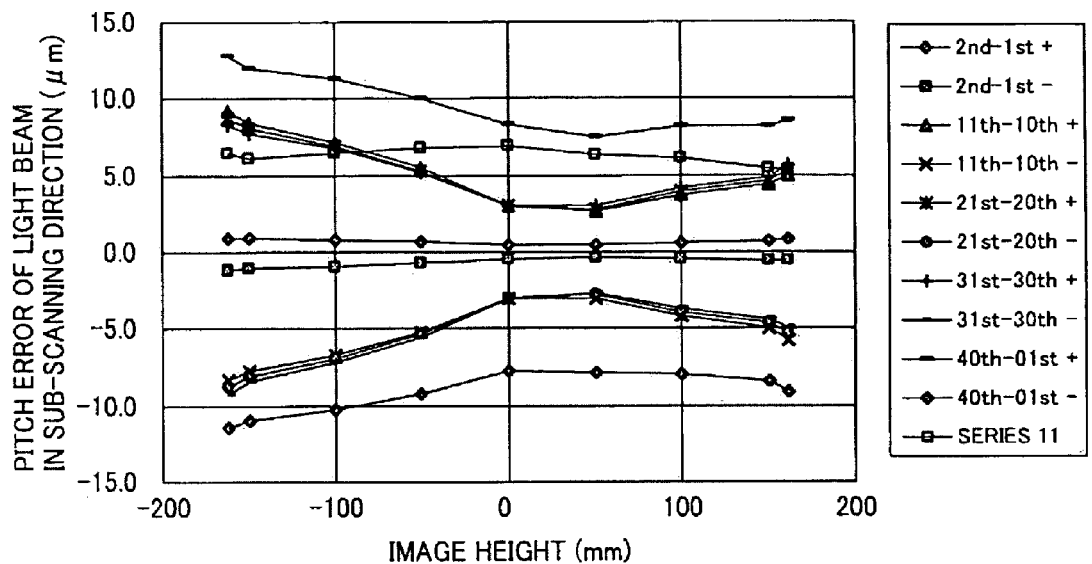
FIG. 11A is a view illustrating the beam pitches of the light beams in the sub-scanning direction in the writing area.

FIG. 11A illustrates the variations of the pitches of the light beams in the sub-scanning direction along with manufacturing errors and temperature changes in the optical scanning device 100 according to the present invention. As illustrated in FIG. 11A, in the optical system of the optical scanning device 100, the difference (hereinafter, referred to as AD) of the lateral magnifications of the sub-scanning direction in each image height is reduced as much as possible, so the variations of the pitches of the light beams in the sub-scanning direction are small, but variations of about 13 μm are caused. When writing with a high density of 2400 dpi, the interval between the scanning lines is 11 μm, so the variations of about 13 μm become a problem for the image quality. In addition, the explanatory note such as $2^{nd}$-$1^{st}$ in FIG. 11A represents the error between the pitch of the light beams in the sub-scanning direction of the first scanning line and the pitch of the light beams in the sub-scanning direction of the second scanning line. The scanning line number is as illustrated in FIG. 8.

Figure 11B:
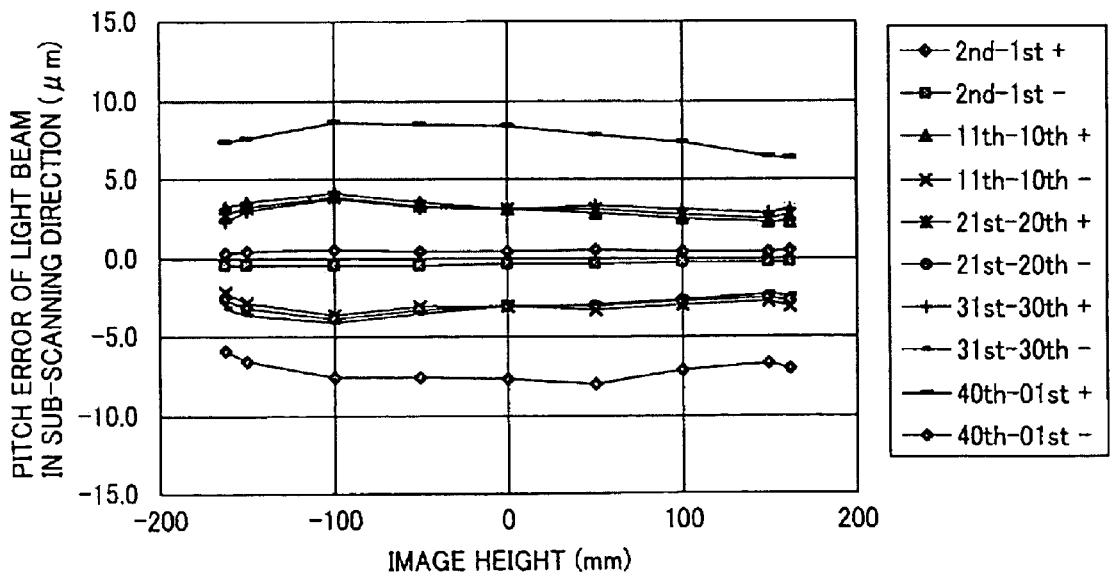
FIG. 11B is another view illustrating the beam pitches of the light beams in the sub-scanning direction in the writing area.

FIG. 11B illustrates the variations of the pitches of the light beams in the sub-scanning direction after adjusting the position of the linear image forming lens 13. As illustrated in FIG. 11B, the variations of the pitches of the light beams in the sub-scanning direction are about 8.5 μm at a maximum after the adjustment of the position of the linear image forming lens 13, and the variations are effectively reduced to the level which is not a problem for writing with a high density. Regarding the decrease in the variations of the pitches of the light beams in the sub-scanning direction which was limited only by the design of the conventional optical system, the present inventors found that the Z-shift adjustment (positional adjustment in Z-axis direction) of the linear image forming optical element is effective. For conducting such adjustment, after assembling the linear image forming optical element into the optical housing of the optical scanning device 100 so as to move in a movable area, the adjustment can be conducted in another process, or can be conducted in the assembling process.

In order to achieve this adjustment mechanism, the linear image forming optical element is disposed in the optical housing by means of an intermediate member. The linear image forming lens 13 of the optical scanning device according to the present embodiment has both end portions in the Y-axis direction supported by a pair of supporting portions 101a, 101b each having an L-shape formed in the optical housing 101 such as a casing of the optical scanning device 100 via intermediate members 102a, 102b made of resin materials which are transparent in an ultraviolet range, respectively, as illustrated in FIG. 12A.

Figure 12A:
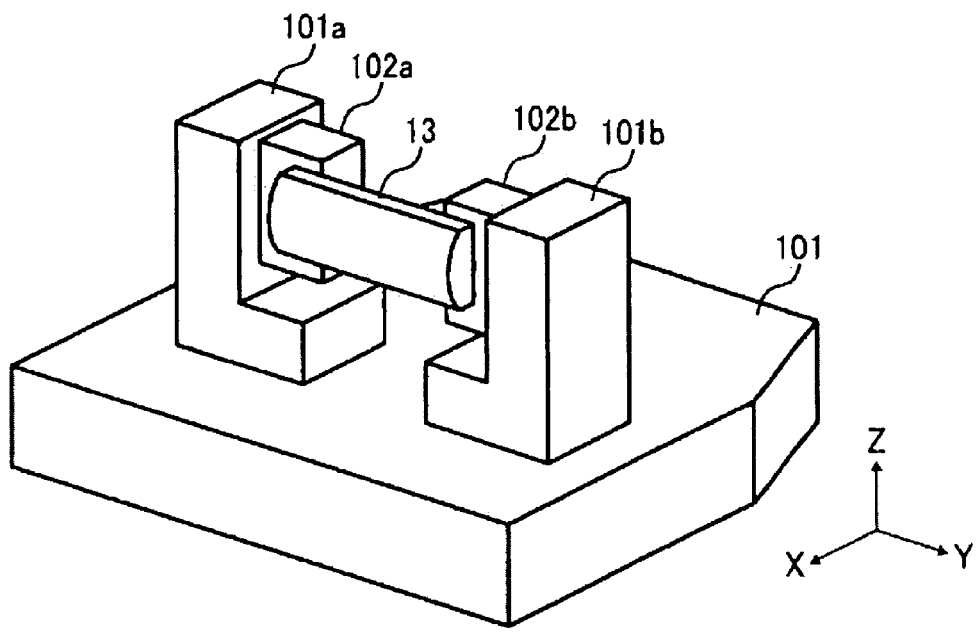
FIG. 12A is a view describing a method of attaching a linear image forming lens 13.
Figure 12B:
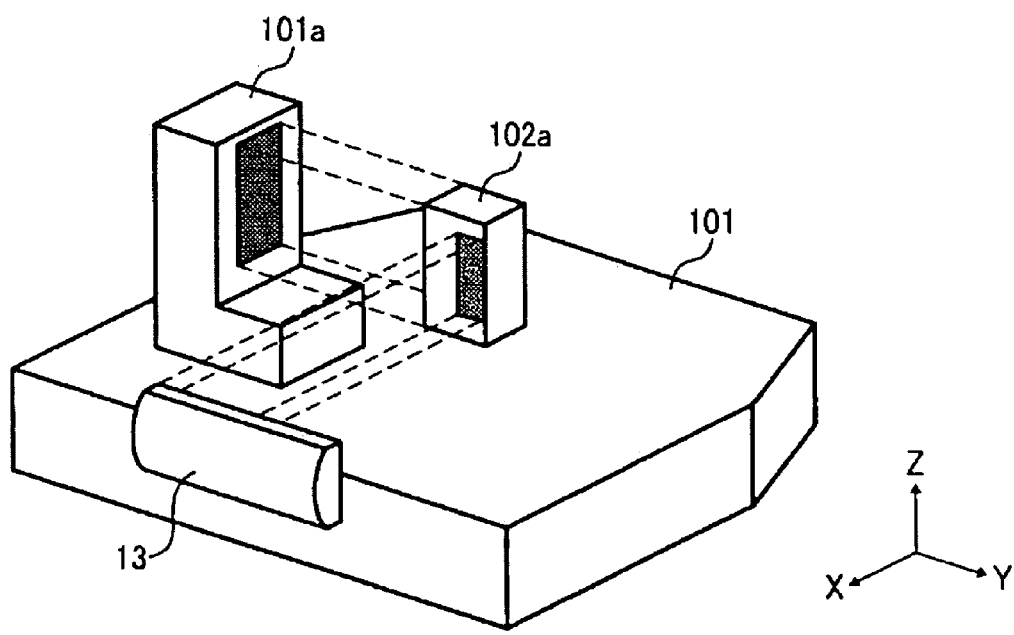
FIG. 12B is another view describing a method of attaching the linear image forming lens 13.
Figure 13:
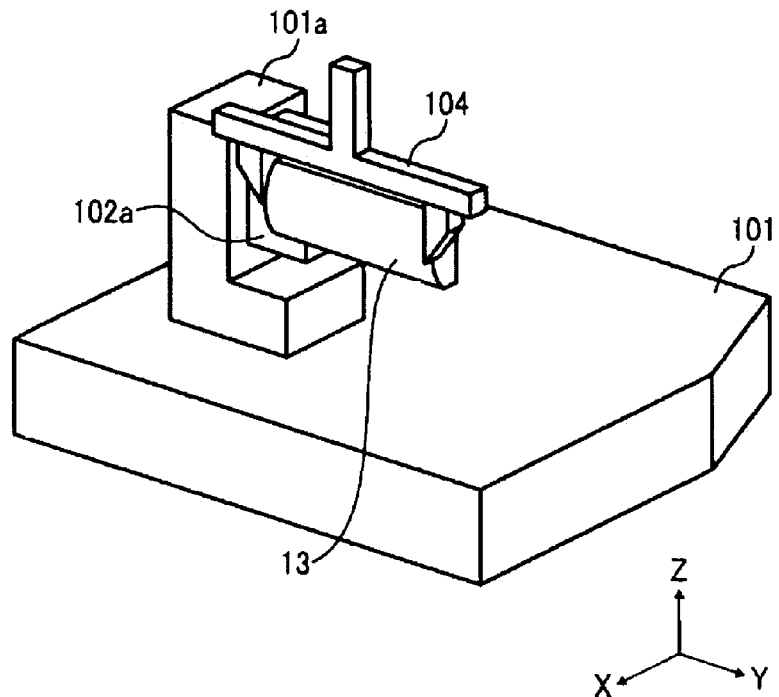
FIG. 13 is another view describing a method of attaching the linear image forming lens 13.

FIG. 12B is a development perspective view illustrating a part of FIG. 12A. As illustrated in FIG. 12B, the intermediate member 102a is a rectangular solid member with the Z-axis direction at the longitudinal direction. The surface of the intermediate member 102a on the −Y side in FIG. 12B bonds with the supporting member 101a, and the vicinity of the outer edge portion on the −Y side, which is the surface of the −X side of the linear image forming lens 13 in FIG. 12B bonds with the surface of the +X side (hereinafter, referred to as bonding surface) of the intermediate member 102a, so that the linear image forming lens 13 is supported by the supporting portion 101a. Similarly, the intermediate member 102b is a rectangular solid member with the Z-axis direction at the longitudinal direction. The surface of the intermediate member 102b on the +Y side bonds with the supporting member 102b, and the vicinity of the outer edge portion on the +Y side, which is the surface of the −X side of the linear image forming lens 13 bonds with the surface of the +X side (hereinafter, referred to as bonding surface) of the intermediate member 102a, so that the linear image forming lens 13 is supported by the supporting member 101b. Accordingly, when supporting the linear image forming lens 13, the linear image forming lens 13 can be positioned in any position in the Z-axis direction and the X-axis direction by changing the bonding positions or the bonding conditions of the intermediate members 102a, 102b. By rotating the intermediate members 102a, 102b about the axis parallel to the Y-axis at a given angle, the linear image forming lens 13 can be rotated about the axis parallel to the Y-axis. By rotating the linear image forming lens 13 relative to the intermediate members 102a, 102b, the linear image forming lens 13 can be also rotated about the axis parallel to the X-axis.

By using the intermediate members 102a, 102b, the position of the linear image forming lens 13 can be freely adjusted as described above, so that the optical performance can be further improved. When the linear image forming lens 13 is directly retained and fastened to the supporting members 101a, 101b, for example, without using the intermediate members 102a, 102b, the degree of freedom of the rotation adjustment and the position adjustment is decreased. Therefore, it is difficult to compensate the performance deterioration of the optical system by manufacturing errors. When retaining the linear image forming lens 13, in order to fasten the linear image forming lens 13 to the intermediate members 102a, 102b with high accuracy, it is preferable to use the extended plane of the optical face having high plane accuracy (plane of linear image forming lens 13 on −X side which has contact with the intermediate member 102) as the face fastened to the intermediate members 102a, 102b. Hereinafter, the actual method of adjusting the position of the linear image forming lens 13 is described with reference to FIG. 13.

While retaining the linear image forming lens 13 by means of a jig 104 and measuring the optical characteristics of the optical scanning device 100, the linear image forming lens 13 is moved in each of the Z-axis direction, X-axis direction, the rotation direction about the Y-axis, and the rotation direction of the X-axis, so as to adjust the lens to the most suitable position. In this case, the optical characteristics are a beam waist position, a beam spot diameter, and a beam pitch of light beams in the sub-scanning direction. As to the pitch of the light beams in the sub-scanning direction, the interval between the light beams on both ends in the sub-scanning direction, which is illustrated by "$40^{th} \cdot 01^{st}$" in FIG. 11B, is measured. More particularly, the light sources corresponding to the two light beams illuminate, the beam positions of the sub-scanning direction in both ends on the scanned surface and the interval between the positions are measured, and the position of the linear image forming lens 13 retained by the jig is adjusted by moving the lens in the sub-scanning direction, such that the interval between the + side and the center position and the interval between the − side and the center position substantially become the same value. By adjusting as described above, the pitches of the light beams in the sub-scanning direction are optimized, and the pitches of other light beams in the sub-scanning direction are also optimized.

In order to minimize the spot diameter of the light beam on the scanned surface, the beam waist position is optimized by adjusting the position in the X-axis direction, and the beam spot diameter is optimized by adjusting the rotation about the X-axis. It is preferable to conduct these adjustments in the order of the positional adjustment in the X-axis direction, the rotation adjustment about the X-axis, and the positional adjustment in the sub-scanning direction. However, these adjustments can be conducted in another order, these adjustments can be conducted at the same time, or the rotation adjustment about the Y-axis can be conducted.

After that, the intermediate member 102a onto which a bonding agent such as an ultraviolet hardening resin is applied is brought into contact (temporal fastening) with both of the linear image forming lens 13 and the supporting member 101a. Then, the ultraviolet hardening resin is hardened by irradiating ultraviolet, so as to fasten the intermediate member 102a onto the linear image forming lens 13 and the supporting portion 101a. The intermediate member 102a is a material which is transparent in the ultraviolet area, so the degrees of freedom the ultraviolet irradiation is high, and the hardening can be smoothly and equally conducted.

In addition, "adjustable" according to the present embodiment means that the initial adjustment is available, and includes the meaning that the adjustment after assembling is available and the positioning standard is not included.

In the present embodiment, the housing is made of a material different from a material of the intermediate member. In this case, the liner expansion coefficients are different to each other, so it is considered that the position of the optical element changes according to the temperature change. For this reason, it is preferable for the bonding face of the intermediate member 102a to the supporting portion 101a to be a flat surface vertical to the main-scanning direction as illustrated in FIG. 12A.

It is also preferable for the power of the second scanning lens 17 to be larger than the power of the first scanning lens 16 in the optical scanning device 100 according to the present embodiment. By setting the power of the first and second scanning lenses 16, 17 as described above, the difference in the magnification of the optical system in the sub-scanning direction can be easily reduced. Therefore, the magnification change in the sub-scanning direction caused by the temperature change can be easily reduced, so that the deflection of the pitches of the light beams in the sub-scanning direction caused by the temperature change can be decreased.

Figure 14:
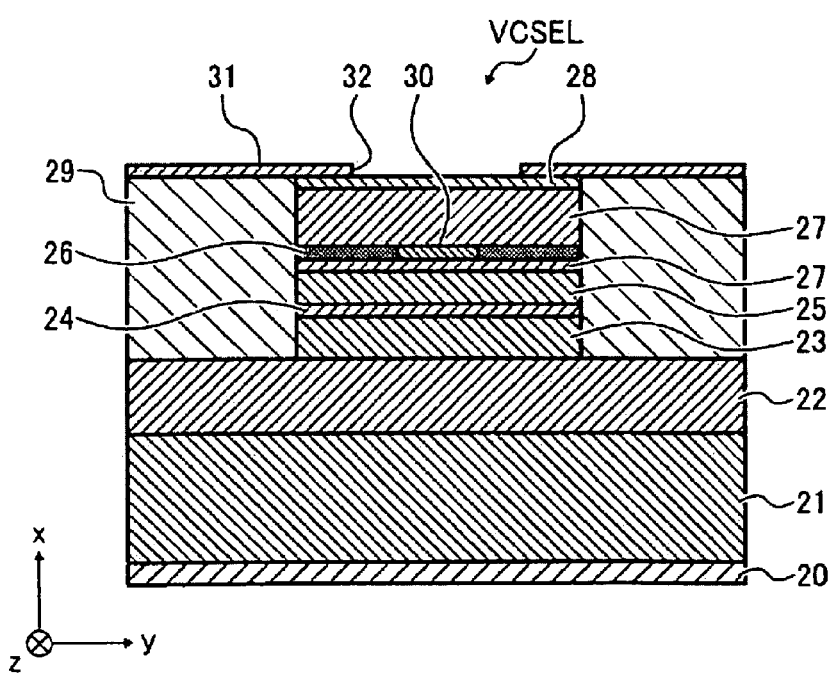
FIG. 14 is a sectional side view illustrating a VCSEL formed in the light source 10.
Figure 15:
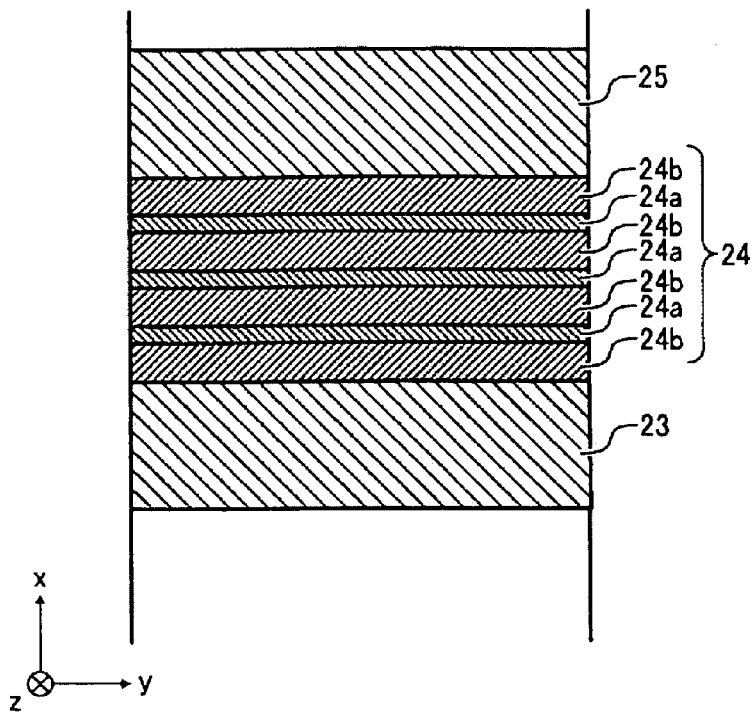
FIG. 15 is an enlarged sectional side view illustrating an active layer 24 of the VCSEL.

FIG. 14 is a schematic view illustrating the sectional structure of the VCSEL. FIG. 15 is an enlarged view illustrating the peripheral portion of an active layer in FIG. 14. Each of the VCSELs in the light source 10 according to the present embodiment is a VCSEL having 780 nm-ranges. As illustrated in FIGS. 14, 15, the VCSEL has a structure such that a resonator area of one wavelength optical thickness including an active layer 24 containing a quantum well layer 24a having $Al0.12Ga0.88As$ and a barrier layer 24b having $Al0.3Ga0.7As$ between spacer layers 23, 25 having $Al0.6Ga0.4As$ is sandwiched by a lower reflection mirror 22 having a low reflection rate layer of $n$-$Al0.9Ga0.1As$ and a high reflection rate layer of $n$-$Al0.3Ga0.7As$ of 40.5 pair with the optical thickness of $\lambda/4$ of each layer and an upper reflection mirror 27 having a low reflection rate layer of $p$-$Al0.9Ga0.1s$ and a high reflection rate layer $p$-$Al0.3Ga0.7As$ of 24 pair on a substrate 21 of n-GaAs provided with an n-side electrode 20. An AlAs selected oxidized layer 30 surrounded by an AlxOy current arctation layer 26 is provided in the upper reflection mirror 27 away from the resonator area at λ/4. Each of the reflection mirrors 22, 27 includes a composition inclined layer (not shown) in which the component gradually changes for reducing a resistance value.

Hereinafter, a method of forming the VCSEL provided in the light source 10 will be described. At first, each of the above-mentioned layers is formed by crystal growth using the metal organic chemical vapor deposition (MOCVD method) or the molecular beam epitaxy method (MBE method).

Next, a groove having a depth of 4.5 μm, for example, is formed around the area which becomes the element area by means of a dry etching method, so that a mesa shape is formed. It is general to dispose the etching bottom face in the position across at least the AlAs selected oxidized layer 30.

Next, the AlAs selected oxidized layer 30 from which the side plane is exposed by the groove forming process with the dry etching method is changed into an $Al_xO_y$ insulator layer by heating in water vapor and oxidizing the peripheral portion, and then, the current arctation structure which limits the element driving current path only to the AlAs area having an un-oxidized center portion is formed.

Next, an $SiO_2$ protection layer (not shown) having a thickness of 150 nm, for example, is disposed in each of the element areas except the light-emitting portion 32 and the area in which the upper electrode 31 on each of the element areas is formed, and an etching portion is buried by a polyimide 32 so as to planarize.

Next, a p-contact layer 28 in each of the element areas, the polyimide on the upper reflection mirror 27 having the light-emitting portion 32, and the $SiO_2$ protection layer (not shown) are eliminated, and a P-side individual electrode 31 is formed near the light-emitting portion 32 on the p-contact layer 28. In addition, an n-side electrode is formed in the lower plane of the n-GaAs substrate 21.

In this embodiment, the mesa portion formed by the dry etching method becomes each of the surface-emitting laser elements.

In order to achieve the arrangement of the VCSELs of the light source 10, a photomask along the arrangement of the VCSELs in the present invention is formed, an etching mask is formed by a general photolithography process using the photomask, and the etching is conducted by using the etching mask. It is preferable to dispose a groove of about 4-5 μm or more between the elements, in order to electrically and spatially separate each of the elements of the array. If the groove between the elements is too narrow, the control of the etching becomes difficult. In addition, the mesa shape can be any shape, for example, an elliptical shape, a square, and a rectangular, in addition to a circle according to the embodiment of the present invention. If the size (for example, diameter) of the element is too small, its characteristic deteriorates by the heat generated in the operation of the elements. Therefore, it is preferable for the groove to be about 10 μm or more.

Figure 16:
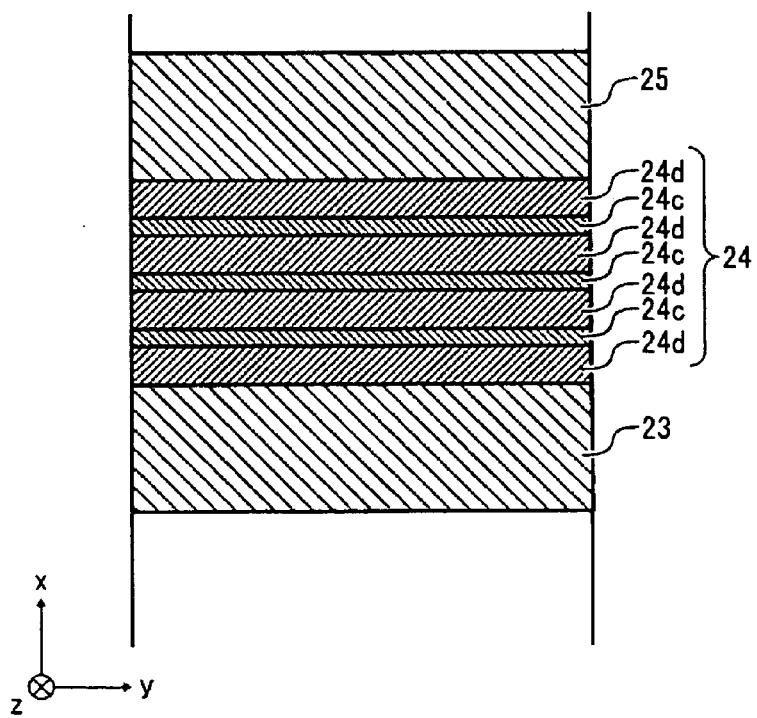
FIG. 16 is an enlarged sectional side view illustrating another active layer 24 of the VCSEL.

The above-described surface-emitting laser of 780 nm range can be manufactured by another material. FIG. 16 illustrates an enlarged view of the peripheral portion of the active layer 24 manufactured by another material. As illustrated in FIG. 16, the active layer 24 includes three GaInPAs quantum well active layers 24c, each of which is a compression distortion composition and has a band gap wavelength of 780 nm, and four Ga0.6In0.4P barrier wall layers 24d, each of which lattice-matches and has an extension distortion, and uses 0.5In0.5P which is a wide band gap (Al0.7Ga0.3) as the glad layers 23, 25 (in this embodiment, spacer layer) for locking up an electron. In this case, compared with the case which forms the glad layer with the AlGaAs series, a significantly large band gap difference between the glad layer and the quantum well active layer can be obtained.

The following Table 2 illustrates the spacer layer, the active layer, the band gap Eg difference of the spacer layer and the well layer, and the band gap Eg difference of the barrier layer and the well layer in the surface-emitting semiconductor layers of 780 nm and 850 nm using the AlGaAs (spacer layer)/AlGaAs (quantum well active layer) series material, and the surface-emitting semiconductor laser of 780 nm using the AlGaInP (spacer layer)/GaInPAs (quantum well active layer) series material. In addition, the spacer layer is a layer between the active layer and the reflection mirror in the general structure, and is a layer having the function as the glad layer for locking up a carrier.

As illustrated in Table 2, in the surface-emitting semiconductor layer of 780 nm using the AlGaInP (spacer layer)/GaInPAs (quantum well active layer) series material, the band gap differences Eg are larger than those in the surface-emitting semiconductor layer of 780 nm using the AlGaAs/AlGaAs series material and the surface-emitting semiconductor laser of 850 nm using the AlGaAs/AlGaAs series material. More specifically, compared with 465.9 meV (Al component 0.6) when forming the glad layer (spacer layer) with the AlGaAs, the band gap difference of the glad layer (spacer layer) and the quantum well active layer is 767.3 meV, which is extremely large. Similarly, the band gap difference of the quantum well active layer and the barrier layer has an advantageous difference, so the carrier can be preferably locked up.

TABLE 2

| | | WAVELENGTH | | |
|---|---|---|---|---|
| | | 780 nm | | 850 nm (Ref.) |
| | | SPACER LAYER/ QUANTUM WELL ACTIVE LAYER AlGaAs/AlGaAs SERIES MATERIAL | SPACER LAYER/ QUANTUM WELL ACTIVE LAYER AlGaInP/GaInPAs SERIES MATERIAL | SPACER LAYER/ QUANTUM WELL ACTIVE LAYER AlGaAs/GaAs SERIES MATERIAL |
| | SPACER LAYER | $Al_{0.6}Ga_{0.4}As$ (Eg = 2.0226 eV) | $(Al_xGa_{1-x})_{0.5}In_{0.5}P$ (Eg(X = 0.7) = 2.324 eV) | $Al_{0.6}Ga_{0.4}As$ (Eg = 2.0226 eV) |
| ACTIVE LAYER | QUANTUM WELL ACTIVE LAYER | $Al_{0.12}Ga_{0.88}As$ (Eg = 1.5567 eV) | GaInPAs(COMPRESSION DISTORTION (Eg = 1.5567 eV) | GaAs (Eg = 1.42 eV) |
| | BARRIER | $Al_{0.3}Ga_{0.7}As$ | $Ga_xIn_{1-x}P$(EXTENSION | $Al_{0.3}Ga_{0.7}As$ |

TABLE 2-continued

| | WAVELENGTH | | |
|---|---|---|---|
| | 780 nm | | 850 nm (Ref.) |
| | SPACER LAYER/ QUANTUM WELL ACTIVE LAYER AlGaAs/AlGaAs SERIES MATERIAL | SPACER LAYER/ QUANTUM WELL ACTIVE LAYER AlGaInP/GaInPAs SERIES MATERIAL | SPACER LAYER/ QUANTUM WELL ACTIVE LAYER AlGaAs/GaAs SERIES MATERIAL |
| LAYER | (Eg = 1.78552 eV) | DISTORTION (Eg(X = 0.6) = 2.02 eV) | (Eg = 1.78552 eV) |
| EG DIFFERENCE OF SPACER LAYER AND WELL LAYER ($\Delta$Eg) | 465.9 meV | 767.3 meV | 602.6 meV |
| EG DIFFERENCE OF BARRIER LAYER AND WELL LAYER($\Delta$Eg) | 228.8 meV | 463.3 meV | 365.5 meV |

In addition, since the active layer has the compression distortion, the increase in the gain is improved, so as to be a high gain by the band separation of the heavy hole and the light hole, high output is obtained with a low threshold value current. This effect can not be obtained by the surface-emitting lasers of 780 nm and 850 nm of the AlGaAs series material having a lattice constant substantially equal to the GaAs substrate. Moreover, if the threshold value current is reduced by the improvement in the performance of locking up an electron and the increase in the gain by the quantum well active layer, the reflection rate of DBR on the light extraction side can be reduced, so that further improved high output can be achieved.

The active layer and the barrier layer include a material without having Al, and are an Al-free active area (quantum well active layer and layer adjacent to the active layer). For this reason, the incorporation of the oxygen is reduced, the formation of the non-light-emitting recouping center is controlled, and the operating life of the element can be improved. Therefore, the writing unit or the light source unit can be reused.

Embodiment 2

Next, a modification example of the optical scanning device 100 will be described. In addition, the description will be omitted for the parts similar to the parts in the above embodiment 1 and the parts the same as the parts in the above embodiment 1.

Figure 17A:
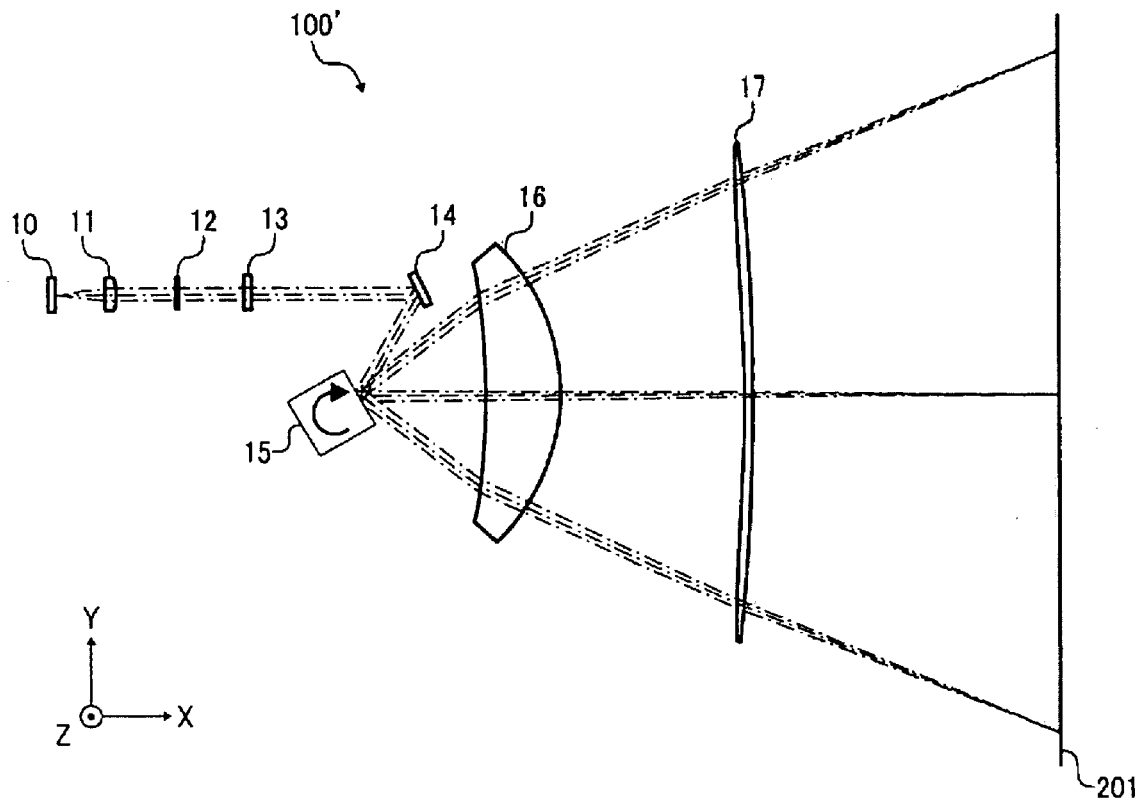
FIG. 17A is a plan view illustrating a schematic structure of an optical scanning device 100' for use in a printer 200 according to a second embodiment of the present invention.
Figure 17B:
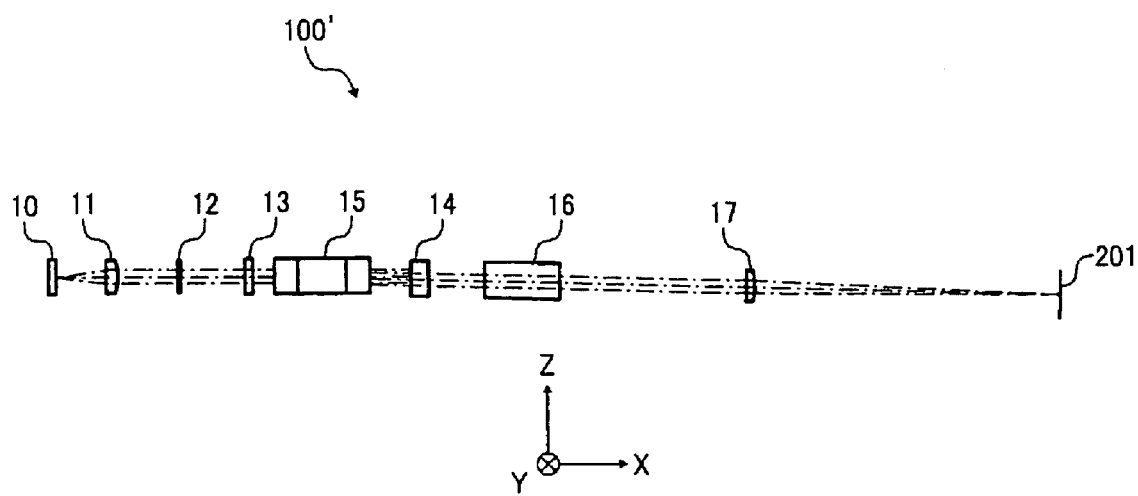
FIG. 17B is a side view illustrating a schematic structure of the optical scanning device 100' for use in the printer 200 according to the second embodiment of the present invention.

FIGS. 17A, 17B are a plan view and a side view, respectively, each illustrating a schematic structure of an optical scanning device 100' according to the present embodiment. As illustrated in FIGS. 17A, 17B, the optical scanning device 100' includes a light source 10, a coupling lens 14, an aperture member 12, a linear image forming lens 13, a reflection mirror 14, which are sequentially disposed on the +X side of the light source 10 in FIG. 17A, a polygon mirror 15, which is disposed on the −Y side of the reflection mirror 14 in FIG. 17A, a first scanning lens 16, and a second scanning lens 17, which are sequentially disposed on the +X side of the polygon mirror 15 in FIG. 17A.

The coupling lens 11 is a lens having the focal length of 46.0 mm, and forms 40 light beams emitted from the light source 10 into approximate parallel light beams, respectively.

The aperture member 12 includes a rectangular or an elliptical opening of 5.8 mm in the Y-axis direction (main-scanning direction) and 1.22 mm in the Z-axis direction (sub-scanning direction), and is disposed such that the center of the opening is located near the focal point position of the coupling lens 11.

The linear image forming lens 13 is a cylindrical lens having the focal length of 58 mm, and condenses the light beams which have passed through the aperture member 12 onto the deflection faces of the polygon mirror 15.

The polygon mirror 15 includes a quadrangular prism member having a square top face inscribed in a circle with a radius 7 mm, and the deflection faces formed on the four side planes, respectively. This polygon mirror 15 rotates at a constant angular speed in the direction of the arrow illustrated in FIG. 17A by means of a rotation mechanism (not shown). By this rotation, the light beams entered into the polygon mirror 15 are scanned in the Y-axis direction. The light beams enter into the deflection faces at an angle of 0.70 relative to the normal lines of the reflection faces of the deflection faces. In the present embodiment, the effective diameter of the deflection face is 6.8 mm in the main-scanning direction and 2 mm in the sub-scanning direction.

The first and second scanning lenses 16, 17 are disposed such that the distances from the deflection face of the polygon mirror 15 to the incidence planes are 46.3 mm and 149.5 mm, respectively. The first and second scanning lenses 16, 17 are resin scanning lenses, for example, with the thicknesses of the centers (on-optical axis) 13.5 mm and 3.5 mm, respectively. The optical surface shape of each of the scanning lenses is expressed by the functions shown by the following formulas 3 to 5. Where, X is the coordinate of the optical axis direction, Y is the coordinate of the main-scanning direction, Cm is the inverse of the curvature radius Rny showing the curvature of the main-scanning direction in the center (Y=0) of the main-scanning direction, An to En are the aspherical surface coefficients of the shape of the main-scanning direction, and Cs(Z) is the curvature of the sub-scanning direction regarding Z. $R_n z$ is the curvature radius showing the curvature of the sub-scanning direction in the center (Y=0) of the main-scanning direction. $F_n$ is the aspherical surface coefficient of the shape of the sub-scanning direction. In addition, the value of each of the aspherical surface coefficients is illustrated in the following table 3.

TABLE 3

(FORMULA 3)
$$Cm = \frac{1}{R_n y} \ldots$$

(FORMULA 4)
$$Cs(Y) = \frac{1}{R_n z} + a_n Y^2 + b_n Y^4 + c_n Y^6 + d_n Y^8 + e_n Y^{10} + f_n Y^{12}$$

(FORMULA 5)
$$X_n(Y, Z) = \frac{Y \cdot Cm}{1 + \sqrt{1 - (1 + K_n) \cdot (Y \cdot Cm)^2}} + A_n \cdot Y^4 + B_n \cdot Y^6 + C_n \cdot Y^8 +$$
$$D_n \cdot Y^{10} + E_n \cdot Y^{12} + \frac{Cs(Y) \cdot Z^2}{1 + \sqrt{1 - (Cs(Y) \cdot Z)^2}} + (F_2 \cdot Y^2 + F_4 \cdot Y^4 + F_6 \cdot Y^6 +$$
$$F_8 \cdot Y^8 + F_{10} \cdot Y^{10}) \cdot Z$$

| | FIRST SCANNING LENS | | SECOND SCANNING LENS | |
|---|---|---|---|---|
| | FIRST PLANE | SECOND PLANE | FIRST PLANE | SECOND PLANE |
| $R_{nY}$ | −119.428 | −59.279 | −10000 | 540.625 |
| $K_n$ | — | — | — | — |
| $A_n$ | $9.24816 \times 10^{-7}$ | $9.48532 \times 10^{-7}$ | $3.285627 \times 10^{-7}$ | $1.277984 \times 10^{-7}$ |
| $B_n$ | $-2.62389 \times 10^{-10}$ | $7.41815 \times 10^{-11}$ | $-7.085422 \times 10^{-11}$ | $-4.628731 \times 10^{-11}$ |
| $C_n$ | $2.13479 \times 10^{-14}$ | $-3.82368 \times 10^{-14}$ | $6.269224 \times 10^{-15}$ | $4.049210 \times 10^{-15}$ |
| $D_n$ | $1.59389 \times 10^{-17}$ | $1.07002 \times 10^{-17}$ | $-2.731570 \times 10^{-19}$ | $-1.659747 \times 10^{-19}$ |
| $E_n$ | $-2.62569 \times 10^{-21}$ | $4.37611 \times 10^{-21}$ | $4.738805 \times 10^{-24}$ | $2.585484 \times 10^{-24}$ |
| $R_{nZ}$ | ∞ | ∞ | ∞ | −37.94245 |
| $a_n$ | $7.03138 \times 10^{-6}$ | — | — | $1.317747 \times 10^{-6}$ |
| $b_n$ | $2.95315 \times 10^{-10}$ | — | — | $-1.030720 \times 10^{-10}$ |
| $c_n$ | $-2.25975 \times 10^{-12}$ | — | — | $-8.744780 \times 10^{-15}$ |
| $d_n$ | — | — | — | $2.593978 \times 10^{-18}$ |
| $e_n$ | — | — | — | $-2.436017 \times 10^{-22}$ |
| $f_n$ | — | — | — | $8.689978 \times 10^{-27}$ |
| $F_2$ | — | $-5.73974 \times 10^{-6}$ | $3.477136 \times 10^{-7}$ | — |
| $F_4$ | — | $-1.77749 \times 10^{-10}$ | $-6.560344 \times 10^{-11}$ | — |
| $F_6$ | — | $-1.55089 \times 10^{-13}$ | $7.601918 \times 10^{-15}$ | — |
| $F_8$ | — | $-2.67364 \times 10^{-16}$ | $-5.383658 \times 10^{-19}$ | — |
| $F_{10}$ | — | $-4.16646 \times 10^{-20}$ | $1.947994 \times 10^{-23}$ | — |

Figure 18A:
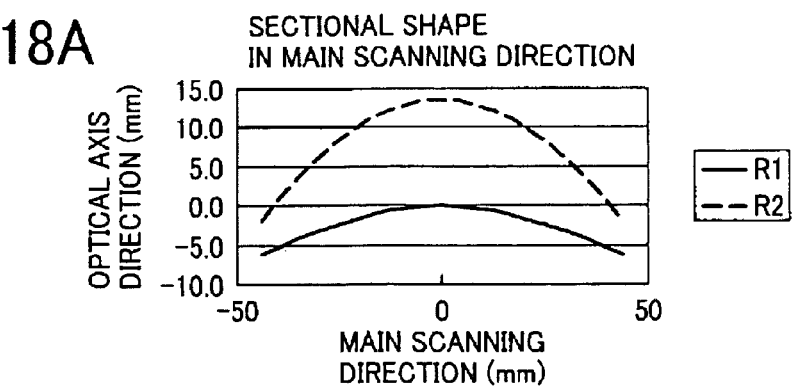
FIG. 18A is a view illustrating the sectional shapes of a first plane and a second plane of a first scanning lens 16 in a main-scanning direction.

FIG. 18A illustrates the sectional shapes of the first and second planes of the first scanning lens 16 in the main-scanning direction with the solid line R1 and the dotted line R2, respectively.

Figure 18B:
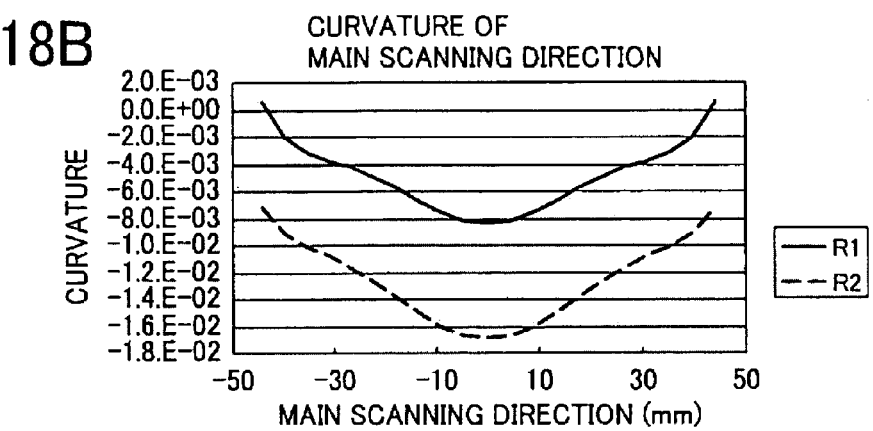
FIG. 18B is a view illustrating the curvature of the first plane and the second plane of the first scanning lens 16 in the main-scanning direction.

FIG. 18B illustrates the curvature of the first and second planes in the first scanning lens 16 in the main-scanning direction with the solid line R1 and the dotted line R2, respectively.

Figure 18C:
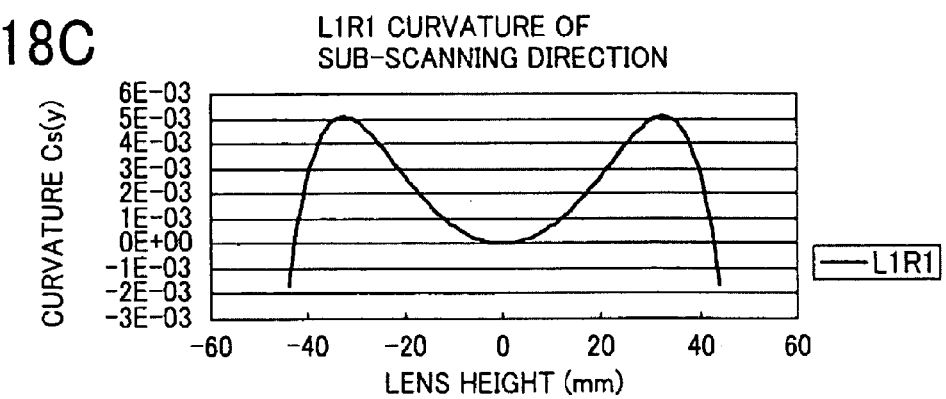
FIG. 18C is a view illustrating the curvature of the first plane of the first scanning lens 16 in a sub-scanning direction.

FIG. 18C illustrates the curvature of the first plane of the first scanning lens 16 in the sub-scanning direction with the solid line L1R1.

Figure 18D:
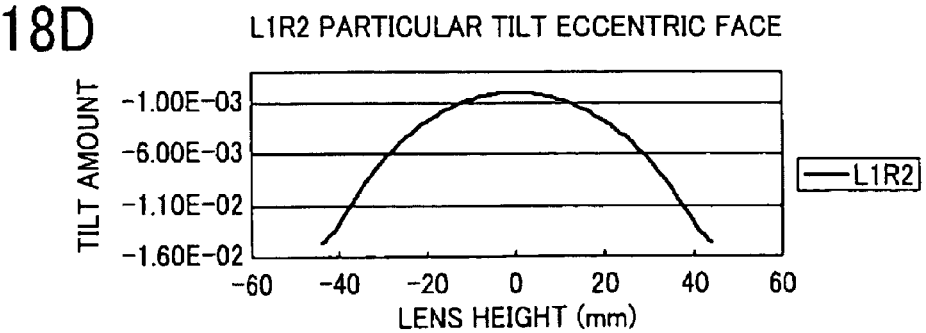
FIG. 18D is a view illustrating the tilt amount of the second plane of the first scanning lens 16 in the sub-scanning direction.

FIG. 18D illustrates the tilt amount of the second plane of the first scanning lens 16 in the sub-scanning direction with the solid line L1R2. In addition, the vertical axis showing the tilt amount corresponds to tan θ where a tilt angle of the first scanning lens is θ. The optical axis is an axis passing through the point where Y=0, Z=0 in the formula 5, as long as it is specifically limited.

Figure 19A:
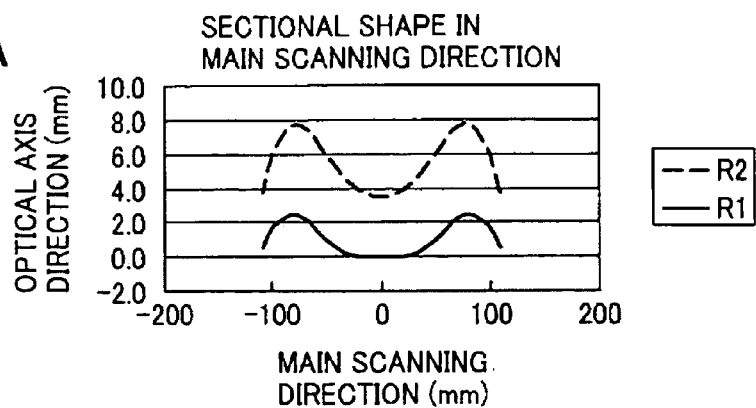
FIG. 19A is a view illustrating the sectional shapes of a first plane and a second plane of a second scanning lens 17 in the main-scanning direction.

FIG. 19A also illustrates the sectional shapes of the first and second planes in the second scanning lens 17 in the main-scanning direction with the solid line R1 and the dotted line R2, respectively.

Figure 19B:
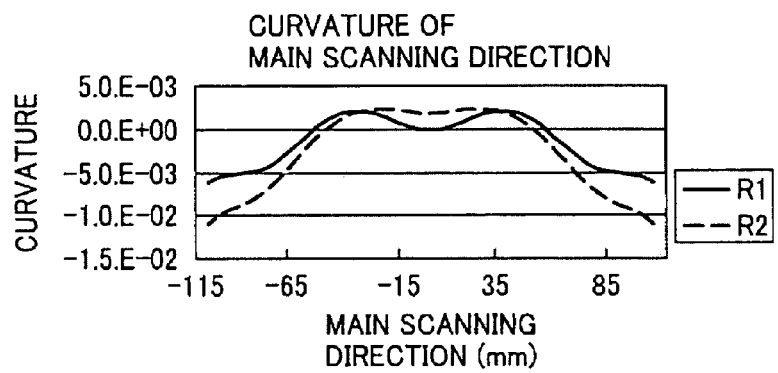
FIG. 19B is a view illustrating the curvatures of the first plane and the second plane of the second scanning lens 17 in the main-scanning direction.

FIG. 19B also illustrates the curvature of the first and second planes in the second scanning lens 17 in the main-scanning direction with the solid line R1 and the dotted line R2, respectively.

Figure 19C:
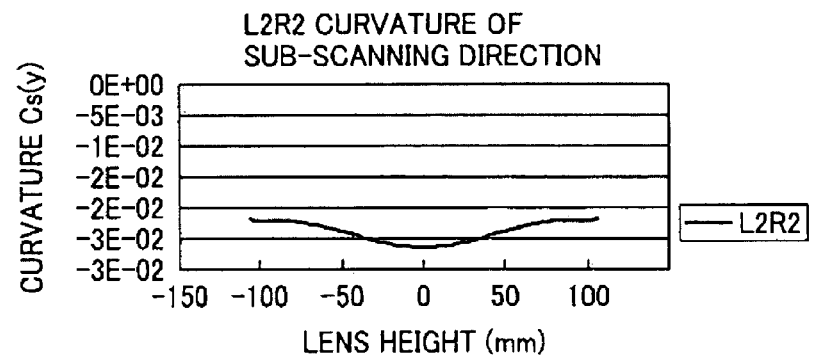
FIG. 19C is a view illustrating the curvature of the second plane of the second scanning lens 17 in the sub-scanning direction.

FIG. 19C also illustrates the curvature of the second plane in the second scanning direction 17 in the sub-scanning direction with the solid line L2R2.

Figure 19D:
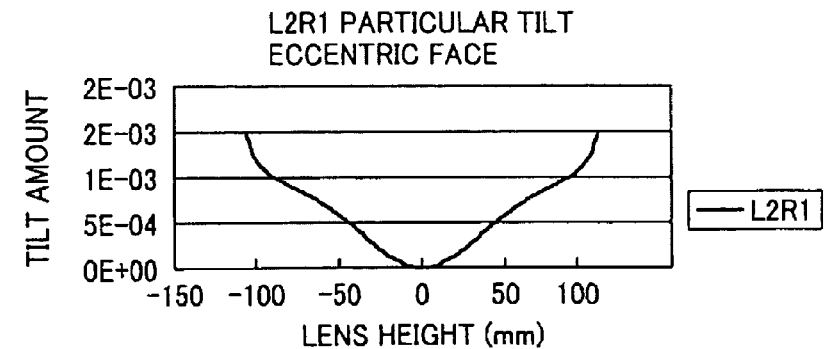
FIG. 19D is a view illustrating the tilt amount of the second plane of the second scanning lens 17 in the sub-scanning direction.

FIG. 19D also illustrates the tilt amount of the first plane in the second scanning lens 17 in the sub-scanning direction with the solid line L2R1.

The lateral magnification of the sub-scanning direction of the entire optical system included in the optical scanning device 100' according to the present invention is 1.22 times, and the sub-scanning direction magnification of only the optical system on the scanned surface side by the polygon mirror is −0.97 times. In the optical scanning device 100', the spot diameter of the light beam is set to 55 μm in the main-scanning direction and 55 μm in the sub-scanning direction on the scanned face. In addition, the distance from the emission plane of the first scanning lens 16 to the incident plane of the second scanning face 17 is 89.7 mm, and the distance from the emission plane of the second scanning lens to the scanned face (surface of photoconductive drum 201) is 143.5 mm.

Figure 21A:
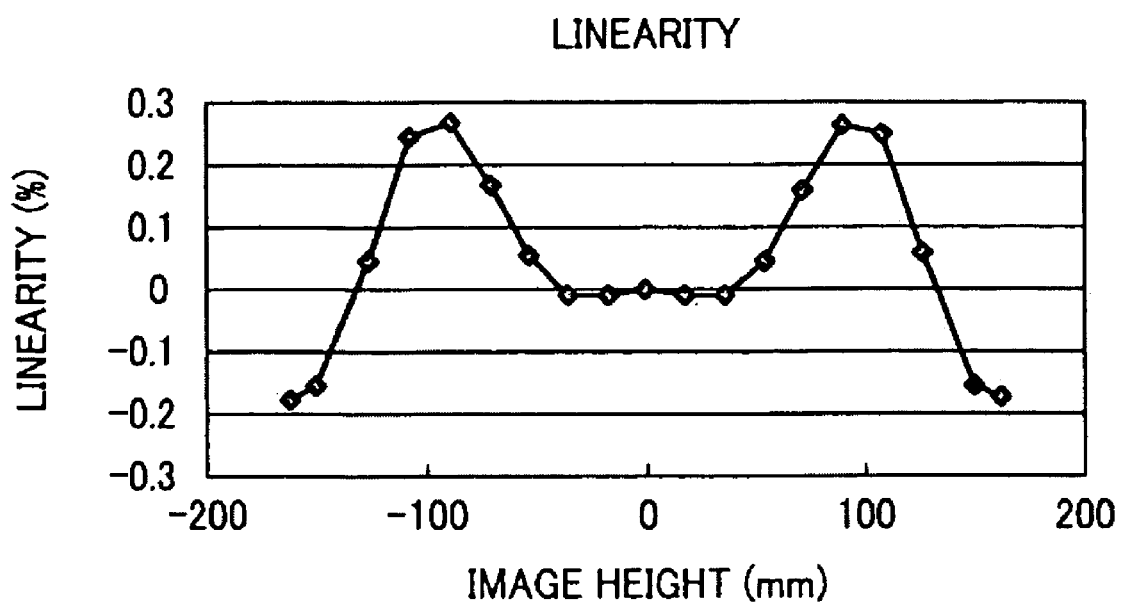
FIG. 21A is a view illustrating the linearity of the optical scanning device 100'.
Figure 21B:
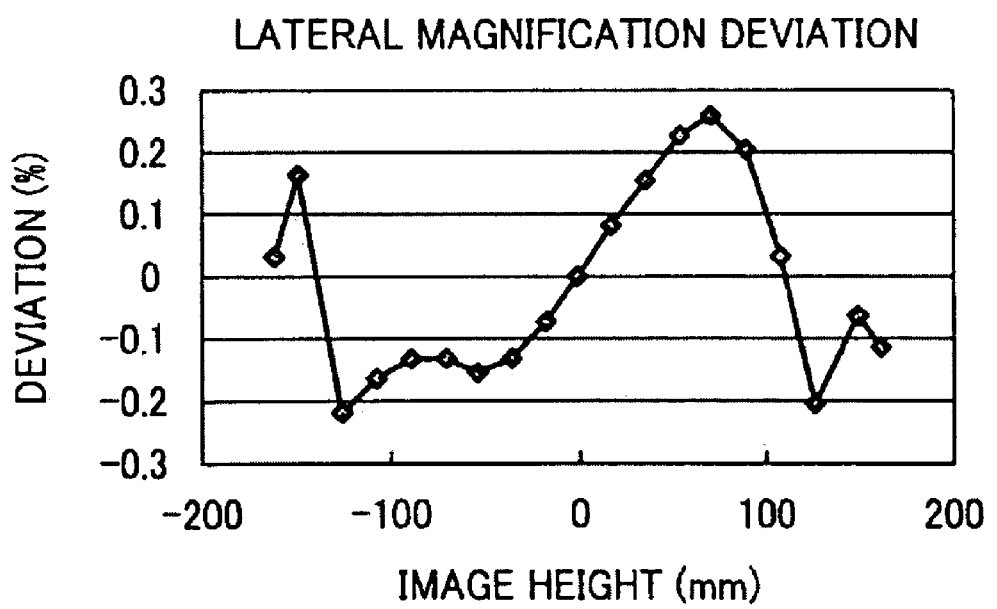
FIG. 21B is a view illustrating the lateral magnification deviations of the optical scanning device 100' in the sub-scanning direction.

FIGS. 20A, 20B, 21A-21C are views each illustrating the field curvature in the optical scanning device 100' and the lateral magnification deviations of the sub-scanning direction. FIG. 20A illustrates the field curvature in the main-scanning direction corresponding to the ch01 (VCSEL1), the ch40 (VCSEL40), and the axial (corresponding to light-emitting point in position of Y=0, Z=0 in FIG. 3). FIG. 20B illustrates the field curvature in the sub-scanning direction corresponding to the ch01, the ch40, and the axial. FIG. 21A illustrates the linearity of the optical scanning device 100', FIG. 21B illustrates the lateral magnification deviations of the sub-scanning direction, and FIG. 21C illustrates the scanning line curvature in the photoconductive drum.

According to FIG. 20A, the differences are caused in the optical performances by the differences of the spatial positions of the ch01 and the ch40, but the differences are minimized in the optical system of the optical scanning device 100'. For this reason, since the optical performances are stabilized in all the channels ch (scanning lines), the variations of the spot diameters of the light beams and the variations of the scanning line intervals are reduced.

By using the light source 10 illustrated in FIG. 3 for the optical scanning device 100', the high quality scanning lines can be formed with the multichannel scanning optical system having the reduced space. In addition, by adjusting the position of the linear image forming lens 13 by means of the above-described method, further accurate scanning can be conducted.

Since the displacements of the light beams in the sub-scanning direction can be corrected, the scanning line intervals can be adjusted by adjusting the movement of the optical elements 13, 14 in the Z-axis direction. The aberration of the lens increases as the light beam moves away from the optical axis of the optical element. Therefore, if the light beam displaces in the sub-scanning direction by a magnification error, the displacement of the Z-axis direction and the rotation about the Y-axis of the reflection mirror 14 and the polygon mirror 15, for example, the optical magnification relative to each of the light beams is slightly changed.

With the conventional resolution, such a change can be ignored; however, such a change becomes banding and the amount to be recognized when printing with high accuracy of 2400 dpi or more and scanning by means of several dozen beams, resulting in the decrease in the image quality. In the present invention, by adjusting the positions of the optical elements 13, 14, the positions of the light beams are corrected so as to reduce the deflection between the image heights. This positional adjustment has effects which simultaneously reduce the aberration, so the diameter of the spot of the light beam is also adjusted.

Figure 22:
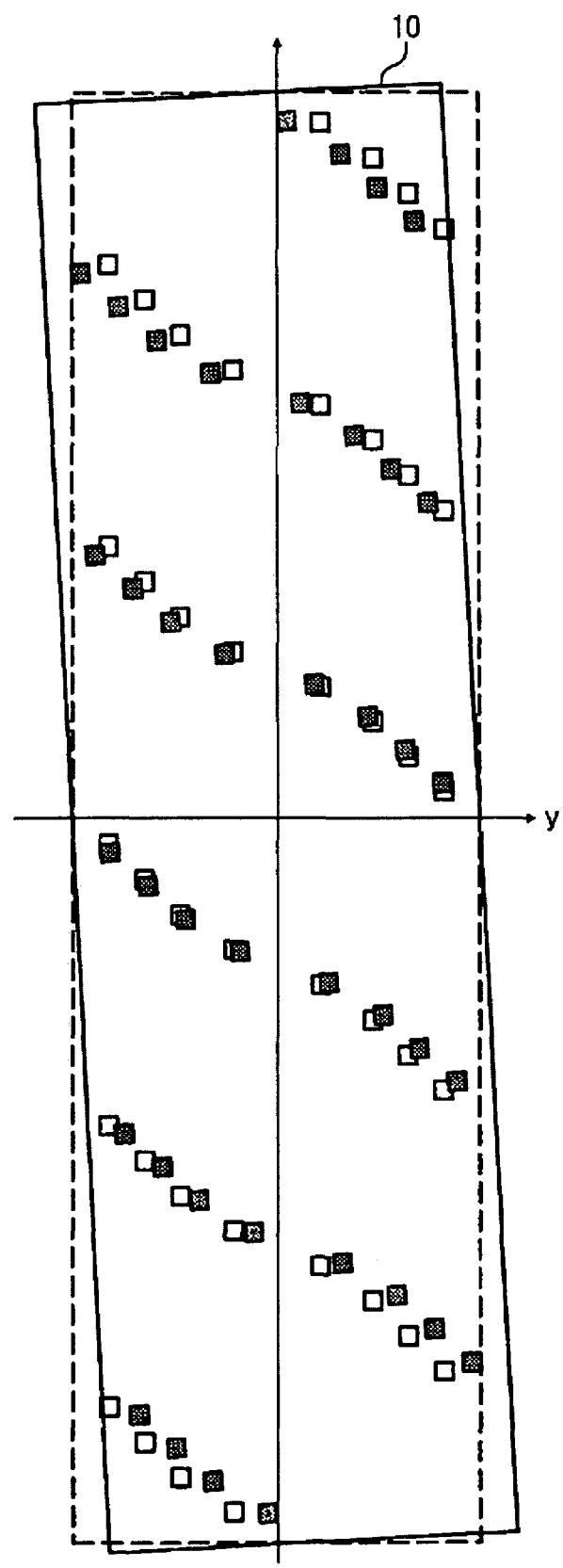
FIG. 22 is an explanatory view illustrating the changes in the positions of the VCSELs when rotating the light source 10 about the X-axis.

It is conventionally known that the adjustment of the rotation of the light source 10 about the X-axis is effective for adjusting the interval of the scanning lines. However, different from the conventionally known one-dimensional alignment LD array, the amount which can be adjusted by the rotation about the X-axis is limited when the two-dimensional alignment light source is used. FIG. 22 illustrates the outline squares showing the positions of VCSELs before rotating and the black squares showing the positions of VCSELs after rotating when rotating the light source 10 about the X-axis. As illustrated in FIG. 22, by the rotation about the X-axis, some pairs of the light-emitting members have large positional intervals around the rotation and some pairs of the light-emitting members have small positional intervals around the rotation. When a one-dimensional alignment light source is used, such an effect does not happen. Therefore, the adjustment of the scanning intervals is conducted by a method except the rotation about the X-axis, and the positional adjustment of the optical elements 13, 14 in the Z-axis direction becomes effective.

In the above embodiments, the scanning devices 100, 100' for use in a single color image forming apparatus (printer) were described. However, the image forming apparatus can be a tandem color apparatus having a plurality of photoconductive drums corresponding to a color image as illustrated in FIGS. 23A, 23B as one example.

Hereinafter, a multicolored image forming apparatus 1000A which corresponds to a color image and has a plurality of photoconductive drums will be described with reference to FIG. 23A. The image forming apparatus 1000A forms a plurality of electrostatic latent images by scanning and exposing a plurality of photoconductive drums corresponding to colors, respectively, visualizes the electrostatic latent images by toners, so as to be overlapped, and forms a color image.

Figure 23A:
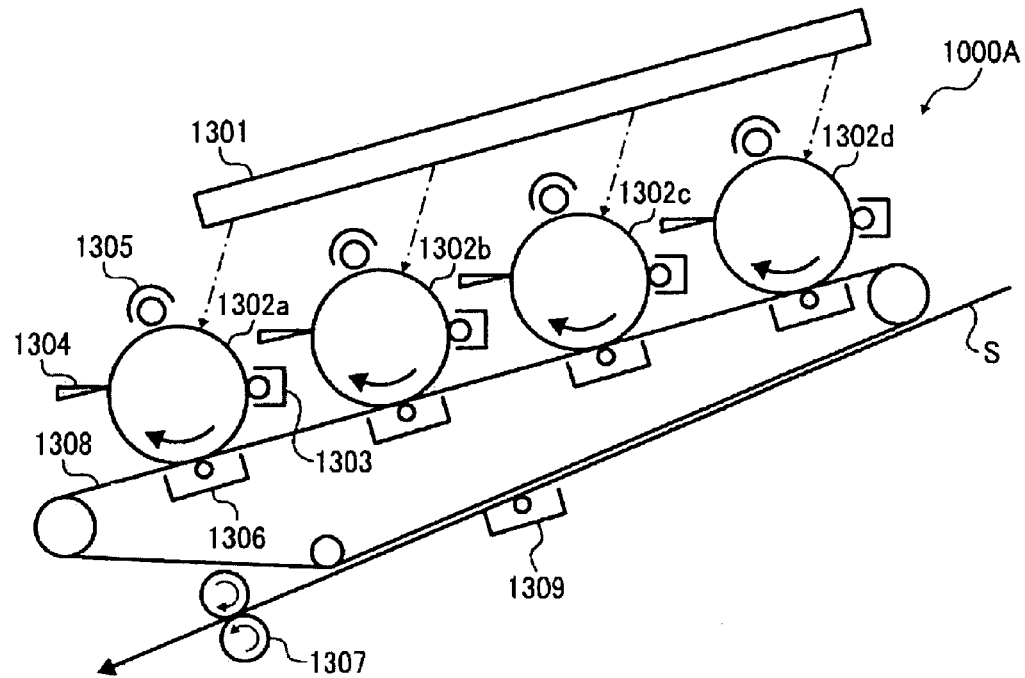
FIG. 23A is a side view illustrating a schematic structure of an image forming apparatus 1000A.
Figure 23B:
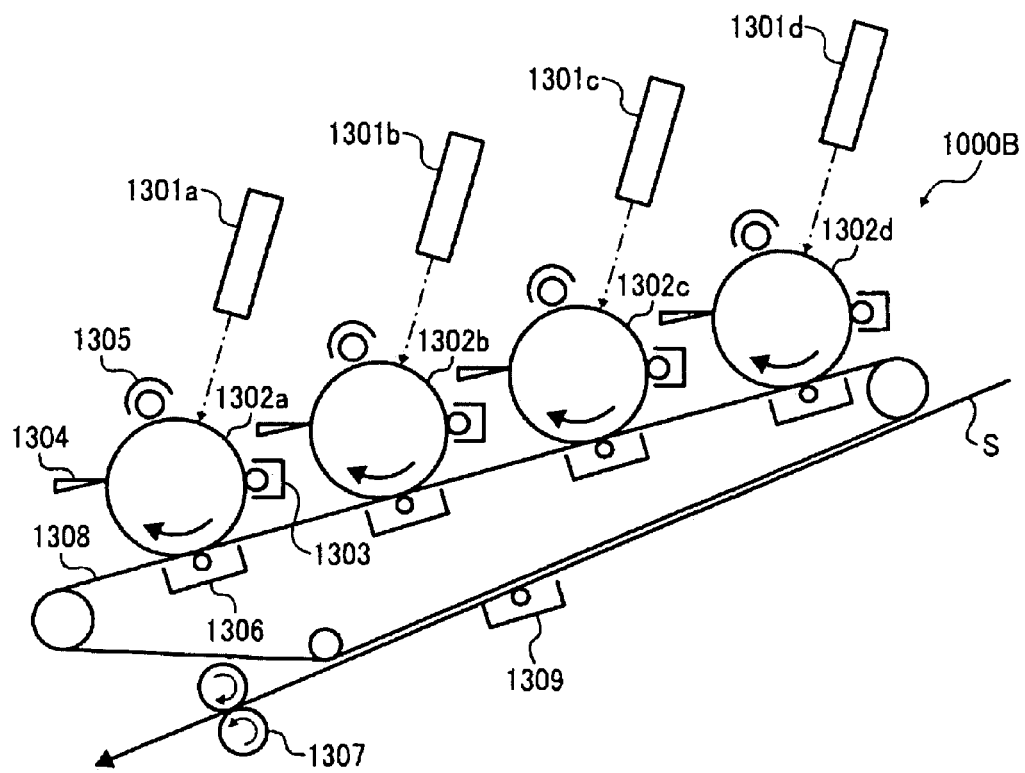
FIG. 23B is a side view illustrating a schematic structure of an image forming apparatus 1000B.

In the image forming apparatus 1000A, the photoconductive drums 1302a-1302d rotate at a constant speed in the clockwise direction, as illustrated by the arrows in FIG. 23A. The surfaces of the photoconductive drums 1302a-1302d are equally charged by a charger 1305, and scanned by an optical scanning device 1301 similar to the above-described image forming apparatus 200. The electrostatic latent images formed on the photoconductive bodies 1302a-1302d by this scanning are visualized as toner images by development devices 1303. Each of the toner images is transferred by a transfer unit 1306 in a state which overlaps onto an intermediate transfer belt 1308. The toner image transferred onto the intermediate transfer belt 1308 is fixed onto paper S by a transfer unit 1309 and a fixing unit 1307, so that a full-color image is formed.

The photoconductive drums 1302a-1302d correspond to cyan C, magenta M, yellow Y, and black K, respectively. The correspondence relationship between the photoconductive drums 1302a-1302d and the colors can be freely set so as to be optimized. For example, in this embodiment, the photoconductive drums 1302a-1302d sequentially correspond to cyan C, magenta M, yellow Y, and black K, respectively, It is preferable to select a corresponding color according to a brightness level and a visibility level relative to an optical scanning device corresponding to a photoconductive drum located in a position, which makes it difficult to improve a scanning quality, or an optical scanning device corresponding to a photoconductive drum, which omits a process such as adjustment. For example, it is preferable for a photoconductive drum corresponding to an optical system having the worst optical characteristic (for example, large field curvature and large scanning line curve) to use yellow Y having low visibility or high brightness. In addition, for example, by increasing the size of the photoconductive drum corresponding to black K, the durability of the photoconductive drum having a high operation frequency is increased, so that the stability of the entire apparatus can be improved. Moreover, as the modification example of the color image forming apparatus 100A, a color image forming apparatus 1000B having a plurality of optical scanning devices as illustrated in FIG. 23B can be adopted.

In the above embodiments, the optical scanning devices 100, 100' are used for a printer, but these are suitable for an image forming apparatus in addition to the printer, for example, a copying machine, a facsimile, or a complex machine which includes these.

Embodiment 3

Hereinafter, embodiment 3 of the present invention will be described with reference to FIGS. 24-29.

Figure 24:
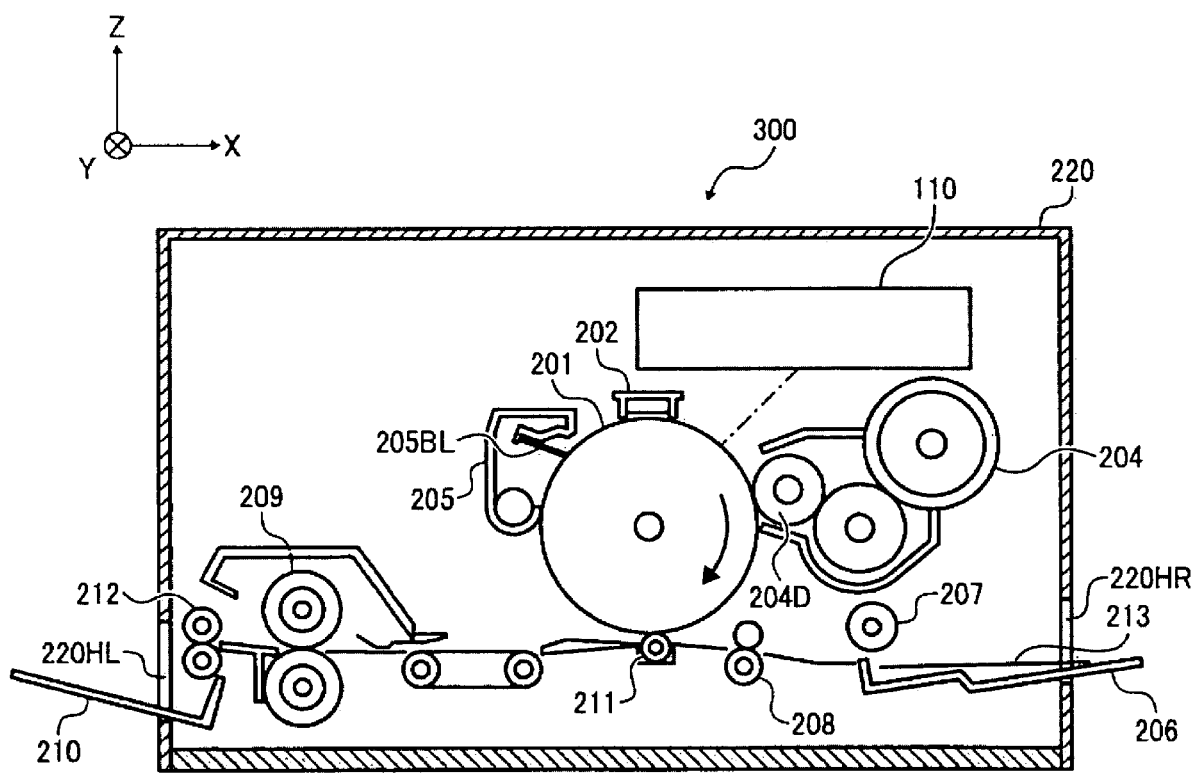
FIG. 24 is a side view illustrating a schematic structure of a printer 300 according to a third embodiment of the present invention.

FIG. 24 illustrates a schematic structure of a printer 300 as an image forming apparatus of the embodiment 3 of the present invention.

The printer 300 is a color printer which prints an image by transferring a toner image onto a paper by means of the Carlson process. This printer 300 includes an optical scanning device 110, a photoconductive drum 201, a charger 202, a toner cartridge 204, a cleaning case 205, a paper feeding tray 206, a paper feeding roller 207, a resist roller pair 208, a transfer charger 211, a fixing roller 209, a paper discharging roller 212, a paper discharging tray 210, and a housing 220 which houses these.

The housing 220 is an approximate rectangular solid, and has openings 220HR, 220HL, which communicate with the internal space, formed on the side walls on the +X side and −X side, respectively, in FIG. 24, The optical scanning device 110 is disposed in the upper portion of the internal portion of the housing 220, deflects the modulated light beams in the main-scanning direction (Y-axis direction in FIG. 24) according to image information, and scans the surface of the photoconductive drum 201. In addition, the structure of the optical scanning device 110 will be described later.

The photoconductive drum 201 is a cylindrical member including a photosensitive layer having a property of electrical conductance, if light beams are irradiated. The photoconductive drum 201 having the longitudinal direction as the Y-axis direction is disposed below the optical scanning device 100, and rotates in the clockwise direction in FIG. 24 by a rotation mechanism (not shown). As illustrated in FIG. 24, the charger 202, the toner cartridge 204, the transfer charger 211, and the cleaning case 205 are disposed in the circumference of the photoconductive drum 201 at the positions of 12 o'clock (upper side), about 2 o'clock, 6 o'clock, and about 10 o'clock, respectively.

The charger 202 is disposed via a predetermined clearance relative to the surface of the photoconductive drum 201, and charges the surface of the photoconductive drum 201 at a predetermined voltage.

The toner cartridge 204 includes a cartridge body into which toners of a black image component are filled, and a development roller charged by the voltage having a polarity opposite to the polarity of the photoconductive drum 201. The toner cartridge 204 supplies the toners filled in the cartridge body onto the surface of the photoconductive drum 201 via the development roller.

The cleaning case 205 includes a rectangular cleaning blade 205BL with the Y-axis direction at the longitudinal direction, and is disposed such that one end of the cleaning blade 205BL has contact with the surface of the photoconductive drum 201. The toners absorbed onto the surface of the photoconductive drum 201 are separated by the cleaning blade 205BL along the rotation of the photoconductive drum 201, and are contained inside the cleaning case 205.

The transfer charger 211 is disposed via a predetermined clearance relative to the surface of the photoconductive drum 201, and is applied with the voltage having a polarity opposite to the polarity of the charger 202.

The paper discharging tray 206 is disposed in a state in which its end portion on the +X side projects from the opening 220HR formed on the side wall on the +X side of the housing 220 in FIG. 24, and houses a plurality of paper sheets 213 supplied from the external portion.

The paper feeding roller 207 feeds the paper sheets 213 one by one from the paper feeding tray 206, and guides the fed paper to the space formed by the photoconductive drum 201 and the transfer charger 211 via the resist roller pair 201 having a pair of rotation rollers.

The fixing roller 209 includes a pair of rotation rollers, heats and presses the paper 213, and guides the paper to the paper discharging roller 212.

The paper discharging roller 212 includes a pair of rotation rollers, and sequentially stacks the paper sheets 213 fed by the fixing roller 209 relative to the paper discharging tray 210 disposed in a state in which its end portion on the −X side projects from the opening 220HL formed on the side wall of the −X side of the housing 220 in FIG. 24.

Figure 25:
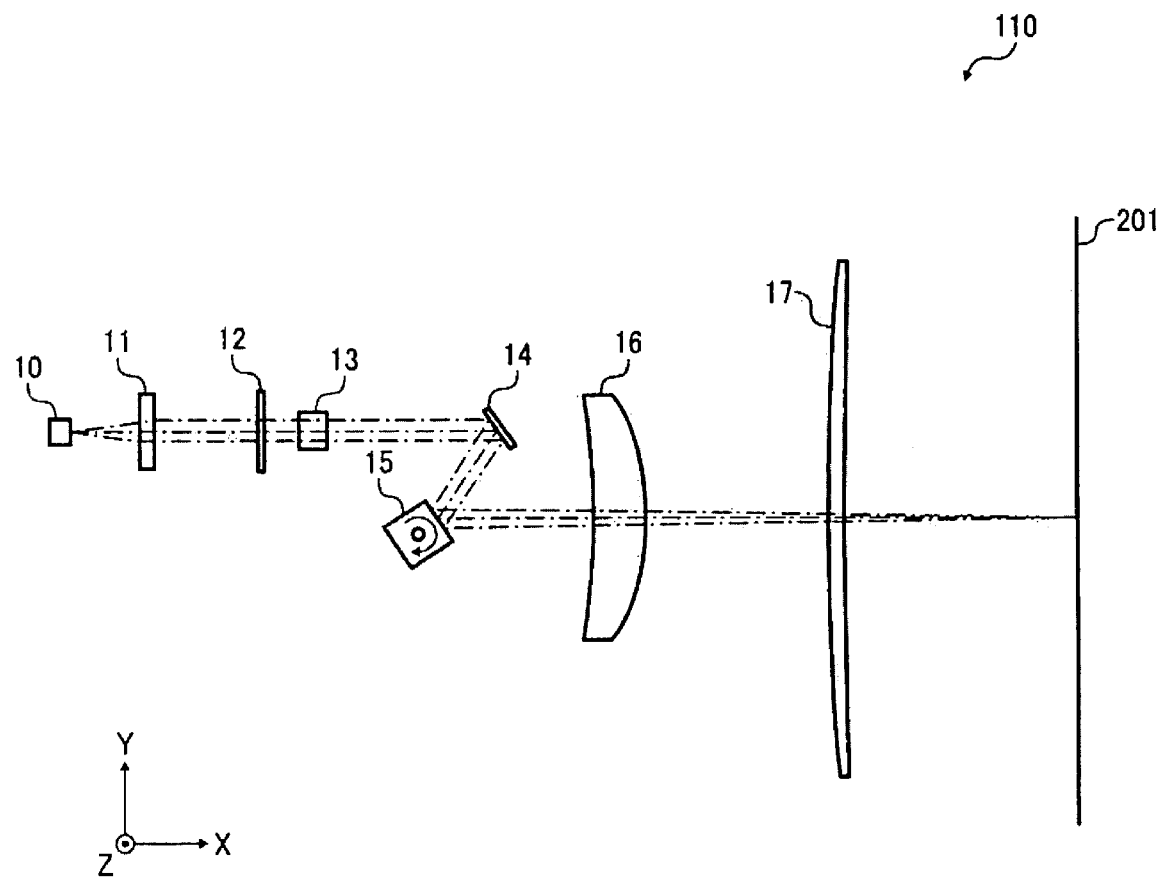
FIG. 25 is a plan view illustrating a schematic structure of an optical scanning device 110.

Next, the structure of the optical scanning device 110 will be described. FIG. 25 illustrates a schematic structure of the optical scanning device 110. The optical scanning device 110 sequentially forms points corresponding to pixels in the main-scanning direction (Y-axis direction in FIG. 25) onto the writing area by scanning the writing area of the surface of the photoconductive drum 201 with a plurality of lasers modulated according to image data, so that a plurality of scanning lines is formed.

As illustrated in FIG. 25, the optical scanning device 110 includes a light source 10', a coupling lens 11, an aperture member 12, a linear image forming lens 13, and a reflection mirror, which are sequentially disposed on the +X side of the light source 10 in FIG. 25, a polygon mirror 15 disposed on the −Y side of the reflection mirror 14 in FIG. 25, a first scanning lens 16, and a second scanning lens 17, which are sequentially disposed on the +X side of the polygon mirror 15 in FIG. 25.

Figure 26:
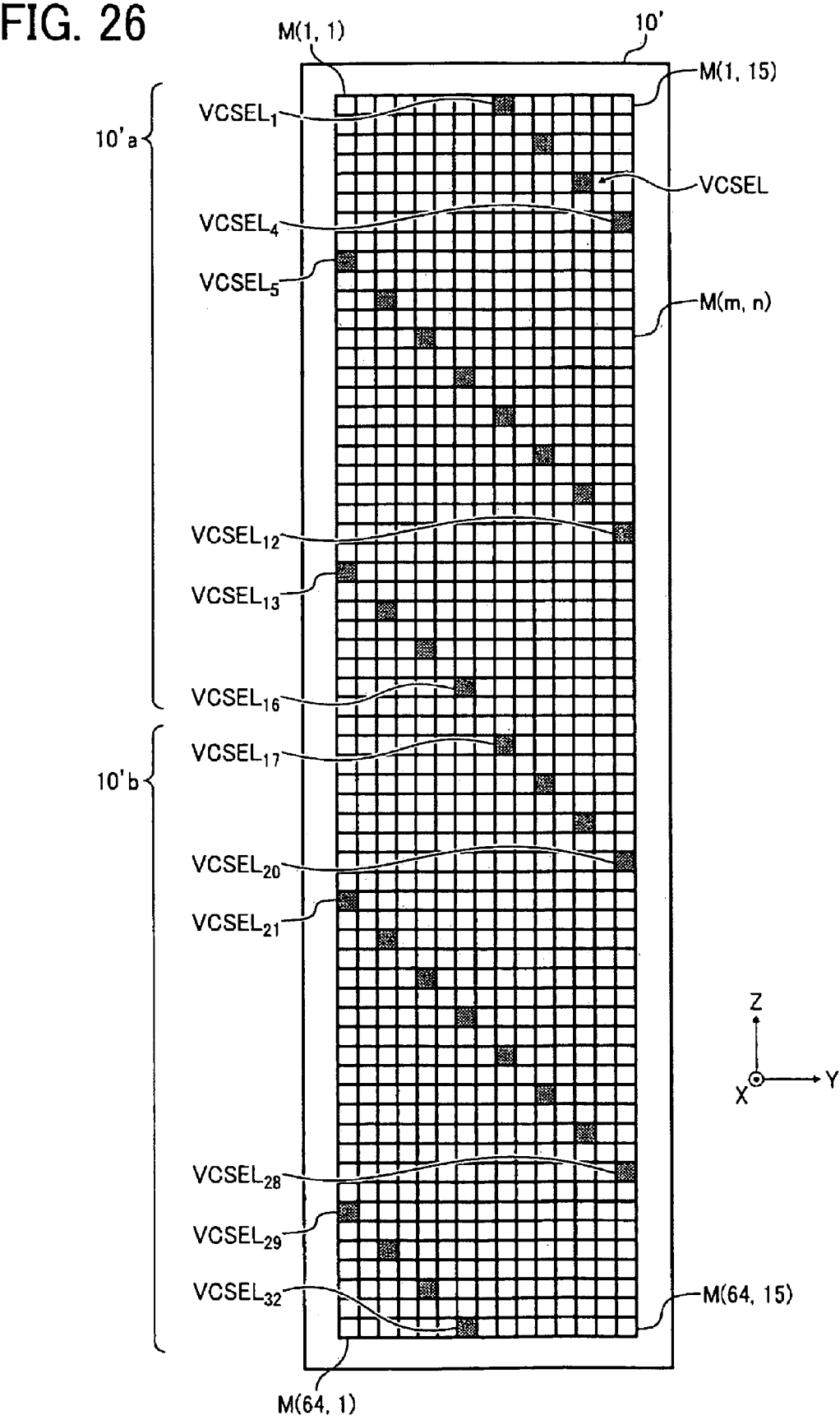
FIG. 26 is a view illustrating a plurality of VCSELs formed in a light source 10' together with the matrix M (m, n).

FIG. 26 is a view illustrating a plurality of VCSELs formed on the light source 10' together with the matrix M (m, n). This matrix (m, n) is the matrix having 64 lines and 15 columns (m=1, 2, 3 ... 64, n=1, 2, 3 ... 15). One matrix corresponds to one point constituting a scanning line to be formed on the writing area of the photoconductive drum 201. The light source 10' includes the total of two-dimensionally formed 32 VCSELs having 4 VCSELs 1 to 4 arranged in the positions corresponding to the matrixes, M(1, 9), M(3, 11), M(5, 13), M(7,15), respectively, 8 VCSELs 5 to 12 arranged in the positions corresponding to the matrixes, M(9, 1) M(11, 3), M(13, 5), M(15, 7), M(17, 9), M(19, 11), M(21, 13), M(23, 15), respectively, 4 VCSELs 13 to 16 arranged in the positions corresponding to the matrixes, M(25, 1), M(27, 3), M(29, 5), M(31, 7), respectively, 4 VCSELs 17 to 20 arranged in the positions corresponding to the matrixes, M(34, 9), M(36, 11), M(38, 13), M(40, 15), respectively, 8 VCSELs 21 to 28 arranged in the positions corresponding to the matrixes, M(42, 1), M(44, 3), M(46, 5), M(48, 7), M(50, 9), M(52, 11), M(54, 13), M(56, 15), respectively, and 4 VCSELs 29 to 32 arranged in the positions corresponding to the matrixes, M(58,1), M(60,3), M(62,5), M(64,7), respectively. Hereinafter, 16 VCSELs 1 to 16 corresponding to the matrixes, M(1, 9), M(3, 11), M(5, 13), M(7, 15), M(9, 1), M(11, 3), M(13, 5), M(15, 7), M(17, 9), M(19, 11), M(21, 13), M(23, 15), M(25, 1), M(27, 3), M(29, 5), M(31, 7) are referred to as a first light-emitting group 10a, and 16 VCSELs 17 to 32 corresponding to the matrixes, M(34, 9), M(36, 11), M(38, 13), M(40, 15), M(42, 1), M(44, 3), M(46, 5), M(48, 7), M(50, 9), M(52, 11), M(54, 13), M(56, 15), M(58, 1), M(60, 3), M(62, 5), M(64, 7) are referred to as a second light-emitting group 10b.

The coupling lens 11 is a lens having a reflective index of about 1.5, forms the light beams emitted from the VCSELs, formed in the light source 10' into approximate parallel light, and once condenses in the focal position on the emission side.

The aperture member 12 includes a rectangular opening having the width of the Y-axis direction (main-scanning direction) of 5.5 mm and the width of the Z-axis direction (sub-scanning direction) of 1.18 mm, for example. The aperture member 12 is disposed such that the center of the opening is positioned in the focal position of the coupling lens 11 or near the coupling lens 11.

The linear image forming lens 13 is an anamorphic lens including a first plane having reflective power in the Z-axis direction (sub-scanning direction) and a second plane having reflective power in the Y-axis direction (main-scanning direction), and condenses the light beams which have passed through the aperture member 12 onto the deflection faces of the polygon mirror 15 via the reflection mirror 14.

The polygon mirror 15 is a quadrangular prism member having a square top face inscribed in a circle with a radius 7 mm, and has the deflection faces formed on the four side planes. This polygon mirror 15 rotates at a constant angular speed in the direction of the arrow illustrated in FIG. 25 by means of a rotation mechanism (not shown). By this rotation, the light beams entered into the polygon mirror 15 are scanned in the Y-axis direction.

The first scanning lens 16 has an image height proportional to an incident angle of the light beam, and moves relative to the Y-axis at a constant speed an image face of the light beam deflected at a constant angular speed by the polygon mirror 15.

The second scanning lens 17 is a lens having a positive reflective index in the sub-scanning direction. The second scanning lens 17 is arranged such that the longitudinal direction becomes the Y-axis direction, and images the entering light beams onto the surface of the photoconductive drum 201.

In optical scanning device 110 having the above-described structure, as to the optical system including the optical elements arranged on the optical path from the light source 10' to the photoconductive drum 205, the absolute value of the lateral magnification βm of the main-scanning direction is set to be larger than the absolute value of the lateral magnification βm of the sub-scanning direction.

Next, the operation of the printer 300 having the above-described structure is described. When image information is received from a higher-level device (not shown), the optical scanning device 110 is driven by the modulated data according to the image information, and 32 light beams are emitted from the light source 10'. These light beams concentrate onto the deflection faces of the polygon mirror 15 by the linear image forming lens 13 via the coupling lens 11 and the aperture member 12. The light beams concentrated onto the deflection faces of the polygon mirror 15 are scanned by the polygon mirror 15 in the Y-axis direction. The light beams enter into the first scanning lens, and the deflection speed is adjusted. Then, the light beams concentrate onto the surface of the photoconductive drum 201 via the second scanning lens 17.

Figure 27:
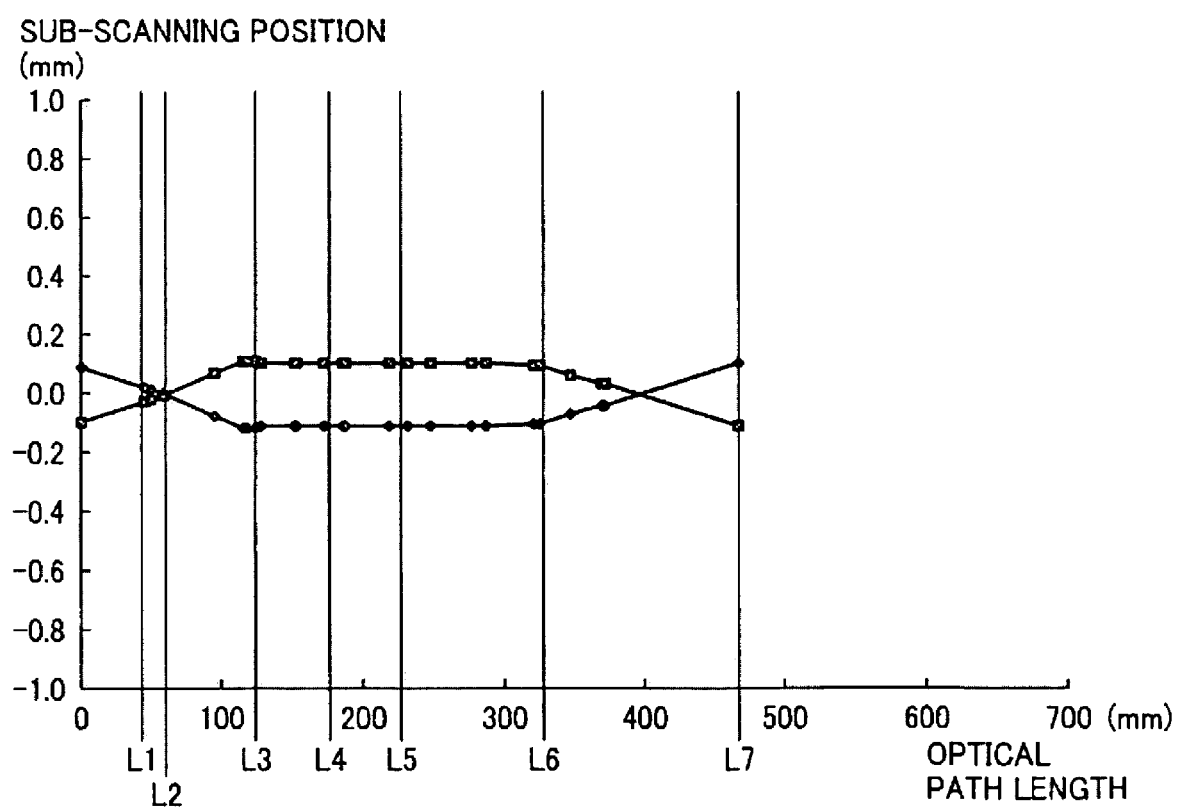
FIG. 27 is a view illustrating optical paths of light beams emitted from a VCSEL 1 and a VCSEL 32 formed in the light source 10'.

FIG. 27 is a view illustrating the optical paths of the light beams emitted from the VCSEL 1 and VCSEL 2 formed in the light source 10'. In addition, regarding FIG. 27, the horizontal axis corresponds to the X-axis direction of FIG. 25, the position L1 in FIG. 27 illustrates the central position of the X-axis direction of the coupling lens 11, the position L2 illustrates the position of the aperture member 12, the position L3 illustrates the position of the linear image forming lens 13, the position L4 illustrates the position of the deflection faces of the polygon mirror 15, the position L5 illustrates the central position of the X-axis direction of the first scanning lens 16, the position L6 illustrates the central position of the X-axis direction of the second scanning lens 17, and the position L7 illustrates the position of the surface of the photoconductive drum 201.

In the present embodiment, the 32 light beams emitted from the 32 VCSELs, formed in the light source 10' pass through the coupling lens 11 arranged in the position L1 in FIG. 27, and once cross at the position L2 in which the aperture member 12 is arranged. After that, the light beams pass through the linear image forming lens 13 arranged in the position L3, and travel to the position L6 in which the second scanning lens 17 is arranged in a state where the light beams are parallel to each other, or in a state where the light beams approach each other.

On the other hand, the surface of the photoconductive drum 201 is charged by the charger 202 at a predetermined voltage, so that the charge is distributed at a predetermined charge density. When the surface of the photoconductive drum 201 is scanned by the polygon mirror 15, a plurality of scanning lines which are prescribed by the distribution of the charge is formed in the writing area of the surface of the photoconductive drum 201.

Figure 28:
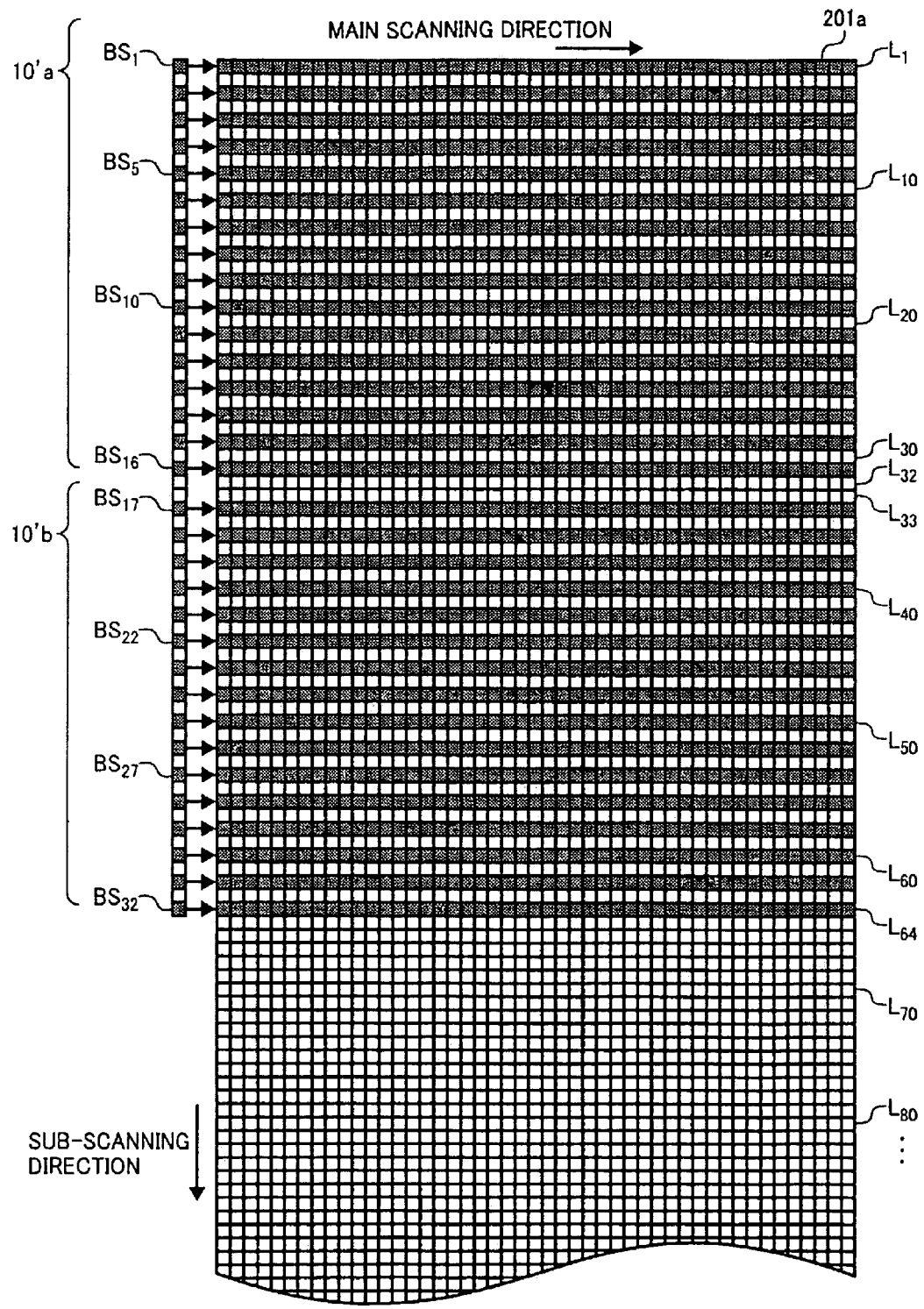

FIG. 28 is a schematic view illustrating the writing area 201a formed on the photoconductive drum 201 and 32 beam spots BS1 to BS32 which move in the main-scanning direction on the writing area 201a with one scanning. The beam spots BS1 to BS32 are formed by the light beams emitted from the VCSELs 1 to 32, respectively, formed on the light source 10'. In addition, one grid illustrated in FIG. 28 illustrates the area corresponding to one pixel.

When the scanning lines to be formed in the writing area 201a are the scanning lines L1, L2, L3, . . . , respectively, if the 16 beam spots BS1 to BS16 formed by the light beams from the first light-emitting group 10'a with one scanning are moved in the main-scanning direction, the odd-numbered scanning lines (L1, L3, . . . L31) out of the scanning lines from L1 to L32 are formed on the writing area 201a as illustrated in FIG. 28. If the 16 beam spots BS17 to BS32 formed by the light beams from the second light-emitting group 10'b are moved in the main-scanning direction, the even-numbered scanning lines (L34, L36, . . . L64) out of the scanning lines from the scanning lines L33 to L64 are formed on the writing area 201a.

Figure 29:
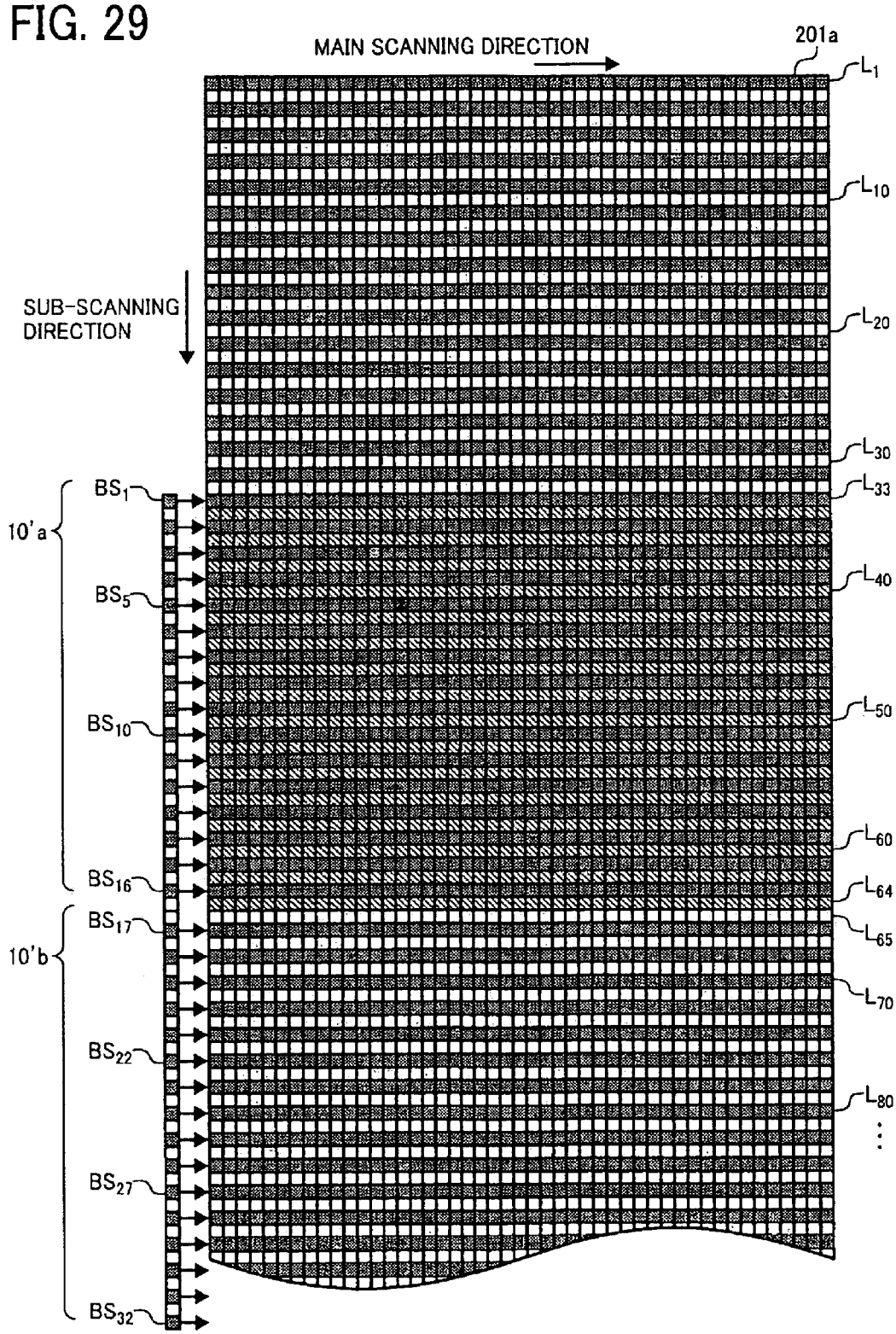

FIG. 29 is a schematic view illustrating the 32 beam spots BS1 to BS32 which move in the main-scanning direction on the writing area 201a with the second scanning. In the second scanning, by the movement of the 16 beam spots BS1 to BS16 formed by the light beams from the first light-emitting group 10'a in the main-scanning direction, the odd-numbered scanning lines (L33, L35, . . . L63) out of the scanning lines from the scanning lines L33 to L64 are formed on the writing area 201a, and by the movement of the 16 beam spots BS17 to BS32 formed by the light beams from the second light-emitting group 10'b in the main-scanning direction, the even-numbered scanning lines (L66, L68, . . . L96) out of the scanning lines from the scanning lines L65 to L96 are formed in the writing area 201a.

More particularly, as illustrated in FIG. 29, after the scanning (t-time scanning) by the light beams from the second light-emitting group 10'b is conducted, the scanning lines L33-L64 are adjacently formed by conducting the scanning (t+1 time scanning) by the light beams from the first light-emitting group 10'a. After that, by repeating a plurality of scanning such as t+2 time scanning, and t+3 time scanning, the scanning lines after the scanning line L65 are adjacently formed in the writing area 201a, and the electrostatic latent image according to the image data is formed.

After the electrostatic latent image is formed on the surface of the photoconductive drum 201, the toners are supplied onto the surface of the photoconductive drum 201 by the development roller 204D of the toner cartridge 204. In this case, the development roller 204D of the toner cartridge 204 is charged at a voltage having a polarity opposite to the polarity of the photoconductive drum 201, so the toners adhered onto the development roller are changed to the same polarity as the polarity of photoconductive drum 201. Therefore, the toners do not adhere to the portion where the charge is distributed in the surface of the photoconductive drum 201, and the toners adhere only onto the portion scanned by the light beams, so that the toner image in which the electrostatic latent image is visualized is formed on the surface of the photoconductive drum 201. After this toner image is transferred onto the paper sheet 213 by the transfer charger 211, the toner image is fixed by the fixing roller 209, and the image is formed on the paper sheet 213. The paper sheet 213 on which the image is formed as described above is discharged by the paper discharging roller 212, and is sequentially stacked onto the paper discharging tray 210.

As described above, in the optical scanning device 110 according to the present embodiment, regarding the scanning lines to be adjacently formed in the writing area 201a, the scanning lines formed every other line by the light beams from the first light-emitting group 10'a in the present scanning are adjacently formed relative to the scanning lines formed every other line by the light beams from the second light-emitting group 10'b in the previous scanning. The scanning lines formed every other line by the light beams from the second light-emitting group 10'a in the next scanning are also adjacently formed relative to the scanning lines formed every other line by the light beams from the second light-emitting group 10'b in the present scanning. As described above, compared with a case where the light source 10' is arranged corresponding to the adjacent scanning lines on the writing area 201a, the arrangement intervals of the VCSELs arranged in the light source 10' in the sub-scanning direction have allowance, so that the arrangement intervals of the VCSELs in the sub-scanning direction become two times or more. Therefore, the thermal interference between the VCSELs can be reduced, resulting in the decrease in the thermal deterioration of the light source 10'.

Moreover, since the scanning lines sequentially arranged in the sub-scanning direction are formed by the light beams from the second light-emitting group 10'b and the first light-emitting group 10'a, low reciprocity failure can be controlled, resulting in the decrease in the banding (horizontal article on image) to be formed on a recording medium. In addition, since the arrangement intervals between the VCSELs in the sub-scanning direction are set to be two times or more, the electric wiring to the VCSELs can be facilitated.

Furthermore, in order to increase the arrangement intervals of the VCSELs in the sub-scanning direction, the method of lowering the absolute value of the lateral magnification $\beta s$ of the sub-scanning direction regarding the optical system including the optical elements disposed in the optical path from the light source 10' to the photoconductive drum 205 can be considered. However, if the absolute value of the lateral magnification $\beta s$ of the sub-scanning direction is lowered, the utilization efficiency of the light beams to be emitted from the VCSELs is decreased, causing a new problem. Especially, when the VCSEL having output lower than the output of an end face light-emitting laser is used as the light-emitting source, the decrease in the utilization efficiency of the light beam is a significant problem.

In this case, if the interval between the scanning lines, which are located in the furthermost positions to each other, out of the scanning lines to be formed with one scanning is L1, the interval between the scanning lines adjacently formed in the writing area 201a is L2, and the number of the VCSELs formed in the light source 10' is k, L1, L2, k satisfy the following formula 6.

$$L1 > (k-1) \times L2 \qquad \text{(FORMULA 6)}$$

In the present embodiment, L1=62×L2, and k=32, so the formula 6 is satisfied.

In the present embodiment, for example, if the pixel density is a high density (for example, 1200 dpi), the absolute value of the lateral magnification $\beta m$ of the main-scanning direction is required to be larger than the absolute value of the lateral magnification $\beta s$ of the sub-scanning direction. More particularly, in the optical scanning device 100, the absolute value of the lateral magnification $\beta m$ of the main-scanning direction of the optical system including the optical elements arranged in the optical path from the light source 10' to the photoconductive drum 205 is larger than the absolute value of the lateral magnification $\beta s$ of the sub-scanning direction. The method of decreasing the interval of the sub-scanning direction of the VCSELs formed in the light source 10' is considered, but this method requires that the thermal interference between the VCSELs be controlled and that ensure the space for the electric wiring to the VCSELs be ensured.

Figure 30:
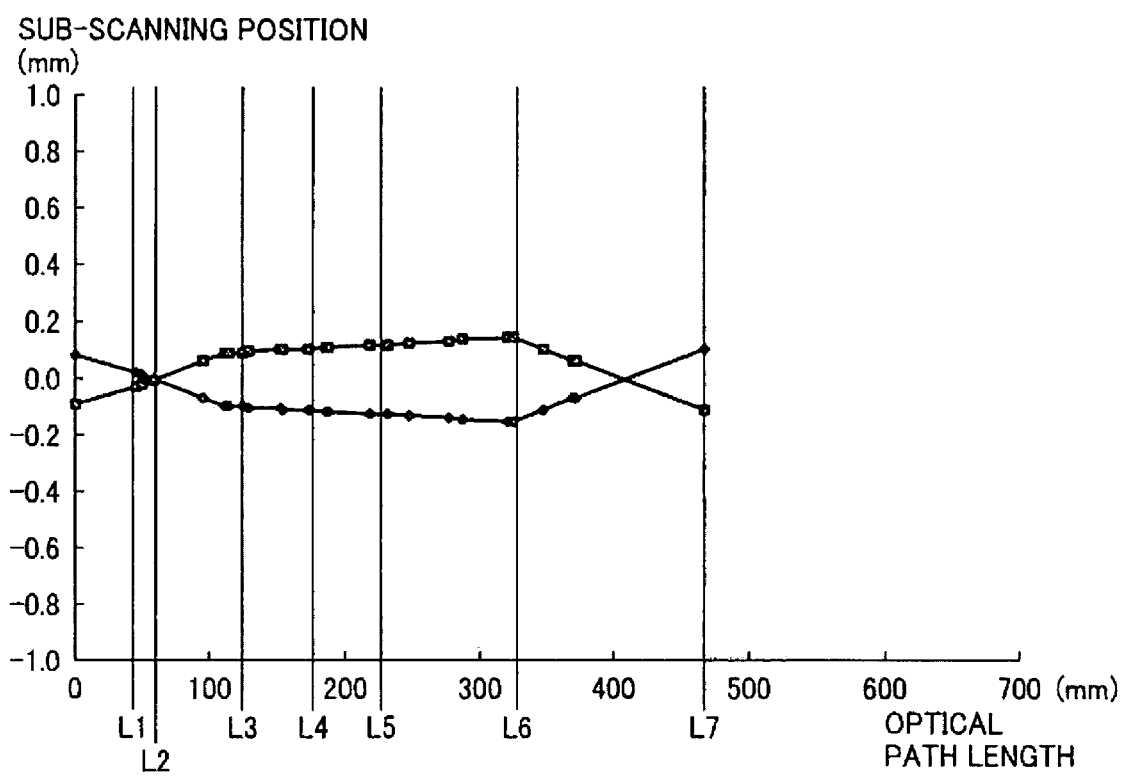
FIG. 30 is a view illustrating one example of an optical characteristic of an optical system.

The VCSEL has a feature which can achieve the multi-beams of the light source with low costs and a simple structure. However, the intervals of the light beams of the sub-scanning direction are required to be stably maintained. In the present embodiment, as described above, after the 32 light beams emitted from the 32 VCSELs formed in the light source 10' pass through the linear image forming lens 13 arranged in the position L3 in FIG. 27, the light beams travel to the position L6 in which the second scanning lens 17 is arranged in FIG. 27 with a parallel state or a state where the light beams approach each other. This is because the difference of the incident angle caused between the light beams is minimized when a plurality of light beams enters into the writing area 201a of the photoconductive drum 201, and the deflection in the sub-scanning direction of the beam spot of the light beam resulting from an arrangement error between the optical elements and a shape error is controlled On the other hand, as illustrated in FIG. 30 as a comparative example, after the 32 light beams emitted from the light source 10' pass through the linear image forming lens 13 arranged in the position L3 in FIG. 30, the light beams travel to the position L6 where the second scanning lens 17 is arranged in FIG. 30 while separating from each other. In this case, there is a problem in that the deflections increase in the sub-scanning direction of the beam spots of the light beams resulting from an arrangement error between the optical elements increase. In this case, a plurality of light beams obliquely enters into the deflection faces of the polygon mirror 15. If a plurality of light beams obliquely enters into the deflection faces of the polygon mirror 15, there is a problem in that the uneven pitches of the light beams are caused by the differences of the shapes of the deflection faces (difference in inscribed circle radius of each deflection face, for example).

As described above, in the optical scanning device 100, the deflection in the sub-scanning direction of the beam spot of the light beam is effectively controlled, and each of the light beams passes through near the optical axis of each of the optical elements in the sub-scanning direction, so the other optical characteristics are improved.

In the present embodiment, if the interval of the scanning lines adjacently formed in the writing area 201a is Ls, and the number of the VCSELs formed in the light source 10' is k, an unnecessary increase in the size of the light source 10' in the sub-scanning direction can be avoided by satisfying the following formula 7.

$$2k \cdot Ls \leq 63 Ls \leq 3k \cdot Ls \qquad \text{(FORMULA 7)}$$

In the present embodiment, out of the VCSELs formed in the light source 10', by increasing the interval between VCSEL 16 and VCSEL 17 larger than the interval of other adjacent VCSELs, the VCSEL is not arranged in the central portion of the light source which has thermal influence. Therefore, the heat is effectively released from the central portion, and the thermal deterioration of the light source 10' can be further controlled.

Conventionally, the beam diameter of the spot of the light beam entering into the scanned face in the main-scanning direction was set to be smaller than the beam diameter in the sub-scanning direction. However, the light beam from the surface emitting laser becomes a beam having a circular cross-sectional face vertical to the optical axis. For this reason, if the width in the main-scanning direction differs from the width in the main scanning direction as to the opening formed in the aperture member 12, a shortage of the light volume is caused, so that it can not correspond to the high speed image forming process. Therefore, by increasing the beam diameter in the main-scanning direction larger than the beam diameter in the sub-scanning direction, the influence caused by the difference between the width of the opening in the main scanning direction and the width of the opening in the sub-scanning direction can be reduced, and also the coupling effect (ratio of light-emitting power of opening relative to light power to be emitted from light-emitting point) can be increased. In addition, by using a plurality of beams from the light source, a high resolution can be achieved. In this case, the intervals between the adjacent scanning lines are decreased, so the beam diameters in the sub-scanning direction can be set to be larger than the intervals between the adjacent scanning lines.

Since the image forming apparatus 300 according to the present embodiment includes the optical scanning device 110, the thermal deterioration of the light source is controlled, so that the decrease in the running costs can be lowered. Moreover, a highly accurate image in which the banding or the like is controlled can be formed on the recording medium (paper 213).

Figure 31:
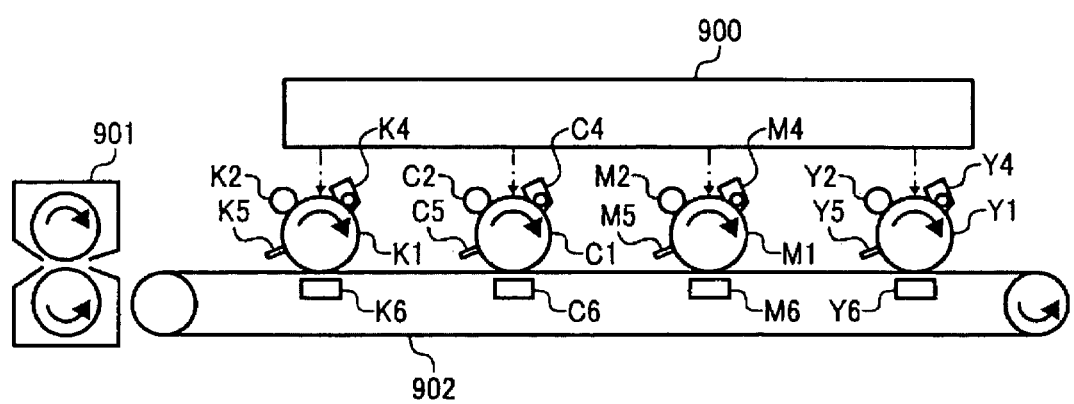
FIG. 31 a side view illustrating a schematic structure of an image forming apparatus corresponding to a color image.

In the above embodiment, the case was described when the optical scanning device 110 is used for a single color image forming apparatus (printer), but the image forming apparatus can be a tandem color apparatus including a plurality of photoconductive drums corresponding to a color image as illustrated in FIG. 31 as one example. The tandem color apparatus illustrated in FIG. 31 includes a photoconductive drum K1, a charger K2, a developer K4, a cleaning unit K5, and a transfer charger K6 for black (K), a photoconductive drum C1, a charger C2, a developer C4, a cleaning unit C5, and a transfer charger C6 for cyan (C), a photoconductive drum M1, a charger M2, a developer M4, a cleaning unit M5, and a transfer charger M6 for magenta (M), a photoconductive drum Y1, a charger Y2, a developer Y4, a cleaning unit Y5, and a transfer charger Y6 for yellow (Y), an optical scanning device 900, a transfer belt 902, and a fixing unit 901. In this case, the optical scanning device 900 includes the light source 10' for each color.

Each of the photoconductive drums rotates in the arrow direction in FIG. 31. The charger, developer, transfer charger and cleaning unit are sequentially arranged along the rotation direction of the drum. Each of the chargers equally charges the surface of the corresponding drum. The light beams are irradiated by the optical scanning device 900 on the surface of the photoconductor charged by the charger, and the electrostatic latent image is formed on the photoconductive drum by conducting the above-described scanning. Then, the toner image is formed on the surface of the photoconductive drum by the corresponding developer. The toner image of each color is transferred onto the recording paper by the corresponding transfer charger, and an image is finally fixed onto the recording paper by the fixing unit 901.

In the above embodiment, the case was described when the optical scanning device 110 is used for a printer, but the optical scanning device 110 can be suitable for an image forming apparatus in addition to the printer such as a copying machine, facsimile, or a complex machine having these.

An optical scanning device according to one embodiment of the present invention is an optical scanning device which scans a scanned surface by a plurality of light beams in a main-scanning direction, and includes a light source having a plurality of light-emitting portions which emit the light beams, the light-emitting portions being two-dimensionally arranged in a plane parallel to the main-scanning direction and a sub-scanning direction orthogonal to the main-scanning direction via arrangement intervals in the main-scanning direction and the sub-scanning direction, a deflector which scans the light beams in the main-scanning direction, and a scanning optical system which images the scanned light beams onto the scanned surface.

Preferably, the arrangement intervals in the sub-scanning direction are an integral multiplication of a size of one light-emitting portion in the sub-scanning direction.

Preferably, scanning lines formed on the scanned surface with one scanning are formed via intervals according to the arrangement intervals, and scanning lines adjacent to the scanning lines in the sub-scanning direction are formed by multiple scanning.

Preferably, the arrangement intervals in the main-scanning direction and the arrangement intervals in the sub-scanning direction are unequal.

Preferably, the arrangement interval of a central portion of the light source in the main-scanning direction is larger than the arrangement interval of both end portions of the light source in the main-scanning direction, and the arrangement interval of the central portion of the light source in the sub-scanning direction is larger than the arrangement interval of both end portions of the light source in the sub-scanning direction.

Preferably, the arrangement intervals become smaller toward both end portions of the main-scanning direction from a central portion of the light source, and become smaller toward both end portions of the sub-scanning direction from the central portion.

Preferably, the arrangement intervals become smaller toward both end portions of the main-scanning direction from a central portion of the light source.

Preferably, the arrangement intervals become smaller toward both end portions of the sub-scanning direction from a central portion of the light source.

By constituting as described above, the thermal interference from the light-emitting portion arranged in the peripheral portion relative to the light-emitting portion arranged in the central portion of the light source can be avoided. Therefore, the operating life of the light source can be extended, and the deflection of the optical characteristics by the thermal difference can be avoided.

Preferably, the optical scanning device further includes plural pairs of light-emitting portions in which the arrangement intervals in the main-scanning direction are the largest, wherein out of the plural pairs of light-emitting portions, at least the arrangement interval of the pair of light-emitting portions located at furthermost positions in the sub-scanning direction from a central portion of the light source is the smallest in the arrangement intervals of the plural pairs of light-emitting portions in the sub-scanning direction.

By constituting as described above, the variations in the intervals between the scanning lines formed in the writing area 201*a* can be reduced.

Preferably, the light-emitting portions located in both ends in the sub-scanning direction are arranged in positions nearest to a central portion of the light source in the main-scanning direction.

By constituting as described above, the light beams in both ends of the sub-scanning direction pass near the optical axis of the optical system. For this reason, the influence of a manufacturing error of parts in both ends of the sub-scanning direction can be reduced, and the unevenness in the intervals between the scanning lines can be reduced.

Preferably, the plurality of light-emitting portions includes the light-emitting portions in which the positions in the main-scanning direction are the same.

By constituting as described above, the start timing and the end timing for writing a plurality of scanning lines can be shared. Therefore, a capacity of a memory which stores the timing information can be reduced, resulting in the decrease in the costs.

Preferably, the arrangement intervals in the sub-scanning directions are unequal.

Preferably, the arrangement intervals of the light-emitting portions in the sub-scanning direction, which are adjacently arranged in a central portion of the sub-scanning direction, are larger than the arrangement intervals of the light source in the sub-scanning direction, which are adjacently arranged in other portions of the sub-scanning direction.

Preferably, the plurality of the light-emitting portions is arranged in different positions in the sub-scanning direction, and where the number of the light-emitting portions is k, the intervals of the sub-scanning direction of the scanning lines located in both ends of the sub-scanning direction, which are formed on the scanned surface with one scanning, are L1, and the intervals of the sub-scanning direction of the scanning lines adjacent in the sub-scanning direction, which are formed on the scanned face by multiple scanning, are L2, L1, k, and L2 satisfy $L1 > (k-1) \times L2$.

Preferably, L1, k, and L2 satisfy $2k \times L2 \leq L1 \leq 3k \times L2$.

By constituting as described above, the thermal interference from the light-emitting portions around the light-emitting section arranged in the central portion of the light source can be avoided. Therefore, the operating life of the light source can be extended, and the deflection of the optical characteristic by the thermal difference can be avoided.

Preferably, the optical scanning device further includes a light guide optical system having a first optical system which couples the light beams emitted from the light-emitting portions, a second optical system which concentrates the coupled light beams in the sub-scanning direction near a deflection face of the deflector, and the scanning optical system, wherein an absolute value of a lateral magnification of the main-scanning direction of the light guide optical system is larger than an absolute value of a lateral magnification of the sub-scanning direction.

Thereby, the variations in the pitches of the light beams in the sub-scanning direction can be controlled.

Preferably, the second optical system includes an optical element which advances a pair of light beams emitted from the light-emitting portions located at furthermost positions in the sub-scanning direction to be parallel or to approach each other after passing through the second optical system.

Accordingly, the deflections of the beam spots in the sub-scanning direction can be effectively controlled. Since a plurality of light beams pass through near the optical axis of each of the optical elements in the sub-scanning direction, a preferable optical characteristic can be obtained.

Preferably, the optical scanning device further includes an intermediate member which retains at least one end of the main-scanning direction of the optical system, and is attached to an optical housing which retains the second optical system.

Accordingly, the adjustment having a high degree of freedom can be conducted in the adjustment of the optical system of the second optical system.

Preferably, the light beam has a beam diameter in the main-scanning direction larger than a beam diameter in the sub-scanning direction.

Accordingly, the influence of the opening formed in the aperture member 12 relative to the light volume of the light beam can be reduced.

Moreover, the image forming apparatus according to one embodiment of the present invention is an image forming apparatus, which fixes a toner image formed according to an electrostatic latent image obtained from information regarding an image onto a recording medium, the image forming apparatus includes an optical scanning device according to one embodiment of the present invention, a photoconductive body having the scanned face on which the electrostatic latent image is formed by the optical scanning device, a development unit, which visualizes the electrostatic latent image formed on the scanned face of the photoconductor as the toner image, and a transfer unit which fixes the toner image visualized by the development unit onto the recording medium.

According to the above image forming apparatus, it includes the optical scanning device according to one embodiment of the present invention. Therefore, the deterioration in the light source of the optical scanning device can be effectively controlled, resulting in the increase in the operating life of the image forming apparatus and decreasing the running costs of the image forming apparatus.

Although, the present invention has been described in terms of exemplary embodiments, it is not limited thereto. It should be appreciated that variations may be made in the embodiments described by person skilled in the art without departing from the scope of the present invention as defined by the following claims.

What is claimed is:

1. An optical scanning device which scans a scanned surface by a plurality of light beams in a main-scanning direction; comprising:
    a vertical cavity surface emitting lasers (VCSELs) light source having a plurality of light-emitting portions which emit the light beams, the light-emitting portions being two-dimensionally arranged in a plane parallel to the main-scanning direction and a sub-scanning direction orthogonal to the main-scanning direction via arrangement intervals in the main-scanning direction and the sub-scanning direction, wherein a plurality of the arrangement intervals in the main-scanning direction are unequal to each other and a plurality of the arrangement intervals in the sub-scanning direction are unequal to each other;
    a deflector which scans the light beams in the main-scanning direction; and
    a scanning optical system which images the scanned light beams onto the scanned surface.

2. An optical scanning device according to claim 1, wherein the arrangement interval of a central portion of the light source in the main-scanning direction is larger than the arrangement interval of both end portions of the light source in the main-scanning direction, and the arrangement interval of the central portion of the light source in the sub-scanning direction is larger than the arrangement interval of the both end portions of the light source in the sub-scanning direction.

3. An optical scanning device according to claim 1, wherein the arrangement intervals become smaller toward both end portions of the main-scanning direction from a central portion of the light source, and become smaller toward both end portions of the sub-scanning direction from the central portion.

4. An optical scanning device according to claim 1, wherein the arrangement intervals become smaller toward both end portions of the main-scanning direction from a central portion of the light source.

5. An optical scanning device according to claim 1, wherein the arrangement intervals become smaller toward both end portions of the sub-scanning direction from a central portion of the light source.

6. An optical scanning device according to claim 1, further comprising;
plural pairs of light-emitting portions in which the arrangement interval in the main -scanning direction is the largest,
wherein out of the plural pairs of light-emitting portions, at least the arrangement interval of the pair of light-emitting portions located in furthermost positions in the sub -scanning direction from a central portion of the light source is the smallest in the arrangement intervals of the plural pairs of light-emitting portions in the sub-scanning direction.

7. An optical scanning device according to claim 1, wherein the plurality of light-emitting portions includes the light-emitting portions in which the positions in the main-scanning direction are the same.

8. An optical scanning device according to claim 1, wherein the plurality of the light-emitting portions are arranged in different positions in the sub-scanning direction, and where the number of the light-emitting portions is k, the intervals of the sub-scanning direction of the scanning lines located in both ends of the sub -scanning direction, which are formed on the scanned surface with one scanning, are L1, and the intervals of the sub-scanning direction of the scanning lines adjacent in the sub-scanning direction, which are formed on the scanned surface by multiple scanning, are L2, L1, k, and L2 satisfy $L1>(k-1)\times L2$.

9. An optical scanning device according to claim 8, wherein L1, k, and L2 satisfy $2k\times L2 \leq L1 \leq 3k\times L2$.

10. An optical scanning device according to claim 1, further comprising:
a light guide optical system having a first optical system which couples the light beams emitted from the light-emitting portions, a second optical system which concentrates the coupled light beams in the sub-scanning direction near a deflection face of the deflector, and the scanning optical system, wherein an absolute value of a lateral magnification of the main-scanning direction of the light guide optical system is larger than an absolute value of a lateral magnification of the sub-scanning direction.

11. An optical scanning device according to claim 10, wherein the second optical system includes an optical element which advances a pair of light beams emitted from the light-emitting portions located at furthermost positions in the sub-scanning direction to be parallel or to approach each other after passing through the second optical system.

12. An optical scanning device according to claim 11, further comprising:
an intermediate member, which retains at least one end of the main-scanning direction of the optical system and is attached to an optical housing which retains the second optical system.

13. An optical scanning device according to claim 1, wherein the light beam has a beam diameter in the main-scanning direction larger than a beam diameter in the sub-scanning direction.

14. An image forming apparatus, which fixes a toner image formed according to an electrostatic latent image obtained from information regarding an image onto a recording medium, comprising:
an optical scanning device according to claim 1,
a photoconductive body having the scanned surface on which the electrostatic latent image is formed by the optical scanning device;
a development unit which visualizes the electrostatic latent image formed on the scanned face of the photoconductor as the toner image; and
a transfer unit which fixes the toner image visualized by the development unit onto the recording medium.

15. An optical scanning device which scans a scanned surface by a plurality of light beams in a main-scanning direction; comprising:
a vertical cavity surface emitting lasers (VCSELs) light source having a plurality of light-emitting portions which emit the light beams, the light-emitting portions being two -dimensionally arranged in a plane parallel to the main-scanning direction and a sub-scanning direction orthogonal to the main-scanning direction via arrangement intervals in the main -scanning direction and the sub-scanning direction;
a deflector which scans the light beams in the main-scanning direction; and
a scanning optical system which images the scanned light beams onto the scanned surface, wherein the light-emitting portions located in both ends in the sub-scanning direction are arranged in positions nearest to a central portion of the light source in the main-scanning direction.

16. An optical scanning device which scans a scanned surface by a plurality of light beams in a main-scanning direction; comprising:
a vertical cavity surface emitting lasers (VCSELs) light source having a plurality of light-emitting portions which emit the light beams, the light-emitting portions being two -dimensionally arranged in a plane parallel to the main-scanning direction and a sub-scanning direction orthogonal to the main-scanning direction via arrangement intervals in the main -scanning direction and the sub-scanning direction;
a deflector which scans the light beams in the main-scanning direction; and
a scanning optical system which images the scanned light beams onto the scanned surface
wherein a plurality of the arrangement intervals in the sub-scanning directions are unequal to each other.

17. An optical scanning device according to claim 16, wherein the arrangement intervals of the light-emitting portions in the sub-scanning direction, which are adjacently arranged in a central portion of the sub-scanning direction, are larger than the arrangement intervals of the light source in the sub-scanning direction, which are adjacently arranged in other portions of the sub-scanning direction.

18. An optical scanning device which scans a scanned surface by a plurality of light beams in a main-scanning direction, comprising:
a vertical cavity surface emitting lasers (VCSELs) light source having a plurality of light-emitting portions which emit the light beams, the light-emitting portions being two -dimensionally arranged in a plane parallel to the main-scanning direction and a sub-scanning direction orthogonal to the main-scanning direction via arrangement intervals in the main-scanning direction and the sub-scanning direction, wherein the arrangement intervals become smaller toward both end portions of the sub-scanning direction from a central portion of the light source, a deflector which scans the light beams in the main-scanning direction; and a scanning optical system which images the scanned light beams onto the scanned surface.

* * * * *